United States Patent [19]
Watanabe

[11] Patent Number: 5,589,954
[45] Date of Patent: Dec. 31, 1996

[54] γ-CORRECTION CURVE SELECTING APPARATUS AND A γ-CORRECTION CURVE CREATING APPARATUS

[75] Inventor: Hideyuki Watanabe, Kawasaki, Japan

[73] Assignee: Ricoh Company, Ltd., Tokyo, Japan

[21] Appl. No.: 251,312

[22] Filed: May 31, 1994

[30] Foreign Application Priority Data

May 28, 1993 [JP] Japan .................................. 5-127559

[51] Int. Cl.[6] ................................ H04N 1/56; H04N 1/60
[52] U.S. Cl. ............................ 358/518; 358/519; 358/521
[58] Field of Search .................................. 358/519, 518, 358/520, 521; 395/21, 23; 348/675, 674; 364/525, 526, 571.01

[56] References Cited

U.S. PATENT DOCUMENTS

| | | | |
|---|---|---|---|
| 5,216,463 | 6/1993 | Morita | 395/21 |
| 5,296,919 | 3/1994 | Maruno et al. | 348/675 |
| 5,353,239 | 10/1994 | Kashiwagi | 364/571.02 |
| 5,363,318 | 11/1994 | McCauley | 358/519 |
| 5,376,962 | 12/1994 | Zortea | 395/23 |

*Primary Examiner*—Scott A. Rogers
*Attorney, Agent, or Firm*—Oblon, Spivak, McClelland, Maier & Neustadt, P.C.

[57] ABSTRACT

An image processing apparatus capable of creating or selecting a most suitable γ-correction curve and shortening the image quality adjusting time. According to the invention, in an image processing apparatus for correcting the γ-characteristic of the density value for each pixel of the original image to be processed and the output value of the image processing measure in the predetermined apparatus for receiving the image, or the γ-characteristic of the writing-in value of the image processing apparatus in the predetermined apparatus for outputting the image and the density of the output image, the image processing apparatus includes a γ-correction curve creating device for creating the γ-correction curve from the input γ-characteristic, and a second γ-correction curve selecting device for selecting the most suitable γ-correction curve among the plural γ-correction curves by use of the γ-correction curve emitted from the γ-correction curve creating device.

7 Claims, 61 Drawing Sheets

Fig. 18

| ADDRESS | DATA |
|---------|------|
| 10 | 1 |
| ⋮ | ⋮ |
| 15 | 2 |
| ⋮ | ⋮ |
| 20 | 3 |
| ⋮ | ⋮ |
| 30 | 15 |
| ⋮ | ⋮ |
| 35 | 20 |

Fig. 21

| END | IDY | IDM | IDC |
|---|---|---|---|
| 0.1 | 0.95 | 0.94 | 0.93 |
| | | | |
| 1.80 | 1.76 | 1.78 | 1.79 |

| L* | IDY | IDM | IDC |
|---|---|---|---|
| 30 | 0.95 | 0.94 | 0.93 |
| 90 | 1.76 | 1.78 | 1.79 |

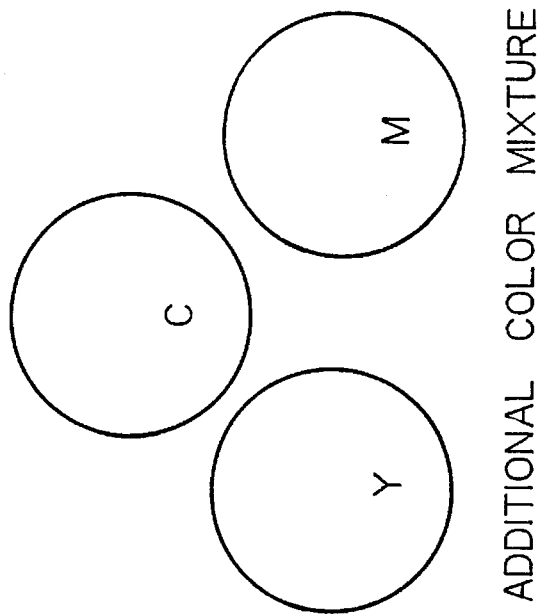
Fig. 39c  ADDITIONAL COLOR MIXTURE
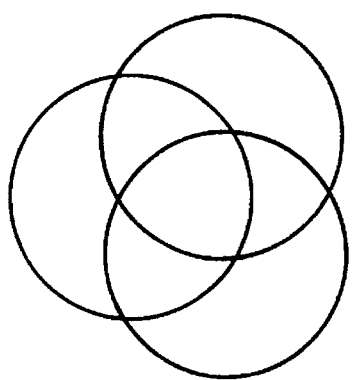
Fig. 39b  INTERMEDIATE STATE
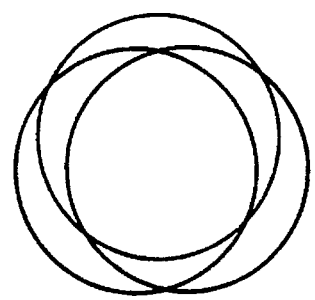
Fig. 39a  SUBTRACTIVE COLOR MIXTURE

R : DOT DIAMETER
P : WRITING-IN PITCH $R \geqq P\sqrt{2}$

SEPARATED LIGHT ENERGY CHARACTERISTIC OF THE HALOGEN LAMP

SEPARATED LIGHT ENERGY CHARACTERISTIC OF THE FLUORESCENT LAMP

γ-CORRECTION CURVE SELECTING APPARATUS AND A γ-CORRECTION CURVE CREATING APPARATUS

BACKGROUND OF THE INVENTION

1. Field of the Invention

The present invention relates to a γ-correction (compensation) curve selecting apparatus and a γ-correction (compensation) curve creating apparatus, and in particular, a γ-correction (compensation) curve selecting and creating apparatus capable of being preferably utilized in image processing systems such as digital black-and-white copying machine, color facsimile device, scanner, printer, and so The technical term "γ-correction" refers to gamma correction or compensation. Hereinafter, the word "γ-correction" will be used.

2. Description of the Prior Art

In a conventional black-and-white copying machine an image processing treatment is performed by use of the image processing system as shown in FIG. 40. Namely, after a manuscript document such as a book or a copied sheet is set on the manuscript document stand and the document is read out by a CCD sensor, the image signal emitted from the CCD sensor is converted from an analog signal to a digital signal by use of an A-D converter, and thereafter, shading correction, γ-correction, density conversion, correction of output γ-correction, binarizing or multi-valuing process treatment are performed in order. In this manner, an image recorded using toner or other material by the use of a printer or the like is created. This is the prior-art method of image processing. Furthermore, it is also known to perform dither image processing after correcting an output γ-correction as shown in FIG. 42.

In such a single-color image processing apparatus in a digital black-and-white copying machine, the single-color printer or the like, there are the following problems.

(1) The γ-characteristics of respective image scanners differ from each other, and the γ-characteristics are not completely uniform. (See, for example, "Color Image Scanner Designing Technology—Trikepps, WHITE SERIES, No. 130 pp. 123–126).

(2) The output γ-characteristic is not uniform due to the relationship of the pitch of writing-out and the dot system. (See also, "Color Image Scanner Designing Technology—Trikepps, WHITE SERIES, No. 130 pp. 157–158).

(3) As to the γ-correction, the value of γ-correction is given to the above single-color image processing apparatus from an external source. See Trikepps, WHITE SERIES, No. 130 pp. 123–126, supra.

Regarding the above-noted drawbacks (1)–(3), further explanation will be given hereinafter. First, the outline of the image processing and γ-correction will be described. The image scanner has been fixedly employed as an apparatus for taking in the image data in the field of the electronic publishing (EP) or the desk-top publishing (DTP). Taking-in of the photograph or the printed document as the image data into the personal computer (PC) enables not only replacement of the cut-off photographs by the other image group with electronic processing also various other image processing methods such as the emphasis or color conversion for the taken-in image data.

If the two image data can be composed or various design constructions realized on the display, in practice, without employing any coloring materials, it may be possible to obtain higher efficiency or to draw upon the new creativity of the designer. Furthermore, the data-basing of the image or the image communication may cause the world of image to approach to us. In a broader sense, character recognition may also be thought of a sort of image processing. Therefore, many applications exist utilizing various types of image processing in the field of image technology. On the other hand, various image processing are also executed in an image scanner used for taking in such image data into the PC. Fundamentally, those types of image processing are thought to be a processing of absorbing the characteristic of the reading-out system. The correction for the difference of the sensor and/or the unevenness of the light intensity of the optical system is basically different from the image processing for the reading-out of image data.

Such correction may be termed "previous processing" for inputting the read-out standard image data into the PC. Usually, this previous processing will include shading correction, density conversion, γ-correction, MTF correction, etc., which are explained later. The fundamental image data are converted to data of the desired size by correcting the characteristics of the reading-out system. Or otherwise, the halftone data read out with a desired resolution are captured and thereby the enlargement and reduction processings are executed with some halftone levels as previous processing.

On the other hand, subsequent processing is an applicable processing based on the image data with the standard halftone. Although the binary processing are usually executed on the side having the image scanner, it is unavoidable from the viewpoint of the present situation of high-leveling to the extent that the transferring amount of the data from the image scanner to the PC or the binary processing itself is needed to employ the specially-used hardware. Further, binary processing frequently has no relation to the concretely-executed processing in a system concerned with binary images.

The binary processing is a type of intermediate processing between the previous processing and the subsequent processing. However, in order to execute binary processing, γ-correction at the output side or the color correction (compensation) has to be performed prior to the binary processing. The image scanner integral with the system as opposed to being a typical input device for the use with standard image data. As to the subsequent processings, in addition to the above, there are output γ-correction, moire removal, and compression coding of the image which is necessary for exchanging image communication or creating the image data base.

The previous processing technique will be explained. Previous processing of the image processing in the image scanner is defined as a series of processings from the operation of reading out the original manuscript document and correcting the characteristic of the reading-out system to the operation of obtaining the data with the standard halftone.

The above previous processing includes the following functions:

(1) shading correction for correcting the unevenness of illuminating the manuscript document and the unevenness of the sensitivity;

(2) γ-correction for correcting the γ-characteristic of the sensor;

(3) density conversion for converting the light intensity received by the sensor to a density value;

(4) MTF correction for correcting the spreading response for the point input;

(5) noise removal;

(6) color correction; and (7) enlargement and reduction processings at the respective halftone levels.

These functions must be executed before various image processing methods can be performed correctly. The functions are to be performed apparatus inside the scanner.

The enlargement/reduction processings at the respective halftone data levels, namely, the processings in which the halftone data are input and the same are output in order to output the halftone data of optional size from the scanner is a fundamental function of the scanner. Therefore, the enlargement/reduction processings should be included in the previous processing. Although the binary processing is the fundamental function for the system treating the binary image, the same is not a fundamental function for other systems concerned with halftone images. For this reason, the latter function is part of the subsequent processing.

The respective functions are described, hereinafter. First, the shading correction will be described. The system of reading out the image can monotonously reproduce the density value of the image as an ideal function. However, in practice, even though the manuscript document of uniform density is read out, the output signal causes unevenness depending on the pixel, for the reason of non-uniform intensity (brightness) of the light rays radiating the document surface and the non-uniform characteristics of the sensor. Shading correction is a method of performing correction so as to obtain a form output for the manuscript of uniform density.

FIG. 49 shows the photoelectric conversion characteristic of the CCD image sensor. In FIG. 49, the relationship between the input light amount (intensity) [Ix. sec] and the output voltage [v] is generally expressed by the following equality:

$$y = ax^{\gamma} + b \quad (1)$$

y: Output Voltage x: Input Light Intensity a: Sensitivity of the Sensor b: Output Voltage at Darkness γ: Correction Coefficient When a CCD is employed, the correction coefficient γ is approximately equal to 1. In the case of reading out the image by use of a line sensor, unevenness in the sub-scanning direction can be ignored and the shading correction is performed for each line of the main-scanning direction on the basis of white and black standard data. Further, regarding the correction of the black standard data, almost all of the correction depends on the dark current and is largely influenced by the ambient temperature. However, since the unevenness is comparatively small between the respective pixels, the data are treated as being constant during the time period of reading out one sheet of manuscript document. When high precision is demanded for the apparatus, it is necessary to perform the correction for both black standard data and the standard data.

Next, the method of the digital operation (first shading correction method) is described referring to FIG. 50. First, black standard data are created by reading out the black standard original document or outputting the data in a state where the light source is turned off, and the created data are stored in the correction memory A. Next, the white standard original document is read out and the data created by subtracting the previously stored black standard data from the white standard data are stored in the correction memory B. When the original document is read out, the value of the correction memory A is subtracted from the data of the original document. Next, the subtracted value is divided by the value of the correction memory B. In this manner, shading correction is performed.

Next, the method of controlling the reference voltage of the A-D converter (second shading correction method) is described referring to FIG. 51. At first, the reference voltages +REF and −REF of the A-D converter are set, respectively, as follows:

+REF=E;

and

−REF=0, and the black standard data and the white standard data are, respectively, read out. The respective read-out outputs(data) are stored in the memories A and B respectively. When the original document is read out, the operation of the shading correction can be done using the reference voltages +REF and −REF which are respectively created by reading out and D-A converting the data in the correction memories A and B.

Now, γ-correction will be described. In the equality (1), when the y-value is not equal to 1, the relationship between input and output becomes non-uniform, the operation of correcting (compensating) the relationship therebetween so that it becomes linear is called γ-correction. The γ-characteristic of the sensor may be approximately 1.0 (photodiode) or 0.6 to 1.0 (photo-electric element). It can be simply applicable to concretely realize the γ-correction by use of the LUT (Look Up Table) constructed with the ROM (Read Only Memory). For example, the treatment of the input/output relationship is performed with one-time LUT-treatment and density conversion mentioned below, and thereby the deterioration of the precision can be suppressed to a minimum.

Moreover, γ-correction is performed for the purpose of correcting the characteristic of the output apparatus or positively changing the γ-characteristic of the image. Such methods for performing the γ-correction are described later.

Now, density conversion will be described. The optical sensor responds to the physical amount represented by the unit of the light intensity [Ix-sec.] On the other hand, when the light intensity becomes the visual excitement, the density which is physical amount sensed visually can be expressed by the logarithm of the light intensity as shown by the following equality:

$$D = \log (1/T) \text{ or } \log (Io/I) \quad (2)$$

D: Density

Io: Intensity of Incident Light Rays

I: Intensity of Reflected Light Rays

The above equality (2) is well-known as the rule of "Weber-Fechner". When the image data read out by the sensor are output from the scanner, the data should be the density value usually. Therefore, it is desirable to convert the light intensity to a density value before performing the various image processing steps at the previous (preceding) stage, for the purpose of suppressing the maximum amount of information. For this reason, density conversion is performed using the above equation (4) after the operation of shading correction. To state this more concretely, there are the following three methods of density conversion.

1) Instead of directly performing the logarithmic operation, density conversion is realized with the LUT system constructed with the ROM, as can be seen from FIG. 52.

2) An analog logarithmic amplifier Is added to the A-D converter at the previous stage.

3) Logarithmic conversion and A-D conversion are realized at the same time using the logarithmic A-D converter.

Usually, method 1) is utilized because it is beneficial from the viewpoint of cost and can be realized at the same time when the data are converted by use of the other LUT such as γ-correction. However, in the case of utilizing the LUT system, it is necessary to always pay strict attention to any deterioration in precision. It is desirable to have approximately a two bit margin for the precision of the input data when the conversion and the density conversion are performed.

The output γ-correction will be further explained below. The dot form of the output apparatus for actually outputting the image processed binarily differs from each other according to the output system. In the ink-jet system or the electrophotographic system, round (circular) dots are usually employed.

As shown in FIG. 53, it is necessary to make the dot diameter slightly larger than the writing-in pitch such that, when all of the dots strike the recording medium, a wide black-area can be realized without causing any white gaps. Consequently, the dot number and the printed area are not precisely proportional to each other. Further, the relationship differs depending on whether the sort of binarizing is a dot-dispersing type or a dot-concentrating type. Therefore, in order to obtain the linear density-output characteristic, it is necessary to perform γ-correction in consideration of the actual size of the dot and the extent of overlapping therebetween.

In practice, the γ-correction curve can be determined by actually measuring the density value of the output image at the gray level. Namely, assuming that the output characteristic curve which shows the relationship between the output halftone data and the hard copy density and is as expressed in the fourth quadrant of FIG. 54, the curve symmetrical to the above curve regarding the y-axis can be used as the γ-correction curve. It is possible to see FIG. 54, following the order of the original document density, scanner output value, output halftone data, and hard copy density, starting at the original document density. The relationship between the original document density and the scanner output value becomes a straight line of with 45° inclination as shown in the second quadrant in total consideration of the light intensity—density conversion and the f-correction of the sensor. The hard copy density obtained through the γ-correction curve and the output characteristic curve can be obtained from a linear relationship of 45° inclination with the original document density because of the symmetrical relationship of those two curves. The realization of the γ-correction can be performed by use of the LUT.

In addition to the γ-correction for obtaining the density linearity, the halftone characteristic Is positively converted, on some occasions, for the purpose of converting a dark original document to a brighter one or emphasizing the medium density portion. FIG. 55 shows the various sorts of the halftone converting curve. Only the large-inclination portion is emphasized.

Finally, various corrections will be explained in connection with the actual products. The γ-correction in the image processing apparatus such as the digital black-and-white copying machine, the single-color printer, or the like can be realized by use of a Look Up Table (called "LUT", hereinafter) 91 as shown in FIG. 2. In case that γ-correction of an image inputting apparatus such as a scanner, etc., is performed in the digital black-and-white copying machine, the input signal of the image processing apparatus is a reading-out signal which is the output signal from the image inputting apparatus, and the output signal thereof is the value of the γ-correction for the input signal. On the other hand, in the case of performing the γ-correction of the printer portion in the digital black-and-white 986. copying machine or that of the image outputting apparatus in the printer or the like, the input signal of the image processing apparatus is a writing-in signal transmitted to the image outputting apparatus in the printer or the like, and the output signal thereof is the γ-correction value of the input signal. FIG. 9 shows an example of the relationship between the input signal and the output signal γ-characteristic curve). LUT91 is constructed with a ROM accommodating a plurality of γ-characteristic curves. As shown in FIG. 2, one of γ-correction curves is selected in accordance with a table selection signal and the output signal is determined by the selected γ-correction curve. The γ-characteristic of the image inputting apparatus or that of the image outputting apparatus determines r correction. For instance, the γ-characteristic of the scanner determines the γ-correction as shown in FIG. 4 or the γ-characteristic of the single-color printer determines the same characteristic as shown in FIG. 6.

Further, in the digital color copying machine, image processing is performed by use of the image processing system as shown in FIG. 41. Namely, the manuscript document is set on the document stand and the image on the manuscript document is dissolved into three colors by the color dissolving filter and the dissolved colors are read out by the CCD sensor. The read-out data are treated with A-D conversion, shading correction, γ-correction & density conversion, color conversion & color correction, groundwork (background) removal (called "UCR", hereinafter), output γ-correction, binarizing or multi-valuing. The treated data are the ones to be employed as the value of writing-in by the printer with four toner-colors Y (Yellow), M (Magenta), C (Cyan), and K (Black). After the above treatment, the data are transferred to the printer.

The present invention closely relates to image processing by use of a neural network system; that is, the γ-correction curve selection and creation. The study of applying a neural network to the pattern recognition, the signal processing, and the intelligence treatment has been made progress in recent years, because of the success of the studying algorithm using the neural network "Backpropagation" announced in 1986. The neural network system can be studied automatically by offering the input and the desirable output. Underseas, rock and submarines can be discriminated from each other by use of the sound emitted from the sonar and reflected off the object such as the above-mentioned rock or submarine, by use of the neural network system. The English text is converted to the phonetic symbols (signs) in the system. In such application as mentioned above, a result equal to or better than that of the conventional system can be obtained in the aforementioned neural network system. There exists an intermediate layer between the input layer and the output layer in the employed neural network system. During the time period of continuing the study, the circuit necessary for recognizing the pattern is formed in the intermediate layer.

In this situation, there has been introduced a new capable of giving instructions such as a pattern recognizing functions or algorithm knowledge processing functions to the neural network system.

In comparison to the ability of the operation (for instance, three operators) trained for about two years with that of the neural network system, the recognition factor of the human is 88%–93%, while that of the neural network system turns out to be 99% (for the studied data) or 92% (for the data which has not been studied). Regarding the characteristic extracting system utilizing the AI (Artificial Intelligence) Technology, the recognition factor of the system turns out to be 91.5% (for the studied data) or 84% (for the data which has not been studied).

For the neural network, the studying algorithm is a key. The neural network itself is a network imitating algorithm the human brain. The individual construction elements of the neural network system have functions similar to human nerve cells (neurons). On the other hand, the structure and the function thereof are not uniform. The neural network system can be roughly divided into two types as will be described later. The algorithm for studying the system is called "backpropagation". The feature of the algorithm is that even the non-professional can study the neural network. It is not necessary for the professional to study the neural network. It is sufficient to have only the knowledge of the problem to be applied. The studying of the algorithm of the neural network is advanced as follows. First, the input is applied to the neural network system, and then the output of the system is reached. If the output thereof is incorrect, the correct output is taught to the neural network system. Then, the system changes its internal structure (the strength of the connection of the network) so as to emit the correct output. After repeating the aforementioned operation, the studying of the neural network is complicated. The range of the neural network systems application is very wide. The system is applied to pattern recognition, voice recognition and composition, signal processing, knowledge treatment, etc. There are many remaining problems not solved in the conventional system. The study of solving these problems by use of the neural network system and its studying algorithm have been vividly performed in recent years.

The structure of the neural network system, the method of studying the neural network, and the results of several applications thereof are introduced hereinafter. The neural network constructed in a classified structure can be studied by use of backpropagation. The neural network is a network imitating the human brain, as mentioned above. A plurality of units corresponding to the neurons of the human brain are complicatedly connected to each other. It is possible to embed the pattern recognizing function and the knowledge processing function in the units of the neural network by suitably deciding the operation of the respective units and the connecting state between the respective units. The structure of the neural network unit is relatively simple. It is a model of a neuron. The simple structure consists of an input portion for receiving the input from the other unity an intermediate portion for converting the received input to the other under a constant rule, and an output portion for outputting the result. The connecting portion of the respective units for connecting to the other unit has, respectively, a variable weighing "wij" attached thereto, in order to express the strength of connection. If the value of this strength is changed, the structure of the neural network is also changed. The value "w" takes positive, zero, and negative values. A zero value signifies no connection therebetween.

The neural network adopts the classified structure as shown in FIG. 56. There exists an intermediate layer between the input layer and the output layer. The intermediate layer is called a "hidden layer". The neural network of the other structure exists also as described later. Here, the explanation thereof is limited to the neural network of the classified structure in which the backpropagation algorithm can be utilized.

The network takes a structure in which the input layer, the intermediate layer, and the output layer are connected to each other in the direction of the above order. There is neither connection in the respective (same) layers, nor connection in the direction from the output layer to the input layer. The network is a feedforward type, that is, the network advancing only forward. It takes a structure similar to the "perception". The ability of the network has been enhanced prominently, by arranging the intermediate layer therebetween and making nonlinear the input/output characteristics of each unit.

The studying of the network is executed as follows. First, the input data is applied to the respective units of the input layer. Next, the input signals (data) are converted to their respective units, and the converted signals are transmitted to the intermediate layer. Finally, the signals are discharged from the output layer. The output values are composed with a desirable value by use of a comparator. Finally, the strength of the connection is changed so as to reduce (or eliminate) the difference therebetween. When the intermediate layer exists, the studying becomes difficult because it is impossible to know which strength of connection is the reason for the occurring error. Backpropagation is the studying algorithm of such multi-layers network proposed by Rumelhart, of the California University, San Diego, in 1986. The neural network can be classified into two types by the structure thereof, a pattern associator type and an automatic associator type, as shown in FIGS. 57a and 57b. A representative of the former type is the network proposed by Rumelhart, Hinton, et al., while that of the latter type is the network proposed by Hopfield. The pattern associator type is the network capable of converting the input pattern to the (other) output pattern. For instance, an XOR (exclusive OR) operational unit can be constructed with such a network.

On the other hand, the automatic associator type is the network in which a plurality of patterns are stored therein, and a pattern nearest to the input pattern is outputted therefrom. For instance, the faces of a hundred persons are stored as the images in the network, and when the face of a person including noise is input to the network, the network can correctly reproduce the input face. The network functions as an associator memory. The above-mentioned two types of network differ from each other in the construction and the method of storing the pattern. In the pattern associator type, each network is constructed with the respective units (neurons) in the input layer, the intermediate layer, and the output layer. Each unit is connected to the other in a direction from the input layer to the output layer. The units in the same layer (one of the respective layers) are not connected to each other. The input unit (layer) and the output unit (layer) are independent. In the automatic associator type, the input unit and the output unit are common. All units in the network are connected to each other. The operational function and the image information are stored in the memory as the connection status between the respective units and the strength of the connection. In the pattern associator type, the connection strength is changed by use of the difference between the obtained output and the desirable output.

On the other hand, in the automatic associator type, the connection strength is changed so as to discriminate the similar input patterns. The studying algorithm for both types have been already proposed. The aforementioned backpropagation is the studying algorithm of the pattern associator type.

SUMMARY OF THE INVENTION

In the single-color image processing apparatus of the aforementioned digital black-and-white copying machine or single-color printer, if the γ-correction table is created corresponding to the image input apparatus having various γ-characteristics, the values of the LUT 91 turn out to be large, the decision of the most suitable γ-correction table becomes difficult, and it requires considerable time to adjust image quality. Further, in the case of employing a multi-value printer outputting more than two values, since the γ-characteristic of the multi-value printer varies when the characteristic of the multi-value printer varies due to deterioration or toner density variation, it follows that the γ-correction table should be reestablished. Furthermore, even though the output density of the multi-value printer is constant, when the dither processing is changed over corresponding to the image area, the γ-correction table has to be reestablished.

Furthermore, the following problems to be solved have occurred in color image processing apparatuses such as the aforementioned digital color copying machine, color printer, etc.

(1) The characteristics of color dissolving filter, and the transmission factor and spectrum reflection factor are not ideal. (Refer to "Basic and Application of Electrophotographic Technology", pp. 565–576.)

(2) Duplicating of toner is not ideal. (Refer to "Basic and Application of Electrophotographic Technology", pp. 565–576.)

In connection with the above-mentioned drawbacks (1) and (2), an explanation of the characteristics of the color image, in particular, the reproducibility of the color image will be given.

At present, the silver-salt photograph seems to provide the best image quality in the field of color printing. A goal of those concerned with electrophotographic technology is to enable the image quality of the color print created by use of the electrophotography to approach that of the silver-salt photograph. The main difference betweens the image quality of the color print by the electrophotography and that of the color print by the silver-salt photography are listed below as defects of electrophotography:

(1) low density and poor depth;

(2) hardness (lacking in softness); and (3) frequent unevenness.

Those items can be expressed by the technical phrases as follows:

(1a) a problem of the color reproductivity;

(2a) another problem of the halftone reproductivity; and (3a) still another problem inherent to the electrophotographic apparatus.

Regarding the above items (1a), (2a), and (3a), a method of solving these problems at present is described in accordance with the embodiment which is executed practically.

Next, the problem of the color reproductivity will be explained. The factors exerting an influence upon color reproduction are shown in FIG. 61, in accordance with the electrophotographic process. As understood from FIG. 61, in the analog and digital systems, each has almost common factors in the developing step and the steps subsequent thereto. However, there are large differences therebetween in the respective processes until forming the latent image on the photosensitive body. The analog system and the digital system are separately described hereinafter. Prior to the description of both systems, "ANALOG" and "DIGITAL" are defined in the field of electrophotography.

An analog system is a type of system in which the image input of the original manuscript documents image to be applied to the photosensitive body is directly focused onto the photosensitive body by use of the optical member represented by the lens optic mechanism. On the other hand, a digital system is a type of system in which the line of the image is scanned by use of laser, liquid crystal shutter array, LED array, etc. Consequently, all of the systems in which the incident light signal applied to the photosensitive body are processed through the intermediate of the electric signal are digital systems. Namely, it is allowable to employ the light energy incident to the photosensitive body having two values; 0, 1 (on, off) of the binary signal but the light energy analog-modulated for one picture or one dot. In such interpretation, it is preferable or even more precise to call the system an electric signal system" rather than "digital system".

First, the analog system will be described in more detail, referring to the analog system shown in FIG. 61. In order to reproduce the color of the print image precisely following the original document, it may be ideal that the light separation (spectrum) characteristics of the light source, optical system, photosensitive body, and so, on are pan-chromatic. In practice, this cannot be realized. In the present color copying machine, a halogen or fluorescent lamp is frequently employed as the light source. FIG. 62 shows the representative emitted/separated light characteristic of the halogen lamp. In general, the energy of the halogen lamp is at high level in the range of long wavelength and at low level in the range of short wavelength. This is thus not a good light source. Therefore, it is necessary to put the peak of the light-emitting/separating characteristic in the wavelength as short as possible by increasing the density of the electric current flowing through the tungsten wire and causing brightness to be high. On the other hand, as to the fluorescent lamp, the development of fluorescent material has been highly advanced in recent years, and the materials of various light-emitting characteristics have been already put on the market. FIG. 63 shows a representative example of the separated light energy characteristic of the fluorescent lamp. However, the brightness of the fluorescent lamp sharply senses the ambient temperature and its color-temperature varies with the elapse of time. Thus, the fluorescent lamp has significant drawbacks as well. However, there exists a fluorescent lamp which includes a heater for keeping the temperature constant, and thereby always keeping the light-emitting energy constant.

Next, the representative light-separating sensitivity characteristic of the photosensitive body most frequently employed at present is shown in FIG. 64. In order to make the characteristic as pan-chromatic as possible, an impure object fitted to the respective photosensitive bodies is doped. As to the color filter for dissolving the colors of the original document into are red(R), green(G), and blue(B), it is ideal that the boundary areas between R, G, and B turn out to be very sharp and are not superposed on each other, and the transmission factor of the color filter is constant. Although the color dissolving filter employed in practice is almost ideal, there exist superposings of transmission in the boundaries between B and G and between G and R. Such superposings cause muddiness in color and the deterioration of color reproductivity. The transmission factors of respective filters differ from each other and cause disordering of the color balance.

One of the important factors for reproducing color is the ideal separated light rays reflection rate of the color developers cyan(c), yellow(Y),and magenta(M). However, the actual light separating characteristic is considerably lower in balance. The cyan toner has unnecessary absorption characteristics in the green area (it includes the magenta component), and both of the magenta and cyan toners also have unnecessary absorption characteristics to some extent in the blue area. Those characteristics create color muddiness. Further, the dispersion of toner and the transparency of resin largely exert an adverse influence as well.

Furthermore, transferring and fixing are important factors to consider. Contrary to the black-and-white image forming, there exist at least three transfer processes in color image formation. At this time, the transferring rates color-mixture of three colors, and color brilliance closely relate to the reproduction of color.

The digital system will now be described in more detail. Contrary to the conventional analog recording system, the digital recording system can express the image of color tone faithful to or even better than the image of the original manuscript document, and new functions achieved by performing basically the image reproduction by use of the two-dimensional (square measure) halftone method and executing an adequate image processing.

Regarding the color reproductivity, there are two fundamental functions as follows:

1) repeatability or consistency of the color reproductivity, and
2) faithful reproductivity of the color (color matching to the original manuscript document).

The repeatability of the color reproductivity depends on the stability of the halftone reproductivity based on the binarizing method.

In the faithful reproductivity of the color, the evaluation of its reproductivity can be obtained by the color difference E between the original image and the reproduced image. However, in case that the general manuscript document covers wide varieties of print, silver-salt photograph, and further TV image, the image reproducing areas differ from each other individually, and thereby it is necessary to adequately correct the respective input systems. For instance, in the case of the silver-salt photograph image, the density of the transmission manuscript document will be at least three. The density of the recording toner is usually approximately 1.4 to 1.8. For this reason, in order to evaluate both reproductivities, it is necessary to take into consideration not only the color difference E therebetween but the difference of the density reproducing areas.

As mentioned in the above item of the analog system, the color reproducing area is determined by the employed toner. FIG. 65 shows the coordinate of the color factor on the CIE color factor diagram. As is apparent from FIG. 65, although the color toner printing in the color reproducing area is slightly inferior to the silver-salt color printing, the color reproducing quality level thereof is nearly equal to that of the high-grade press printing. The color tone itself is on the high standard level. Since there is much unnecessary absorption of the respective color toners, it is necessary to execute color correction processing.

Next, the color reproducing system will be described. FIG. 66 is a block diagram showing an example of the digital image processing system for reproducing color. Usually, the respective processing portions are constructed with the hardware having pipeline structure, so as to perform the processing steps in order, and output the processed signals respectively.

The respective portions are described hereinafter.
1) Sensor Portion:
   In order to perform the color processing, it is necessary to prepare the three-colors instantaneously-read-out optical system as the sensor.

As in the case of the analog system, the halogen or fluorescent lamp having broad light-separating characteristics is usually employed. As to the reading-out optical system, there is a system employing the reduction-type lens and a three-color dissolving optical system, and another system employing the selflock lens array and the elongated sensor. From the viewpoint of the light intensity, the latter is more profitable.

In the light-separating characteristics of the color reading-out sensors, the peaks of B, G, and R appear on each region, and the respective characteristics of B, G, and R overlap each other to a certain extent.

2) A-D Converter:
   The analog outputs (r, g, and b) from the sensor are respectively converted to the digital signals of 8-bit for each color.

3) Shading Correction:
   The purpose of executing shading correction is to correct the unevenness of the sensitivity of each pixel of the sensor and to correct the unevenness of the illumination. Since the details on the shading correction has been described already, they are omitted here.

4) Matrix Operating Portion:
   Usually, the light separating characteristic of the reading-out sensor deviates from the ideal characteristic due to the restriction of the dyestuffs, etc. Therefore, the linear operation is performed by use of a 3×3 matrix, and thereby the color correction is performed in accordance with the brightness data. The non-linear conversion has to be performed between the brightness data and the density data.

5) Density Conversion:
   The R, G, and B data are converted to Y, M, and C density data.

The conversion from the brightness (reflection energy) data X to the density data X is executed in accordance with the following equality;

$$X' = -\log X.$$

In the case of performing color image conversion from X to X', it is executed in accordance with the following equalities;

$$Y = -\log B,$$

$$M = -\log G,$$

and $$C = -\log R.$$

6) Color Processing—Color Correction:
   The color processing steps such as masking, inking, UCR, etc,. are performed on the basis of the density data of Y, M, and C.

7) γ-Correction:
   The contrast and brightness of the image data after color processing can be adjusted using γ-correction, and further the desirable color can be created. Such adjustment and creation can be done in accordance with the dynamic range and the halftone characteristic of the subsequent-stage printer. Furthermore, the outputting fitted to the printer can be performed.

8) Binary Processing:
   The image data variously processed in the preceding stages are processed binarily for the binary printer.

Finally, the methods of performing the color processing and the color correction will now be described. In the color printing, an optional color can be reproduced by mixing three coloring matters (pigments) of Yellow(Y), Magenta (M), and Cyan(C).

8-1) Linear Masking Method:

8-2) Non-linear Masking Method:

8-3) (Black) Inking, UCR:

The color reproductivity in the shadow portion can be improved by adding the black toner to the three-color toners and supplementing the density in the high density area. Furthermore, the consuming amount of the color toner can be reduced and replaced by a small amount of black toner. Thereby, it is possible to strengthen the registration of the color and to improve the reproductivity of the character. The operations of removing the gray component from the three-color toners and replacing the color toners by the black toner can be called the black-ground color removal or UCR (Under Color Removal).

To state it in more detail, the characteristics of the color dissolving filter are not ideal. Namely, although the characteristic of the color dissolving filters transmission factor shown in FIG. 35 is ideal, the actual characteristics of the color dissolving filters transmission factor are as shown in FIG. 36. For this reason, color muddiness occurs and therefore the color reproductivity deteriorates. Furthermore, although the characteristic of the spectrum factor of each color toner shown in FIG. 37 is ideal, the actual characteristics of each color toners spectrum factor is as shown in FIG. 38. And further, the characteristic of each color toners spectrum transmission factor is not ideal. Such characteristics cause the above color muddiness.

Furthermore, since the duplicating of each color toner is not ideal as shown in FIG. 39, color conversion and color correction are performed by use of a masking method. Only by the single color γ-correction, the output image density becomes linear by perform γ-correction of the printer as shown in FIG. 6 after performing the γ-correction of the scanner as shown in FIG. 4. In the case of UCR, the gray component in the three-color toner is removed and the removed component is replaced by the black component. Therefore, in the output γ-correction portion, the correction has to be performed so as to reproduce the gray component when the amounts of the three-color toners are equal to each other. Since the density characteristics after duplicating the respective color toners are nonlinear for the amount of the respective color toners, it is difficult to select the most suitable γ-correction curve in the LUT.

The present invention was made in consideration of the above-mentioned problems. It is an object of the present invention to remove the above-mentioned defects. It is another object of the present invention to create or select the most suitable γ-correction curve in the single-color or color image processing apparatus. It is still another object of the present invention to provide a γ-correction curve selecting apparatus and γ-correction curve creating apparatus capable of creating or selecting the most suitable γ-correction curve and thereby shortening the image quality adjusting time in the single-color or color image processing apparatus.

BRIEF DESCRIPTION OF THE DRAWINGS

FIG. 18 is a diagram showing the conversion table of the γ-characteristic selecting circuit in the fifth embodiment;

FIG. 21 is a diagram showing the construction of the color patch in the seventh embodiment;

FIGS. 39a through 39c are diagrams showing the color mixture model of toner;

DETAILED DESCRIPTION OF THE PREFERRED EMBODIMENTS

Figure 1:
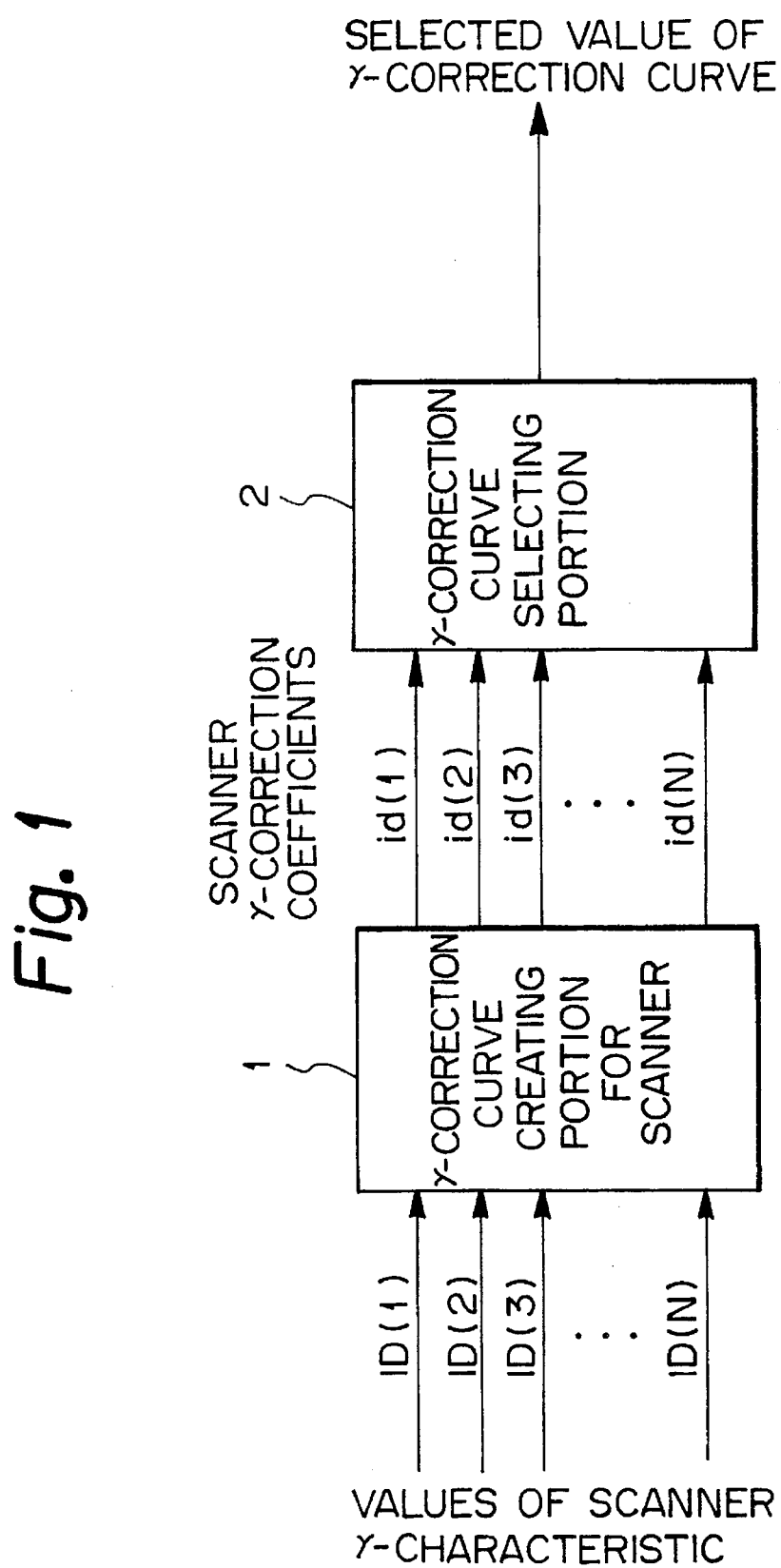
FIG. 1 is a block diagram showing the first embodiment according to the present invention.
Figure 2:
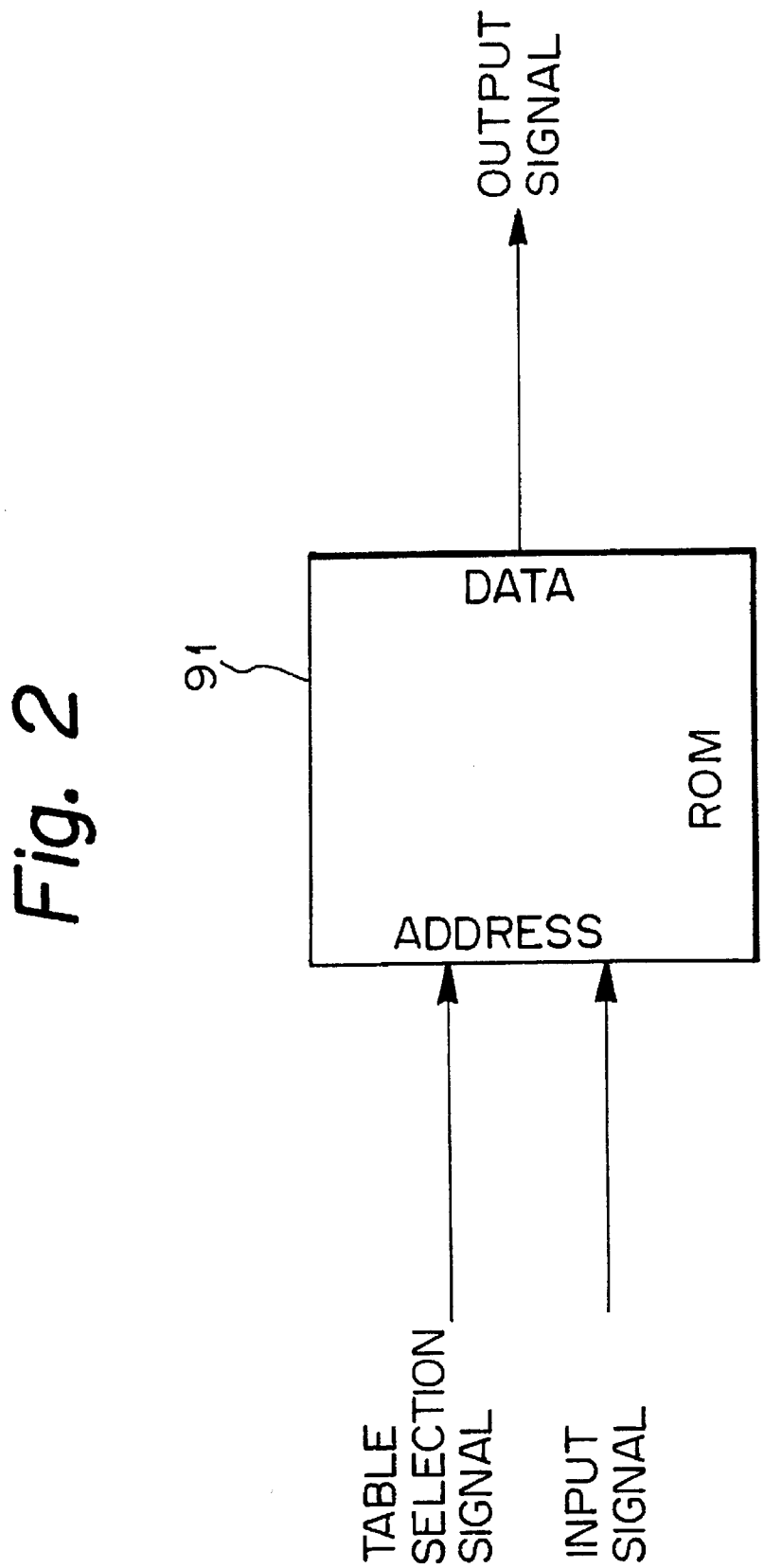
FIG. 2 is a block diagram showing the LUT employed in the first embodiment.

In order to attain the above-mentioned objects, in the first embodiment according to the present invention, the image processing apparatus for correcting the γ-characteristic of the density value for each picture element of the original image to be processed and the output value of the image processing means in the predetermined apparatus for inputting the image or the γ-characteristic of the writing-in value of the image processing means in the predetermined apparatus for outputting the image density comprises (1) a γ-correction curve creating means for creating the γ-correction curve in accordance with the input γ-characteristic, and (2) a γ-correction curve selecting means for selecting the most suitable γ-correction curve among a plurality of γ-correction curves in accordance with the γ-correction curve from the γ-correction curve creating means.

In the second embodiment according to the present invention, the image processing apparatus for compensating the γ-characteristic of the density value for each picture element of the original image to be processed and the output value of the image processing means in the predetermined apparatus for inputting the image or the γ-characteristic of the writing-in value of the image processing means in the predetermined apparatus for outputting the image and the output image density comprises (1) a γ-correction curve creating means for creating the γ-correction curve from the input γ-characteristic, and (2) a γ-correction curve selecting means, having a neural network previously studied in which the γ-correction curves from the γ-correction curve creating means are input and selected one of the γ-correction curves is input, and selecting the most suitable γ-correction curve from the plural γ-correction curves by use of the above neural network.

In the third embodiment according to the present invention, the image processing apparatus for correcting the γ-characteristic of the density value for each picture element of the original image to be processed and the output value of the image processing means in the predetermined apparatus for inputting the image or the γ-characteristic of the writing-in value of the image processing means in the predetermined apparatus for outputting the image, where the output image density comprises (1) a γ-characteristic curve creating means for creating the γ-characteristic curve, and (2) a γ-correction curve creating means for creating the most suitable γ-correction curve from the output of the γ-characteristic curve creating means.

In the fourth embodiment according to the present invention the image processing apparatus for correcting the γ-characteristic of the density value for each picture element of the original image to be processed and the output value of the image processing means in the predetermined apparatus for inputting the image or the γ-characteristic of the writing-in value of the image processing means in the predetermined apparatus for outputting the image and the output image density comprises (1) a γ-characteristic curve creating means constructed with the neural network in which the γ-characteristic curve has been studied previously, and (2) a γ-correction curve creating means for creating the most suitable γ-correction curve from the output of the γ-characteristic curve creating means.

In the fifth embodiment according to the present invention, the image processing apparatus having the scanner γ-correction means for correcting the relationship between the input image density and the scanner output value as a part of image processing system comprises (1) a temperature sensor for sensing the temperature at the time of measuring the scanner γ-characteristic, a scanner γ-characteristic curve creating means for outputting the scanner γ-characteristic value in accordance with the output signal of the temperature sensor, and (2) a γ-correction curve creating means for creating the most suitable γ-correction curve from the output of the scanner γ-characteristic curve creating means.

In the sixth embodiment according to the present invention, the aforementioned scanner γ-characteristic curve creating measure of the γ-correction curve creating apparatus described in the fifth embodiment is constructed with a neural network in which the above relationship between the output signal of the temperature sensor and the scanner γ-characteristic is studied previously.

In the seventh embodiment according to the present invention, a color image processing apparatus comprises a color dissolving means for color-dissolving and reading out the manuscript document, a color print means for creating color manuscript document, and a γ-correction means for performing the γ-correction of the color print means. The above color image printing apparatus further comprises:

a color patch creating means for creating a color manuscript document of optional color from the above color print means, a color density estimating means constructed with a neural network which has been previously studied so as to input the color dissolving signal from the above color dissolving means and output the density value for each color component for the color manuscript document output from the aforementioned color print means, an achromatic color presuming means for estimating whether or not the aforementioned color manuscript document is achromatic from the color dissolving signal emitted from the above, color dissolving means, a color density value for each color component for the color manuscript document from the color dissolving signal emitted from the above color dissolving means, and a γ-correction curve creating means for creating the γ-correction curve by the outputs of the color density estimating means and the achromatic color estimating means.

In the eighth embodiment according to the present invention, the γ-correction curve creating apparatus for converting the density value for each color component color-dissolved for each picture element of the color image by use of the predetermined color dissolving apparatus to the value to the image processing means for each color component in the predetermined color image processing apparatus comprises:

an achromatic color density presuming means for estimating the density value for each color component when the aforementioned predetermined color image processing apparatus outputs the achromatic color, a γ-characteristic value of the image processing means for each component in the aforementioned predetermined color image processing apparatus, and a γ-correction curve creating means for creating the γ-correction curve from the γ-characteristic value from the γ-characteristic estimating means and the density value for each color component of the aforementioned achromatic color presuming measure.

In the ninth embodiment according to the present invention, the aforementioned achromatic color density estimating means of the γ-correction curve creating apparatus described in the eighth embodiment is constructed with a neural network in which the aforementioned achromatic color density is studied previously so as to estimate the density value for each color component when the aforementioned predetermined color image processing apparatus outputs the achromatic color.

In the tenth embodiment according to the present invention, the γ-correction curve creating apparatus for creating the γ-correction curve for each color component in order to convert the density value for each color component color-dissolved for each picture element to the image processing means for each color component in the predetermined color image processing apparatus by use of the predetermined color dissolving apparatus comprises:

an achromatic color density estimating means for presuming the density value for each color component from the brightness of the achromatic color when the aforementioned predetermined color image processing apparatus outputs the achromatic color, a γ-characteristic estimating means for presuming the γ-characteristic of the image processing means for each color component in the aforementioned predetermined color image processing apparatus, and a γ-correction curve creating means for creating the γ-correction curve for each color component from the γ-characteristic emitted from the γ-characteristic estimating means such that the aforementioned achromatic color estimating means becomes linear.

In the eleventh embodiment according to the present invention, the aforementioned achromatic color density estimating means of the γ-correction curve creating apparatus described in the tenth embodiment is constructed with a neural network in which the aforementioned predetermined color image processing apparatus is studied previously such that the brightness at the time of outputting the achromatic color is input and the density value for each color component at the time of outputting the achromatic color.

In the twelfth embodiment according to the present invention, the color image processing apparatus comprising a color dissolving means for color-dissolving and reading out the manuscript document, a color print means for creating the color manuscript document, and a γ-correction means for performing the γ-correction of color print means further comprises:

an achromatic color density estimating means for presuming the density value for each color component from the color dissolving signal emitted from the aforementioned color dissolving means when the color image processing apparatus outputs the achromatic color, a γ-characteristic estimating means for estimating the γ-characteristic of the image processing means for each color component in the aforementioned color image processing apparatus, and a γ-correction curve creating means for creating the γ-correction curve for each color component from the γ-characteristic emitted from the γ-characteristic estimating means such that the achromatic color density estimating value of the aforementioned achromatic color density estimating means.

In the thirteenth embodiment according to the present invention, the aforementioned achromatic color density estimating means of the γ-correction curve creating apparatus described in the twelfth embodiment is constructed with a neural network which estimates the density value for each color component from the color dissolving signal emitted from the aforementioned color dissolving means when the predetermined color image processing apparatus outputs the achromatic color.

In the fourteenth embodiment according to the present invention, the image processing apparatus for correcting the first γ-characteristic of the writing-in value to be input in the above dither processing means of the image processing means in the apparatus having a dither processing means, and a multi-value outputting apparatus in which the output signal of the dither processing means is input and at least two or more values can be output, wherein the output image of the above multi-value outputting apparatus comprises:

a γ-characteristic curve creating means for creating the above first γ-characteristic from the input signal of the second γ-characteristic of the above multi-value outputting apparatus and the output image, and a γ-correction curve creating portion for creating the most suitable γ-correction curve from the output of the γ-characteristic curve creating measure.

In the fifteenth embodiment according to the present invention, the image processing apparatus for correcting the first γ-characteristic of the writing-in value to be input in the above dither processing means of the image processing portion in the apparatus having at least two or more types of dither processing means, a dither processing selection means for changing over the two or more dither processing means, and a multi-value outputting apparatus in which the output signal of the dither processing selection means can be input and two or more value can be output, wherein the output image of the above multi-value outputting apparatus comprises:

a γ-characteristic curve creating means for creating two or more types of the above first γ-characteristic from the second γ-characteristic of the input signal of the above multi-value outputting apparatus and the output image of the same, a γ-characteristic selecting means for selecting two or more types of the first γ-characteristic emitted from the above γ-characteristic curve creating means in accordance with the selection signal of the above dither processing selection means, and a γ-correction curve creating means for creating the γ-correction curve from the γ-characteristic emitted from the γ-characteristic selecting means.

In the sixteenth embodiment according to the present invention, the image processing apparatus for correcting the first γ-characteristic of the writing-in value to be input in the above dither processing means of the image processing portion in the apparatus comprises:

at least two types of dither processing means.

a dither processing selection means for changing over the two or more dither processing means, and a multi-value outputting apparatus in which the output signal of the dither processing selection means can be input and two or more values can be output, and the output image of the above multi-value outputting apparatus, and the image processing apparatus further comprises:

a γ-characteristic curve creating means for creating the above first γ-characteristic from the second γ-characteristic of the input signal of the above multi-value outputting apparatus and the output image of the same in accordance with the selection signal of the above dither processing selection means, and a γ-correction curve creating means for creating the γ-correction curve from the γ-characteristic emitted from the γ-characteristic curve creating means.

In the seventeenth embodiment according to the present invention, the above γ-characteristic curve creating means of the γ-correction curve creating apparatus described in the fourteenth or fifteenth embodiment is constructed with an approximation means for performing the approximation of the γ-characteristic curve by use of a function-approximation method.

In the eighteenth embodiment according to the present invention, the above γ-characteristic curve creating means of the γ-correction curve creating apparatus described in the fourteenth and fifteenth embodiments includes a neural network which studies the γ-characteristic curve previously.

In the first embodiment, the γ-correction curve creating means creates the γ-correction curve from the input γ-characteristic, and the γ-correction curve selecting means selects the most suitable γ-correction curve from the plural γ-correction curve from the γ-correction curve emitted from the γ-correction curve creating means.

In the second embodiment, the γ-correction curve creating means creates the γ-correction curve from the input γ-characteristic, and the neural network receives the γ-correction curve from the γ-correction curve creating means and selects the most suitable γ-correction curve from the plural γ-correction curves.

In the third embodiment, the γ-characteristic curve creating means creates the γ-characteristic curve, and the γ-correction curve creating means creates the most suitable γ-correction curve from the output of the γ-characteristic curve creating means.

In the fourth embodiment, the neural network creates the γ-characteristic curve, and the γ-correction curve creating means creates the most suitable γ-correction curve from the output of the neural network.

In the fifth embodiment, the temperature sensor senses the temperature at the time of measuring the scanner γ-characteristic, and the scanner γ-characteristic curve creating means outputs the scanner γ-characteristic value in accordance with the output signal of the temperature sensor. And further, the correction curve from the output of the scanner γ-characteristic curve creating means.

In the sixth embodiment, the scanner γ-characteristic curve creating means constructing with the neural network in the γ-correcting curve creating apparatus described in the fifth embodiment outputs the scanner γ-characteristic value in accordance with the temperature sensor.

In the seventh embodiment, the color patch creating means causes the color print measure to create the color manuscript document of optional color, and the color density estimating means constructed with neural network receives the color dissolving signal from the color dissolving means and outputs the density value for each color component for the color manuscript document outputted from the color print means. The achromatic color estimating means estimates whether the color manuscript document is achromatic from the color dissolving signal emitted from the color dissolving signal, and the color density estimating means estimates the density value for each color component for the color manuscript document from the color dissolving signal emitted from the color dissolving means. And further, the γ-correction curve creating means creates the γ-correction curve by the outputs of the color density estimating means.

In the eighth embodiment, the achromatic color density estimating means estimates the density value for each color component when the color image processing apparatus outputs the achromatic color, and the γ-characteristic presuming means presumes the γ-characteristic value of the image processing means for each color component in the predetermined color image processing apparatus. And further, the γ-correction curve creating means creates the γ-correction curve from the γ-characteristic value emitted from the γ-characteristic estimating means and the density value for each color component of the achromatic color estimating means.

In the ninth embodiment, the achromatic color density estimating means constructed with the neural network in the γ-correction curve creating apparatus described in the eighth embodiment estimates the density value for each color component when the predetermined color image processing apparatus outputs the achromatic color.

In the tenth embodiment, the achromatic color density estimating means estimates the density value for each color component from the brightness of the achromatic color when the predetermined color image processing apparatus outputs the achromatic color, and the γ-characteristic estimating means estimates the γ-characteristic of the image processing means for each color component in the predetermined color image processing apparatus. And further, the γ-correction curve creating means creates γ-correction for each color component from the γ-characteristic emitted from the γ-characteristic estimating means such that the brightness of the achromatic estimating means becomes linear.

In the eleventh embodiment, the achromatic density estimating means constructed with the neural network in the γ-correction curve creating apparatus described in the tenth embodiment receives the brightness when the predetermined color image processing apparatus outputs the achromatic color and outputs the density value for each color component.

In the twelfth embodiment, the achromatic color density estimating means estimates the density value for each color component from the color dissolving signal emitted from the color dissolving means when the color image processing apparatus outputs the achromatic color, and γ-characteristic estimating means estimates the γ-characteristic of the image processing means for each color component in the color image processing apparatus. Additionally, the γ-correction curve creating means creates the γ-correction curve for each color component from the γ-characteristic emitted from the γ-characteristic estimating means such that the achromatic color density estimating value of the achromatic color density estimating means becomes linear.

In the thirteenth embodiment, the achromatic color density estimating means constructed with the neural network of the γ-correction curve creating apparatus described in the twelfth embodiment estimates the density value for each color component when the predetermined color apparatus outputs the achromatic color.

In the fourteenth embodiment, the γ-characteristic curve creating means creates the first γ-characteristic from the second γ-characteristic of the input signal of the multi-value outputting apparatus and the output image of the same, and the γ-correction curve creating portion creates the most suitable γ-correction curve from the output of the γ-characteristic curve creating means.

In the fifteenth embodiment, the γ-characteristic curve creating means creates two or more types of the first γ-characteristic from the second γ-characteristic of the input signal of the multi-value outputting apparatus and the output image of the same, and the γ-correction curve creating means creates the γ-correction curve from the γ-characteristic curve from the γ-characteristic emitted from the γ-characteristic selecting means.

In the sixteenth embodiment, the γ-characteristic curve creating means creates the first γ-characteristic from the second γ-characteristic of the input signal of the multi-value outputting apparatus in accordance with the selection signal of the dither processing selection means, and the γ-correction curve creating means creates the γ-correction curve from the γ-characteristic curve creating means.

In the seventeenth embodiment, the γ-characteristic curve creating means of the γ-correction curve creating apparatus described in the fourteenth and fifteenth embodiments causes the γ-characteristic curve to be approximated by use a functionapproximation method.

In the eighteenth embodiment, the γ-characteristic curve creating means constructed with the neural network in the γ-correction curve creating apparatus described in the fourteenth and fifteenth embodiments creates the first γ-characteristic from the second γ-characteristic.

DETAILED DESCRIPTION OF THE PREFERRED EMBODIMENTS

FIG. 1 shows the first embodiment according to the present invention.

The first embodiment is one example of the γ-correction curve selecting apparatus for selecting the γ-correction curve of the scanner. The γ-correction curve selecting apparatus comprises:

- a γ-correction curve creating portion 1 for the scanner which outputs the γ-correction coefficients id(1)– id(N) of the scanner on the basis of the γ-characteristic values (output values) ID(1)–ID(N) of the scanner, and
- a γ-correction curve selecting portion 2 for selecting the most suitable γ-correction curve for the scanner from among the plural γ-correction curves on the basis of the γ-correction coefficients id(1)–id(N) emitted from the γ-correction creating portion 1 and outputting the correction curve selecting value.

Figure 4:
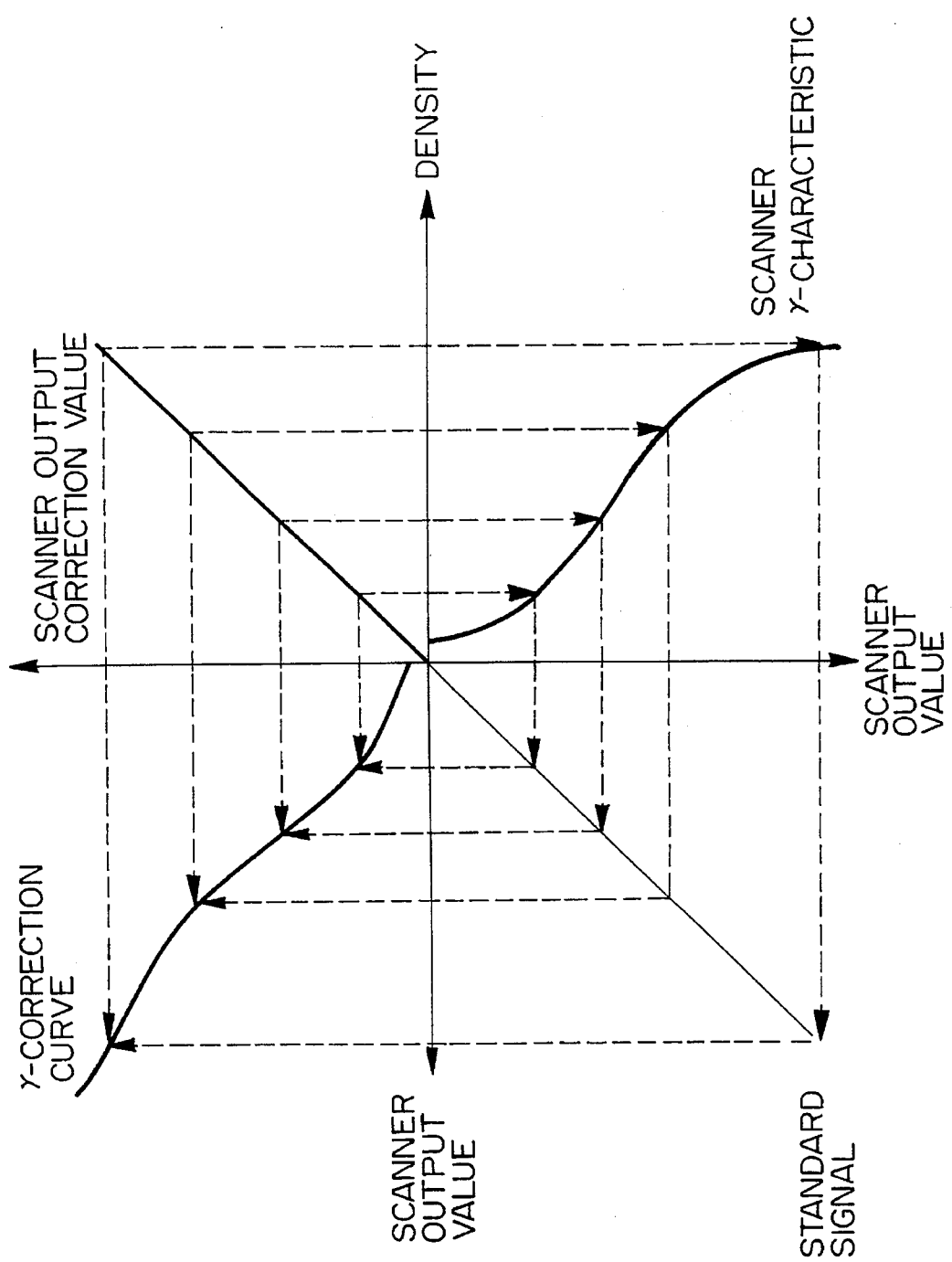
FIG. 4 is a diagram showing another example of the relationship between the scanner γ-characteristic and the γ-correction curve.

The output values of the scanner (γ-characteristic value of the scanner) ID(1)–ID(N) previously measured by the scanner by use of the standard manuscript document are input to in the γ-correction curve creating portion 1 for the scanner, and the γ-correction curve creating portion 1 creates the most suitable γ-correction curve for the scanner on the basis of the input values. The γ-correction coefficients id(1)–id(N) are input to the γ-correction curve selecting portion 2 from the γ-correction curve creating portion 1, and the γ-correction curve selecting portion 2 selects the most suitable γ-correction curve for the scanner among the plural γ-correction curves on the basis of the input coefficient values and outputs the selected correction curve value. The γ-correction creating portion 1 for the scanner creates the γ-correction curve of the scanner as shown in FIG. 4.

In the first embodiment, the γ-correction curve creating portion 1 for the scanner outputs the γ-correction coefficients id(1)–id(N) on the basis of the γ-characteristic values (output values) ID(1)–ID(N), while the γ-correction curve selecting portion 2 selects the most suitable γ-correction curve for the scanner among the plural γ-correction curves on the basis of the γ-correction coefficients id(1)–id(N) from the γ-correction curve creating portion 1 and outputs the selected value of the γ-correction curve. Consequently, the γ-correction curve most suitable for the scanner can be selected, and further the image quality adjusting time for the image processing apparatus such as the copying machine employing the scanner can be shortened.

Figure 5:
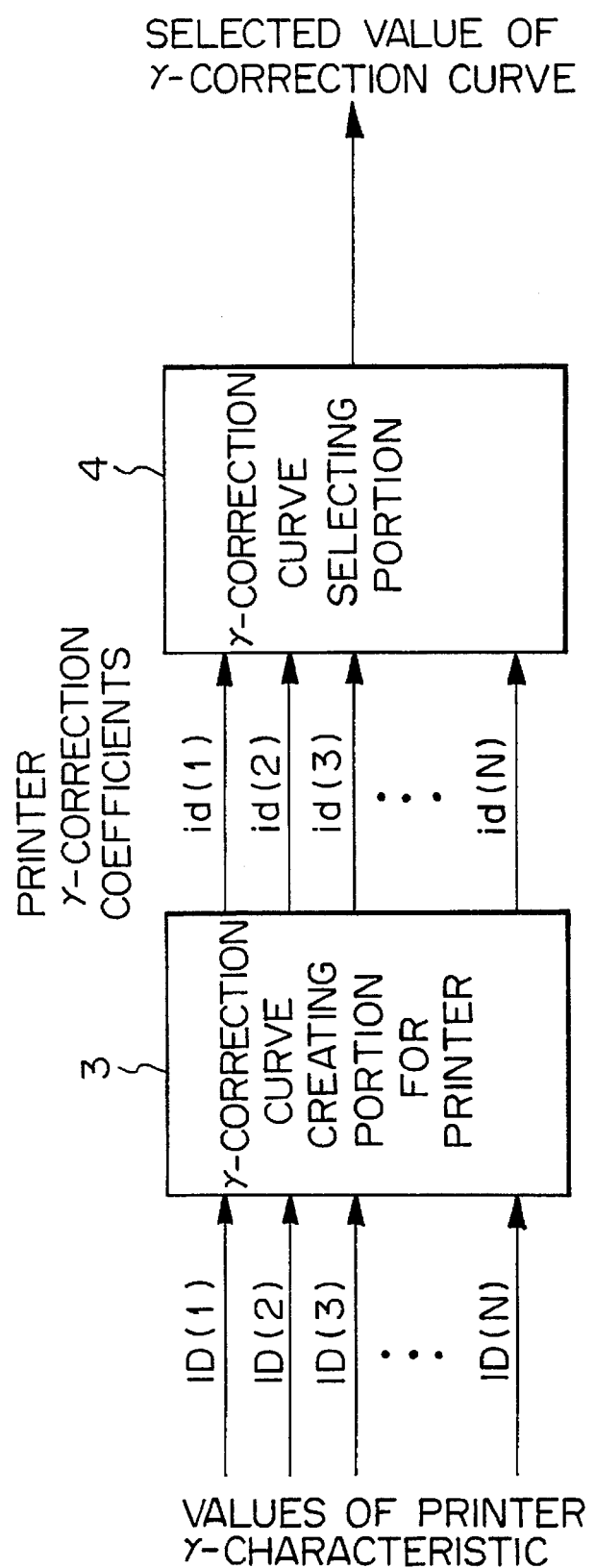
FIG. 5 is a block diagram showing a modification of the first embodiment.

FIG. 5 is a block diagram showing a modification of the first embodiment.

The modification is one example of the γ-correction curve selecting apparatus for selecting the γ-correction of the printer. The γ-correction curve selecting apparatus comprises:

a γ-correction curve creating portion 3 for the printer for outputting the γ-correction coefficients of the printer id(1)–id(N) on the basis of γ-characteristic value of the printer ID(1)–ID(N), and a γ-correction curve selecting portion 4 for selecting the most suitable γ-correction curve from among the plural γ-correction curves on the basis of the γ-correction coefficients id(1)–id(N) from the γ-correction curve creating portion 3 and for outputting the γ-correction curve selection value.

Figure 6:
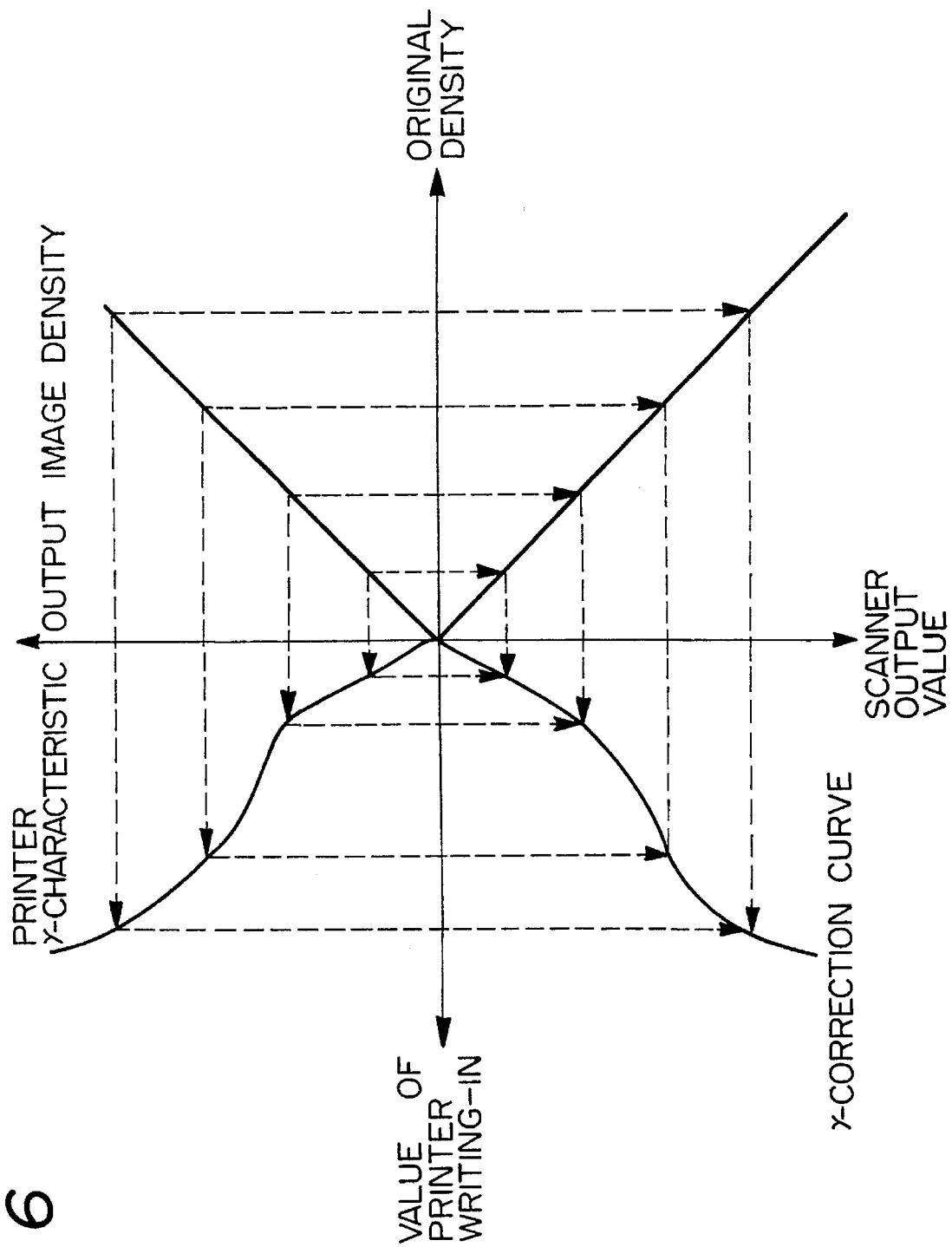
FIG. 6 is a diagram showing the relationship between the γ-characteristic of single-color printer and the γ-correction curve.

The output image density for the previously-measured printer writing-in values 1-n, those are, the γ-characteristic values of the printer ID(1)–ID(N) are input in the γ-correction curve creating portion 3 for the printer. The γ-correction curve creating portion 3 creates the most suitable γ-correction curve on the basis of the input values. The γ-correction coefficients id(1)–id(N) are input in the γ-correction curve selecting portion 4 from the γ-correction curve creating portion 3, and the γ-correction curve creating portion 3 selects the most suitable γ-correction curve among the plural γ-correction curves on the basis of the input coefficients and outputs the γ-correction curve selection value. The γ-correction curve creating portion 3 for the printer creates the γ-correction curve of the printer as shown in FIG. 6.

In a modification of the first embodiment, the γ-correction curve creating portion 3 for the printer outputs the γ-correction coefficients id(1)–id(N) of the printer on the basis of the γ-characteristic values ID(1)–ID(N) of the printer.

The γ-correction curve selecting portion 4 selects the most suitable γ-correction curve among the plural γ-correction curve on the basis of the γ-correction coefficients id(1)–id(N) from the γ-correction curve creating portion 3 and outputs the γ-correction curve selection value. Consequently, the γ-correction curve most suitable for the printer can be selected, and thereby the image quality adjusting time of the image processing apparatus such as the printer or the copying machine can be shortened.

Moreover, in the color scanner, the scanner portion of the color copier, the color printer, or the printer portion of the color copier, the γ-correction curve is created in the γ-correction curve creating portions 1 and 3 as in the case of the modification of the first embodiment, and the most suitable γ-correction curve is selected among the plural γ-correction curves in the γ-correction curve selecting portions 2 and 4 by the output of the γ-correction curve creating portions, and the γ-correction curve selecting portions output the selected value of the γ-correction curve.

Figure 7:
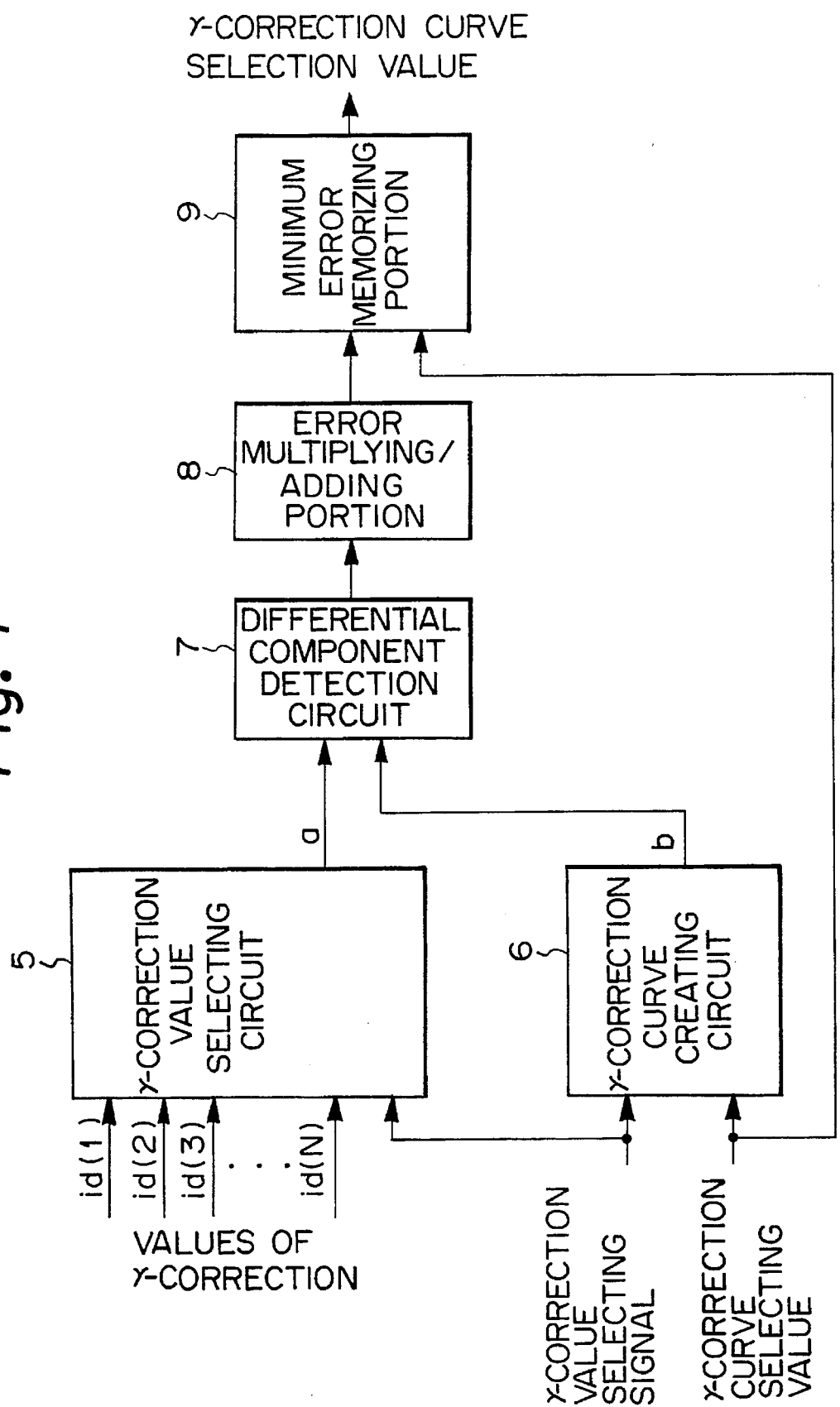
FIG. 7 is a block diagram showing the construction of the γ-correction curve selecting portions in a modification of the first embodiment.

FIG. 7 is a block diagram showing the construction of the γ-correction curve selecting portions 2 and 4 in the modification of the first embodiment.

The γ-correction curve selecting portion is constructed with a γ-correction value selecting circuit 5 to which the γ-correction values id(1)–id(N) and the γ-correction value selecting signal are input, the γ-correction curve creating circuit 6 to which the γ-correction selecting signal and the γ-correctional curve selecting value are input, a differential component detection circuit 7 detecting the differential component between the output a of the γ-correction value selecting circuit 5 and the output b of the γ-correction curve creating circuit 6, an error multiplying/adding portion 8 for multiplying and adding the error from the differential component detection circuit 7, and a minimum error storing portion 9 for outputting the γ-correction curve selecting value by the γ-correction curve selecting value and the output of the error multiplying/adding portion 8.

The γ-correction value selecting circuit 5 selects one of the γ-correction values id(1)–id(N) from the γ-correction curve creating portions 1 and 3 by use of the γ-correction value selecting signal and outputs the selected γ-correction value as the γ-correction value a. The γ-correction curve creating circuit 6 selects one γ-correction curve among the plural γ-correction curves by use of the γ-correction curve selecting value and further selects the respective γ-correction values of the selected γ-correction curve by use of the γ-correction value selecting signal.

The differential component detection circuit 7 obtains an absolute value of the difference between the γ-correction value a from the γ-correction value selecting circuit 5 and the γ-correction value b from the γ-correction curve creating circuit 6 and outputs the obtained absolute value. The error multiplying/adding portion 8 performs the operation of multiplying and adding the output of the differential component detection circuit n-times ("n" is the number of the γ-correction values, namely, "n" is the number of the γ-correction value selection by use of the γ-correction value selecting signal). The minimum error storing portion 9 takes out the minimum value of the error multiplying/adding portion 8 per each γ-correction curve by use of the γ-correction value selecting value and stores the γ-correction curve selecting value at the time of taking out the minimum value thereof. Consequently, all of the plural γ-correction curves which are kept in the γ-correction curve creating circuit 6 are selected in order, and thereby the error between the above-selected curve and the γ-correction curve from the γ-correction curve creating portions 1 and 3 is obtained. The γ-correction curve most suitable for the scanner or the printer is selected and the selected γ-correction curve value is stored in the minimum error storing portion 9.

Now, the second embodiment of the present invention will be explained. In the above-mentioned first embodiment and its modification, in order to calculate the error between the many γ-correction curves kept in the interior of the γ-correction curve selecting portions 2 and 4 at the time of selecting one of the γ-correction curves and the γ-correction curve form the γ-correction curve creating portions 1 and 3, some calculation time is required. In order to improve this point at issue, the most suitable γ-correction curve is selected, without taking out any errors of all γ-correction curves.

Figure 8:
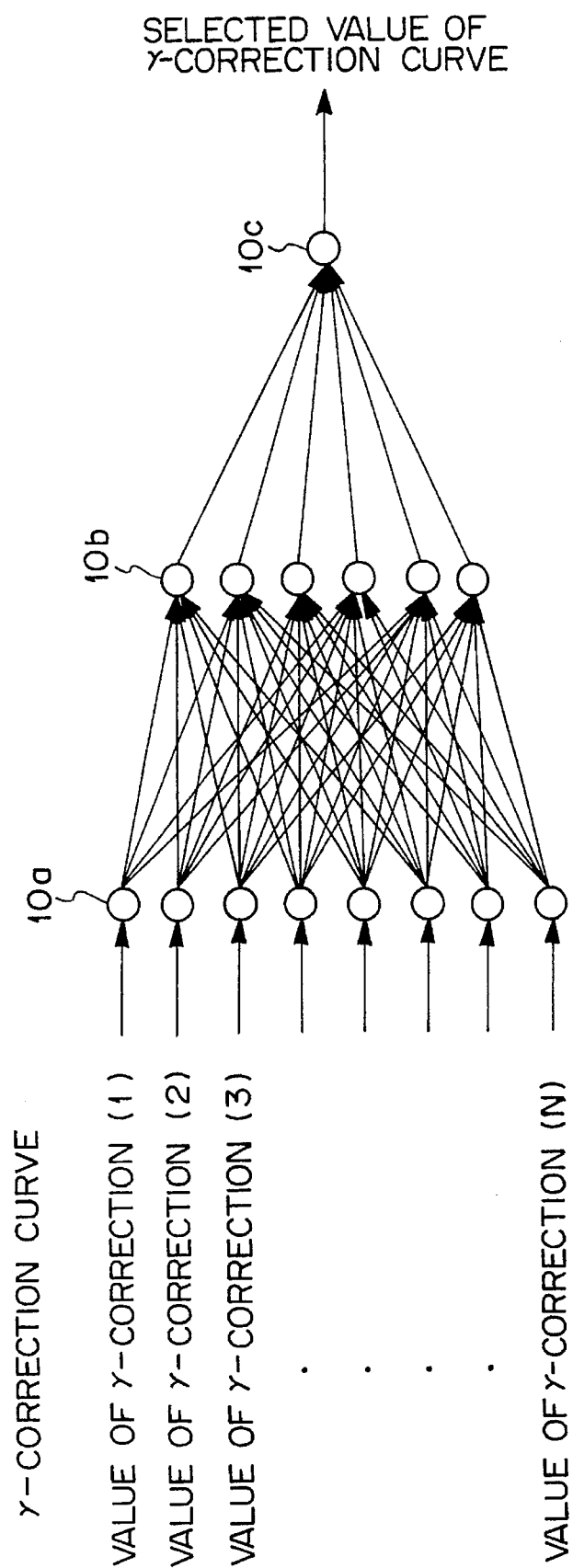
FIG. 8 is a diagram showing the construction of a neural network for selecting the γ-compensation curve in a second embodiment according to the present invention.
Figure 9:
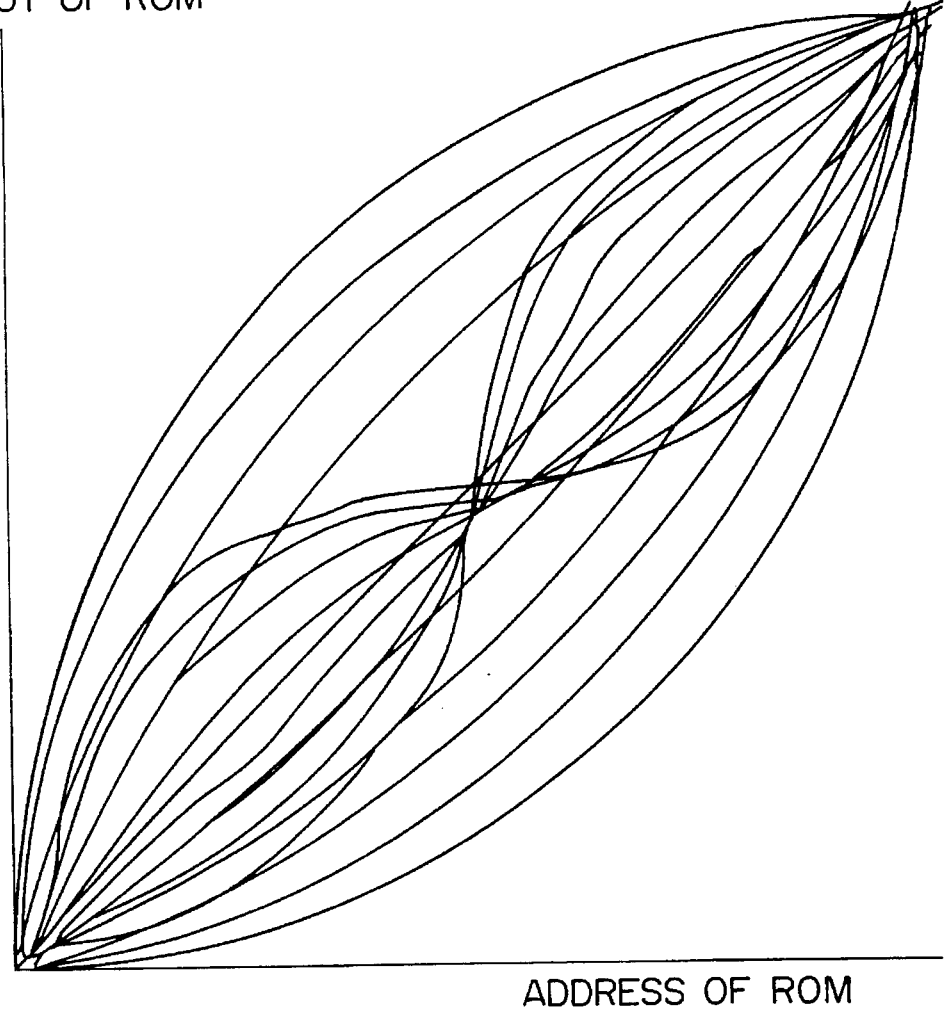
FIG. 9 is a diagram showing an example of the γ-correction curve.

In the second embodiment, the γ-correction curve selecting portions 2 and 4 of the first embodiment and its modification employs a neural network as shown in FIG. 8. The neural network comprises an input layer 10*a*, an intermediate layer 10*b*, and an output layer 10*c*. The respective γ-correction values of the plural γ-correction curves as shown in FIG. 9 are selectively input to the input layer 10*a*, and in the layer a study is previously done such that the selective value of the γ-correction curve most suitable for the scanner or the printer is out-put from the output layer 10*c*. And then, the γ-correction value of the γ-correction curve is input into the input layer 10*a*, and the most suitable γ-correction curve is selected on the basis of the input γ-correction curve. Consequently, the γ-correction curve most suitable for the scanner or the printer is selected among the plural γ-correction curves, and the selected value of the γ-correction curve is output from the output layer 10*c*. A method capable of studying the copied image of the input pattern and the output pattern, for instance, an error reversely-transmitting method is employed, as the studying algorithm of the neural network.

Since the second embodiment employs the neural network in the γ-correction curve selecting portion, the most suitable γ-correction curve can be selected, and the image quality adjusting time can be shortened in the image processing apparatus such as printer, copying machine, etc., and further the time required for selecting the γ-correction curve.

Figure 10:
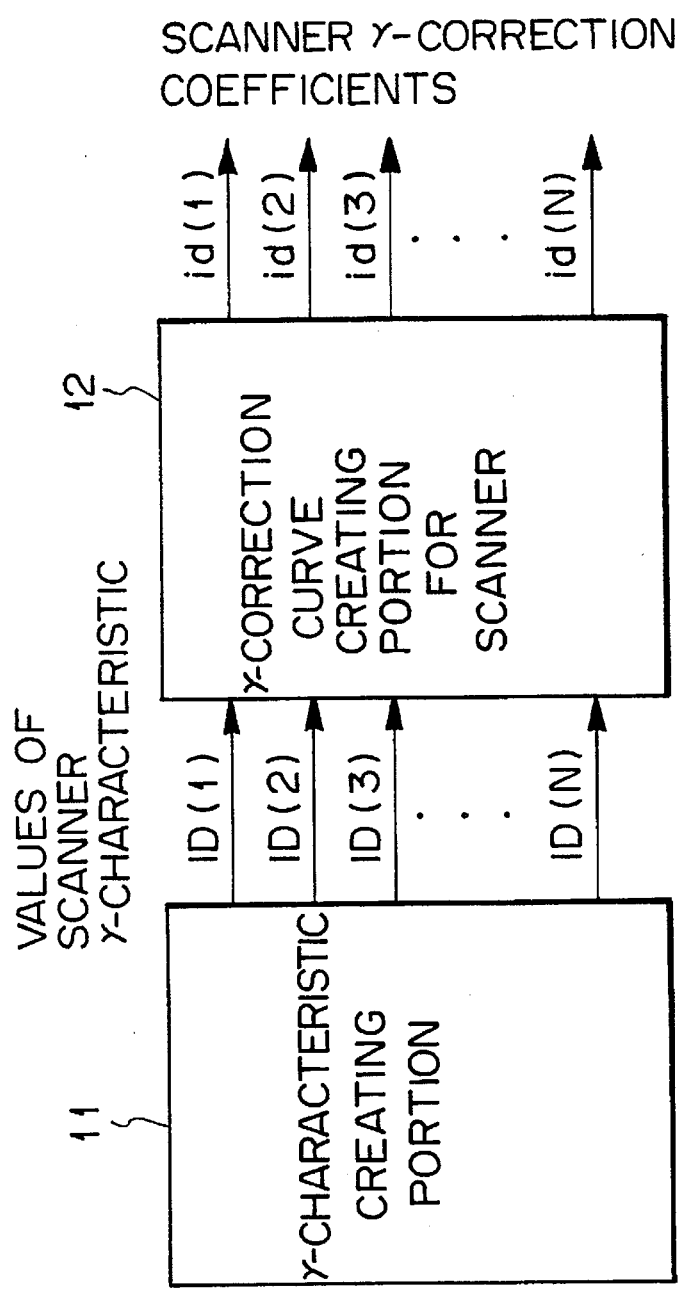
FIG. 10 is a block diagram showing a third embodiment according to the present invention.

Next, the third embodiment of the present invention is explained. In all of the above-mentioned embodiments and modifications, it is necessary to obtain all of the γ-characteristics previously. Assuming that the γ-characteristic of the scanner as shown in FIG. 4 or the γ-characteristic of the printer as shown in FIG. 6 is held, there is no need to obtain the individual γ-characteristic. FIG. 10 is a block diagram showing the third embodiment according to the present invention. In the third embodiment, the γ-characteristic creating portion 11 holding the plural γ-characteristics creates the scanner characteristic values ID(1)ID(N) of the scanner γ-characteristic curve, and the γ-correction curve creating portion 12 for the scanner creates the scanner γ-correction coefficients id(1)–id(N) of the γ-correction curve by use of the scanner characteristic values ID(1)–ID(N).

In the third embodiment, the most suitable γ-correction curve can be created, and the image quality adjusting time of the image processing apparatus such as a printer or copying machine can be shortened, and further the density can be made linear.

Figure 11:
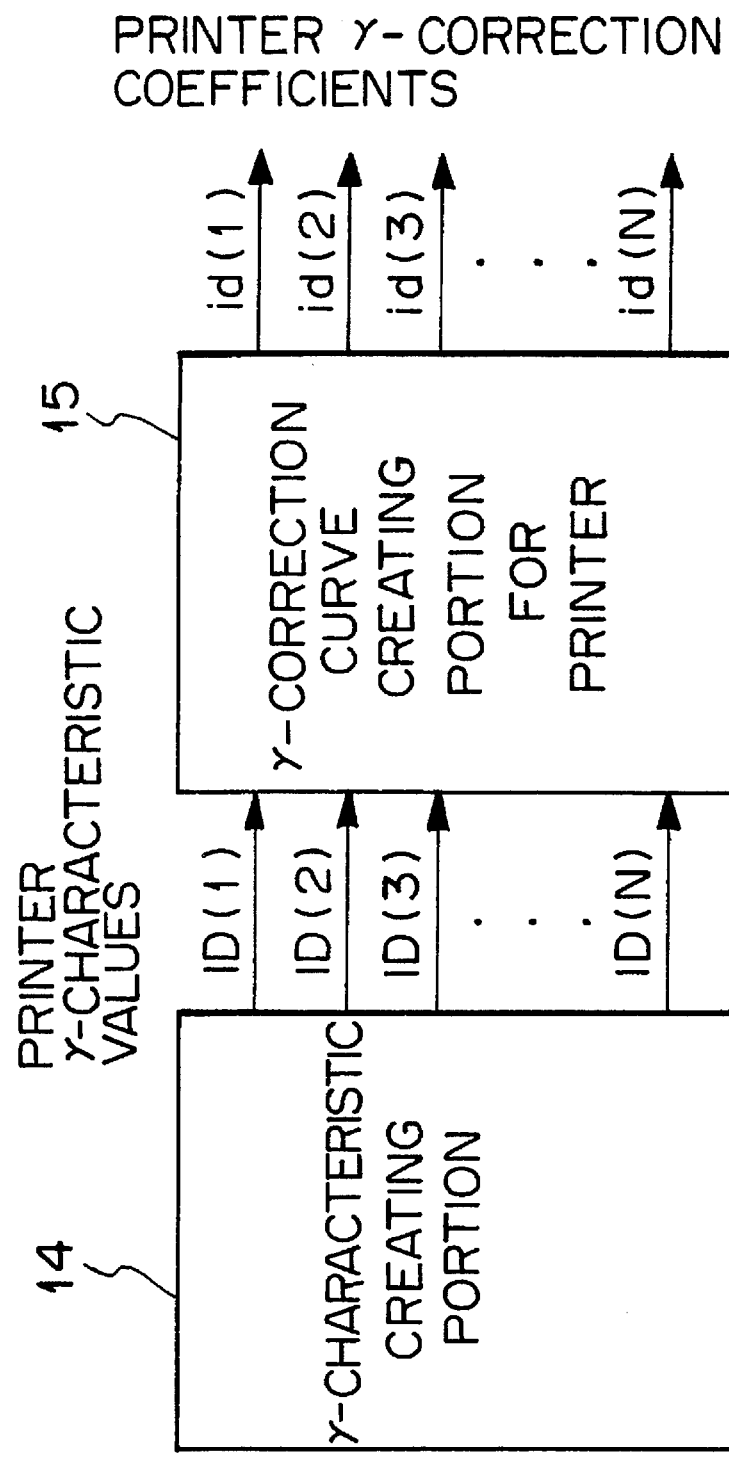
FIG. 11 is a block diagram showing a modification of the third embodiment.

FIG. 11 is a block diagram showing a modification of the third embodiment. In this modification, the γ-characteristic creating portion 14 holding the plural printer γ-characteristic creates the γ-characteristic values ID(1)–ID(N) of the printer γ-characteristic curve, and the γ-correction curve creating portion 15 for the printer creates the γ-correction curve by use of the γ-characteristic values ID(1)–ID(N). In this modification, the most suitable curve can be created, and the image quality adjusting time of the image processing apparatus such as a printer, copying machine, etc., and further the density can be made linear.

Figure 12:
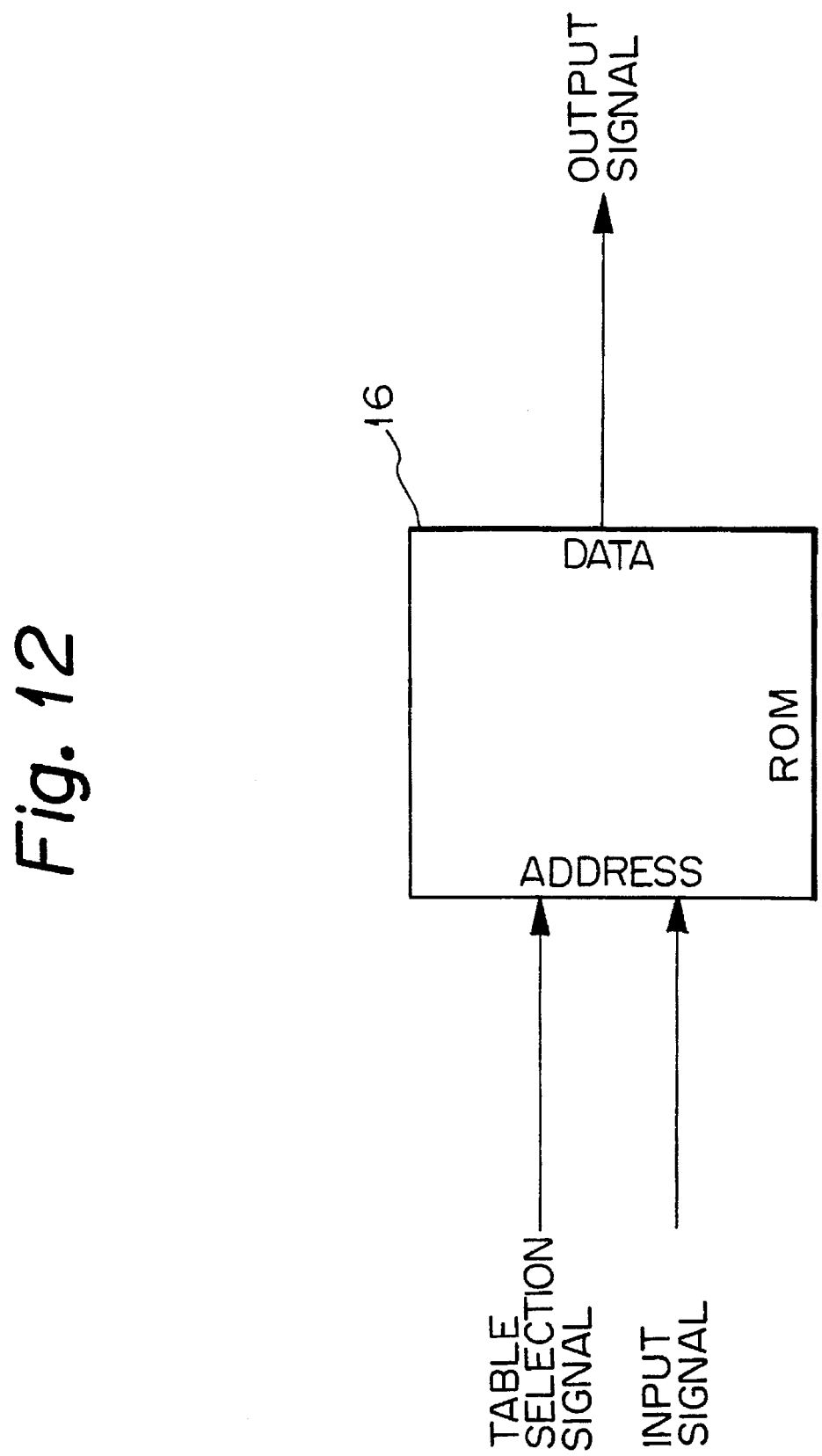
FIG. 12 is a block diagram showing the construction of the γ-characteristic curve creating portion in a modification of the third embodiment of the present invention.

The LUT 16 as shown in FIG. 12 is employed as the γ-characteristic creating portions 11 and 14 in the third embodiment and its modification. In the LUT 16, the respective γ-characteristics are converted into table form and accommodated in the ROM. The LUT 16 selects the γ-characteristic by use of the table selecting signal. The relationship between the input signal and the output signal turns out to be the γ-characteristic.

In the color scanner, the scanner portion of the color copier, the color printer, or the printer portion of the color copier, the γ-characteristic creating port create the γ-characteristic for each color signal as in the case of the third embodiment and its modification and the γ-correction curve creating portion for the printer can create the γ-correction curve by use of the γ-characteristic value.

Figure 13:
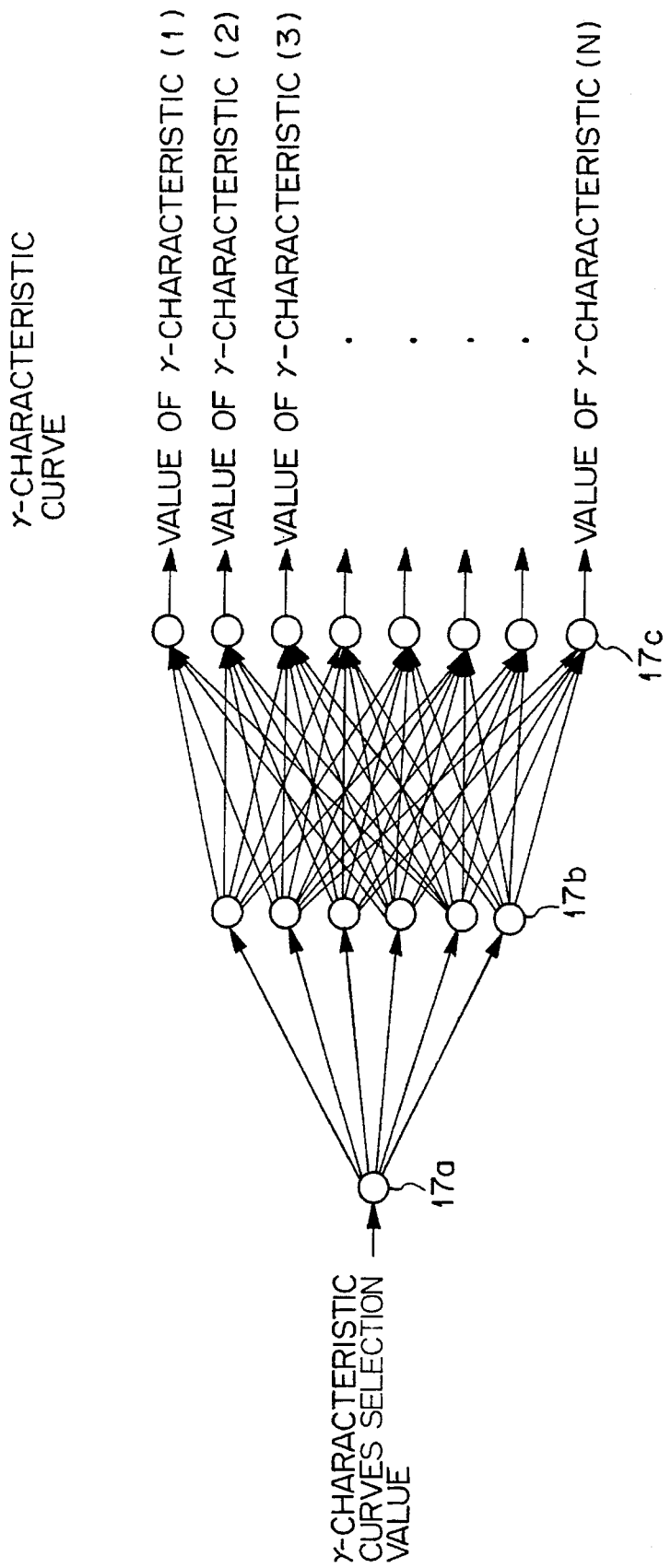
FIG. 13 is a diagram showing the construction of the neural network for creating the γ-correction curve in a fourth embodiment according to the present invention.

Now, the fourth embodiment of the present invention will be explained. In the third embodiment and its modification, since the γ-characteristic creating portion holds the γ-characteristic, it can create the γ-characteristic curve. However, it is necessary to prepare a large amount of memory in order to hold many γ-characteristics in the image processing apparatus. In the fourth embodiment according to the present invention, in order to improve the above matter, the above-mentioned third embodiment and its modification, the γ-characteristic creating portions 11 and 14 are constructed with the neural network as shown in FIG. 13. The neural network comprises an input layer 17*a*, an intermediate layer 17*b*, and an output layer 17*c*, and previously studies the relationship between the γ-characteristic curve selecting value and the respective γ-characteristic values (1)–(N) of the γ-characteristic curve γ-characteristic values corresponding to the output values of the scanner or the writing-in values of the printer). The γ-characteristic curve 17*a*, and the γ-characteristic values (1)–(N) corresponding to the output values of the scanner or the writing-in values of the printer are outputted from the output layer 17*c*.

Figure 14:
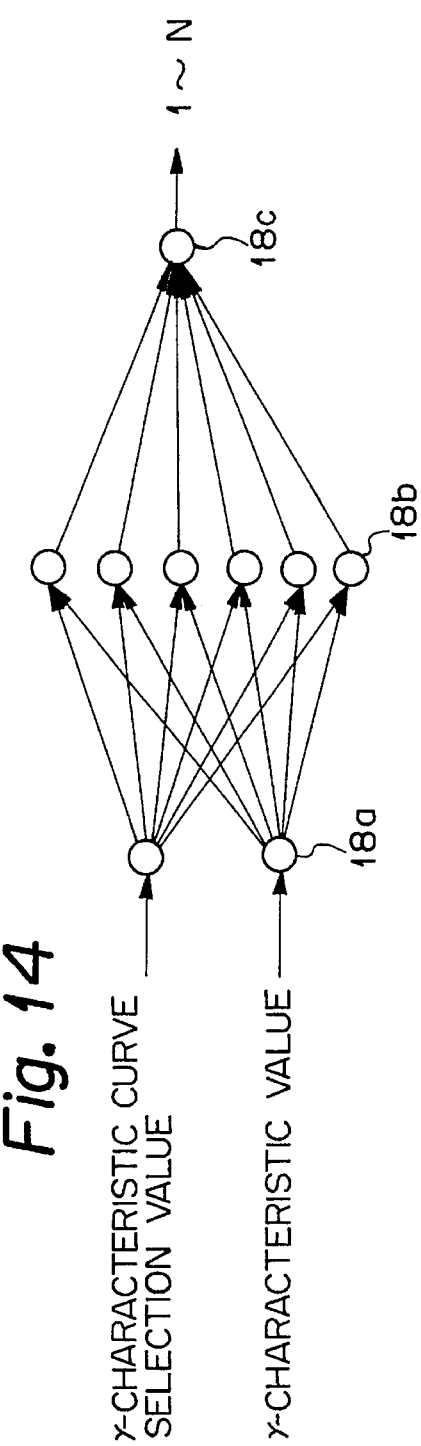
FIG. 14 is a diagram showing the construction of the neural network for selecting the γ-correction curve in a first modification of the fourth embodiment.

In the fourth embodiment, the most suitable γ-correction curve can be created, and the image quality adjusting time of the image processing apparatus such as a printer, copying machine, etc. can be shortened, and the density can be made linear, and further the memory capacitance which is required can be reduced. FIG. 14 is a diagram showing the construction of the neural network for selecting the γ-correction curve in a first modification of the fourth embodiment. In the modification, the γ-characteristic creating portions 11 and 14 of the third embodiment and its modification are constructed with the neural network as shown in FIG. 14. The neural network comprises an input layer 18*a*, an intermediate 18*b*, and an output layer 18*c*, and the same studies previously the relationship between the γ-characteristic curve selecting values and the γ-characteristic values (density value of the scanner or the printer) and the respective γ-characteristic values (1)–(N) of the plural γ-characteristic curves (output values of the scanner or the writing-in values of the printer). The γ-characteristic curve selecting values and the γ-characteristic value are input into the input layer 18*a* and the characteristic values (1)–(N) are output from the output layer 18*c*. In the first modification of the fourth embodiment, the most suitable γ-correction curve can be created, and the image quality adjusting time of the image processing apparatus such as a printer, copying machine, etc. can be shortened, and further the density can be made linear, as in the case of the fourth embodiment.

Figure 15:
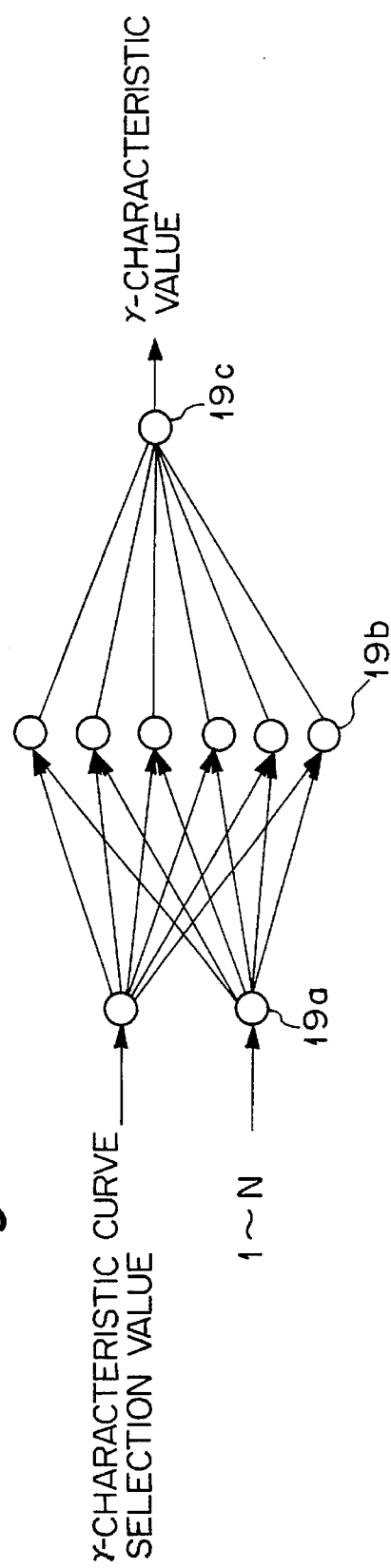
FIG. 15 is a diagram showing the construction of the neural network for selecting the γ-correction curve in another modification of the four embodiment.

FIG. 15 is a diagram showing the construction of the neural network for selecting the γ-correction curve in another (second) modification of the fourth embodiment. In the second modification, the γ-characteristic creating portions 11 and 14 of the third embodiment and its modification is constructed with the neural network as shown in FIG. 15. The neural network comprises an input layer 19*a*, an intermediate layer 19b, and an output layer 19c, and the same studies previously the relationship between the γ-characteristic curve selecting values of the scanner or the printer and the output values thereof 1–N (output values of the scanner or writing-in values of the printer), and the respective characteristic value of the plural γ-characteristic curves (density values of the scanner or printer). The γ-characteristic curve selecting value and the γ-characteristic value are input into the input layer 19a, and the γ-characteristic value is output from the output layer 19c. As the studying algorithm of the neural network, a method capable of studying the copied image of the input pattern and the output pattern, for instance, the error inversely-transmitting method is employed.

In the second modification of the fourth embodiment, as in the case of the fourth embodiment, the most suitable γ-correction curve can be created, and the image quality adjusting time of the image processing apparatus such as a printer or copying machine can be shortened, and further the density can be made linear.

Figure 16:
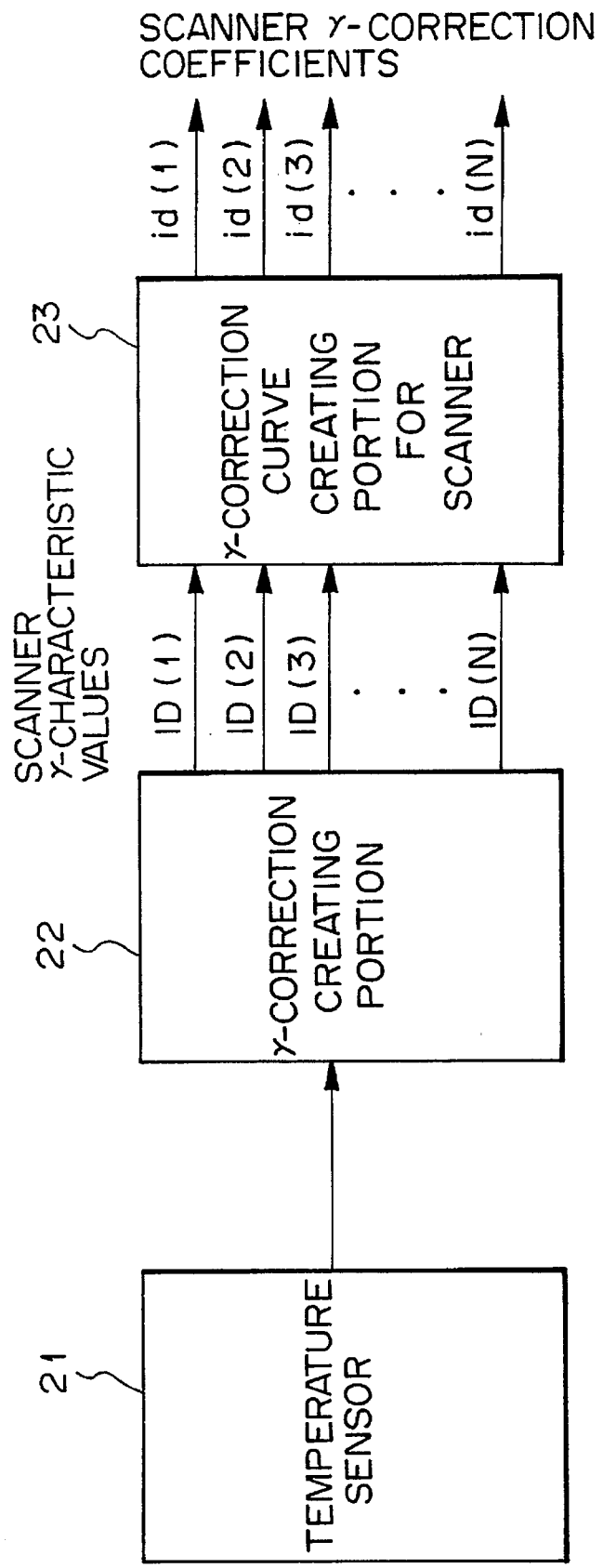
FIG. 16 is a block diagram showing the fifth embodiment according to the present invention.

Now, the fifth embodiment of the present invention will be explained. FIG. 16 is a block diagram showing the fifth embodiment according to the present invention. The fifth embodiment is the γ-correction curve creating apparatus for creating the γ-correction curve of the scanner or the scanner of the copying machine. The γ-correction curve creating apparatus comprises a temperature sensor 21 for measuring the temperature at the time of measuring the scanner γ-characteristic, a γ-characteristic creating portion 22 for outputting the scanner γ-characteristic values ID(1)–ID(N) correspondingly to the measured values of the temperature sensor 21, and a γ-correction curve creating portion 23 for the scanner which creates the most suitable γ-correction id(1)–id(N) from the outputs ID(1)–ID(N) of the γ-characteristic curve creating portion ID(1)–ID(N).

In the third and fourth embodiments and the modifications thereof, if the γ-characteristic selecting value is input the γ-characteristic value can be obtained. However, since the γ-characteristic of the scanner differs from each other due to the ambient temperature, the γ-characteristic selecting value has to be changed each time the temperature varies. In the fifth embodiment, the γ-characteristic curve and the γ-characteristic selecting value have been changed in accordance with the temperature from the temperature sensor 21 in order to improve the above matter.

Figure 17:
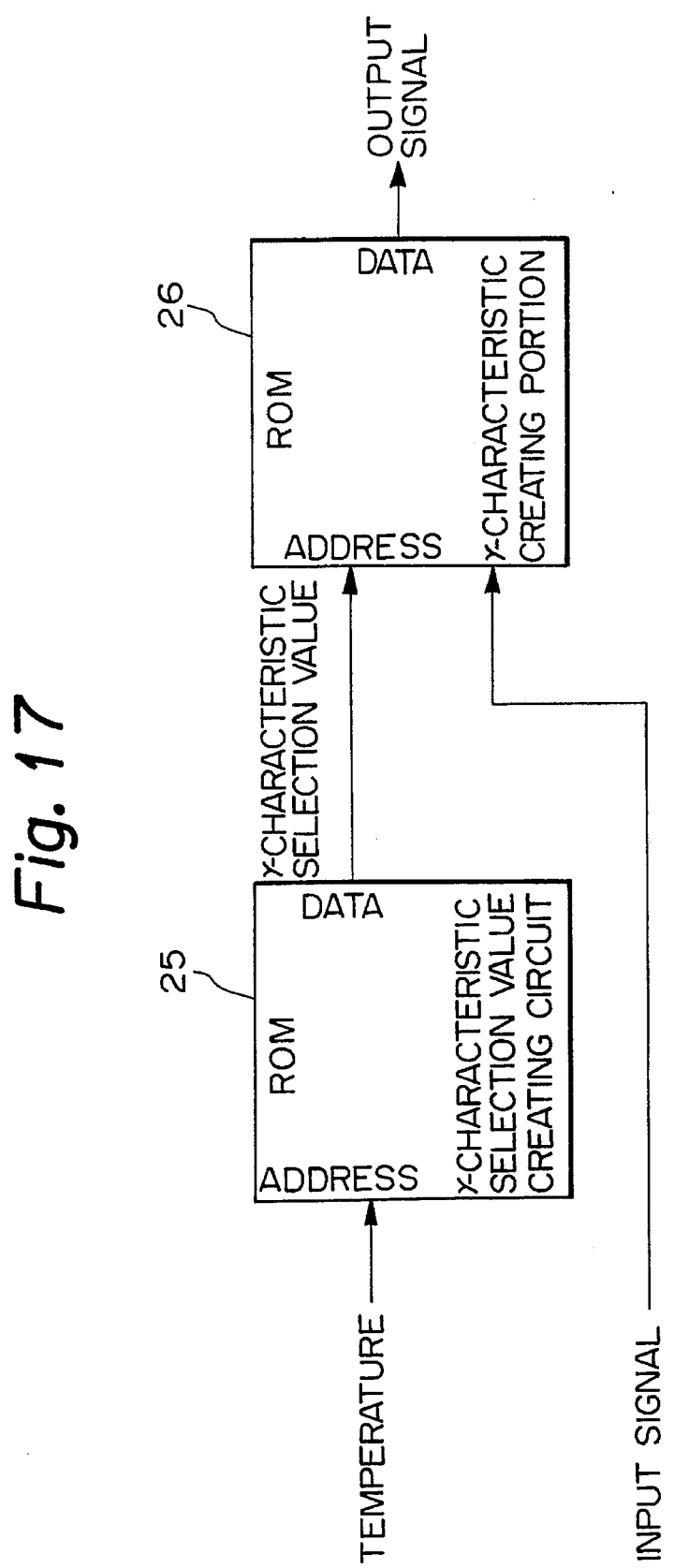
FIG. 17 is a diagram showing the construction of the γ-characteristic creating portion in the fifth embodiment.
Figure 18:
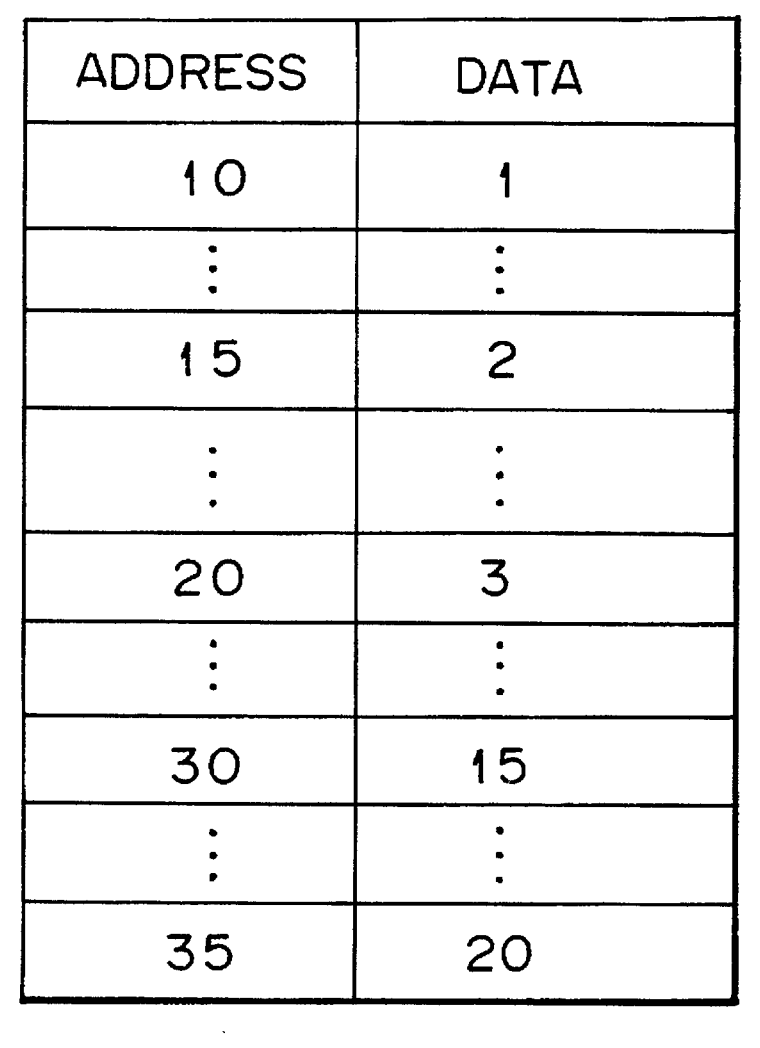

FIG. 17 is a block diagram showing the construction of the above-mentioned γ-characteristic creating portion 22 in the fifth embodiment. The γ-characteristic creating portion 22 comprises a γ-characteristic selecting value creating circuit 25 and a γ-characteristic creating portion 26, and those portions are, respectively, constructed with the LUTs of the respective ROMS. The γ-characteristic selecting value creating circuit 25 stores the relationship between the temperature measured by the temperature sensor 21 and the characteristic selecting value as shown in FIG. 18, as the relationship of the address and the data.

The temperature measured by the temperature sensor 21 is input into the γ-characteristic selecting value creating circuit 25 and thereby the address is determined, and the circuit 25 outputs the γ-characteristic selecting value correspondingly to the measured temperature as the data. The characteristic creating portion 26 stores the plural γ-characteristics as shown in FIG. 9 and creates the γ-characteristic values ID(1)–ID(N) corresponding to the γ-characteristic selecting value from the γ-characteristic curve creating portion 22. In the fifth embodiment, since the γ-correction curve is created in accordance with the temperature, the most suitable γ-correction curve can be created, and the image quality adjusting time of the image processing apparatus such as a printer, copying machine, etc. can be shortened.

Figure 19:
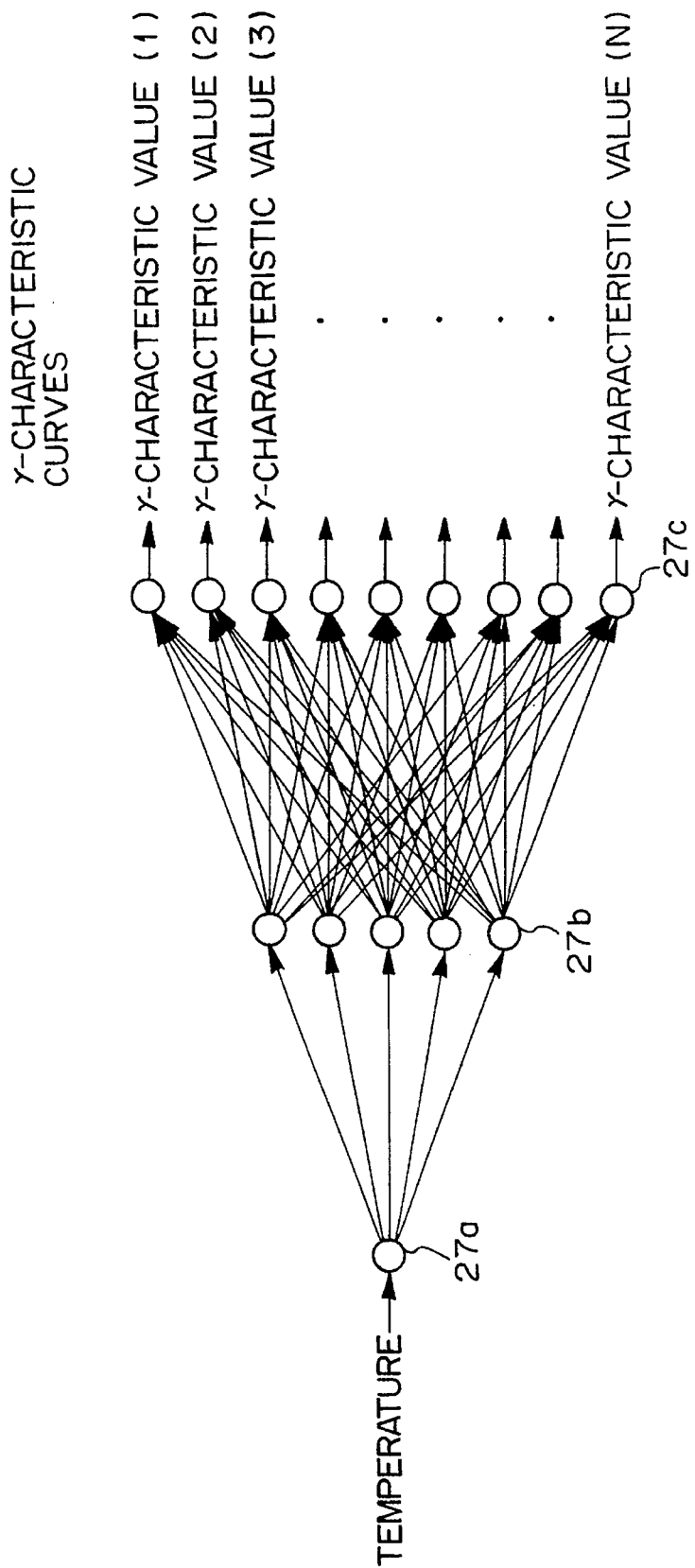
FIG. 19 is a diagram showing the construction of the neural network for creating the γ-characteristic in the sixth embodiment according to the present Invention.

Now, the sixth embodiment of the present invention will be explained. In the fifth embodiment, it is necessary to obtain the γ-characteristic in the range of the temperature to be measured experimentally in order to change the γ-characteristic selecting value in accordance with the temperature from the temperature sensor 21. In the sixth embodiment, in order to improve the above matter, the γ-characteristic in the temperature not obtained by the experiment can be calculated by use of the neural network previously studying the relationship between the temperature and the γ-characteristic. FIG. 19 is a diagram showing the construction of the neural network for creating the γ-characteristic in the sixth embodiment according to the present invention. In the sixth embodiment, the construction of the above-mentioned embodiment employs the neural network as shown in FIG. 19.

The neural network comprises an input layer 27a, an intermediate 27b, and an output layer 27c. The output of the temperature sensor 21 is input into the input layer 27a, and the characteristic selecting value is output to the characteristic creating portion 26 from the output layer 27c. The neural network studies the scanner γ-characteristic such that the i-characteristic selecting value and the temperature at the time of measuring the scanner γ-characteristic measured by the temperature sensor 21 are input into the neural network and the γ-characteristic value corresponding to the scanner output value. As the studying algorithm of the neural network, a method capable of studying the copied image of the input pattern and the output pattern, for instance, the error inversely-transmitting method can be employed. In the sixth embodiment, since the γ-characteristic selecting value creating circuit of the fifth embodiment is constructed with the neural network, the most suitable γ-correction curve can be created and the image quality adjusting time of the image processing apparatus such as a printer, copying machine, etc. can be shortened, and further the density can be made linear.

Figure 58:
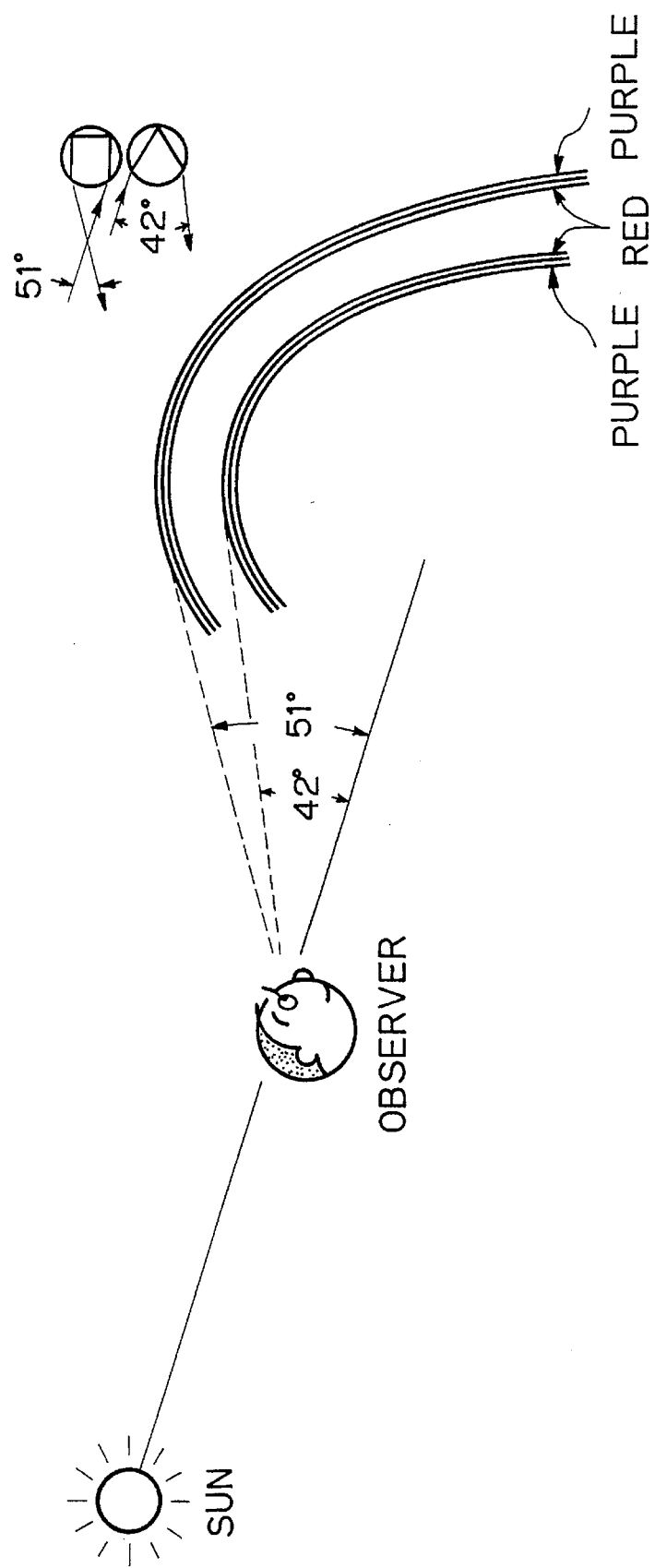
FIG. 58 is a diagram showing the occurrence of a rainbow.

Prior to the explanation of the seventh embodiment, the general outline of the color characteristics; color phase, chromatic factor, and brightness will be briefly described. The color phase will be explained, first. Even in the case of attaching the back number to the respective colors, it is necessary to devise a way of numbering so as to estimate the color from the number to some extent. Therefore, the colors are arranged in a predetermined order. For example, the order of the colors is that of a rainbow, i.e., red, orange, yellow, etc. As is well-known, a rainbow is created as a result of the phenomenon that, when light rays emitted from the sun enter a water droplet in the sky and are reflected therein, and go out therefrom and return to the observer, the refraction angle between the incident light and the refracted light differ from each other according to the wavelength of the light rays and thereby the light rays of the respective colors deviate. As shown in FIG. 58, assuming that the sun is connected to an observer with a straight line, a rainbow is formed in a direction of 42° from the line around the center of the inclined line (of 42°). Since the light rays from the sun are reflected only one time on the inner surface of the droplet, the order of the rainbow color becomes purple, indigo-blue, blue, green, yellow, orange, and red, from the internal side. Another rainbow is also formed by the light rays emitted outside after being reflected twice in the droplet, in another direction of 51. The order of the rainbow color becomes reverse, namely, the order thereof becomes red, orange, and purple, from the internal side. Since the color order made by a prism occurs due to the difference of the refraction rate according to the wavelength of the light rays, the order thereof also becomes purple, indigo blue, blue, green, yellow, orange, and red.

Figure 59:
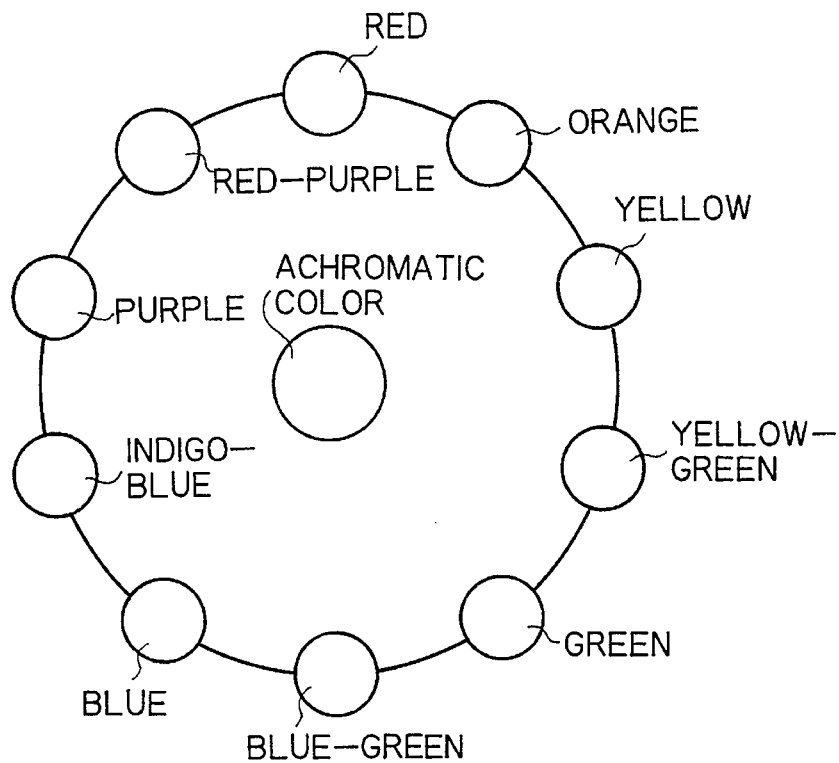
FIG. 59 is a diagram of the two-dimensional color arrangement.

Next, the chromatic factor will be explained. It is impossible to express all colors existing in the world. There exists another factor for expressing such colors. That is the fresh-brightness of the color. For instance, as to the color green, there exists the fresh-bright green and the dark green near gray. The colors black, gray, and white are called "achromatic" colors, because there exists no chromatic color at all. On the other hand, the colors red, orange, yellow, green, blue, indigo-blue, and purple, are called chromatic colors. As shown in FIG. 59, it is possible to arrange the colors two-dimensionally on a circle around the achromatic color (color phase). Assuming that the fresh-brightness of the color increases directing toward the outside from the center (achromatic color), the respective color can be arranged in order on a plane. Based upon such arrangement, the colors can be coded. To define the fresh-brightness of the colors, the technical word is "saturation" is employed.

Figure 60:
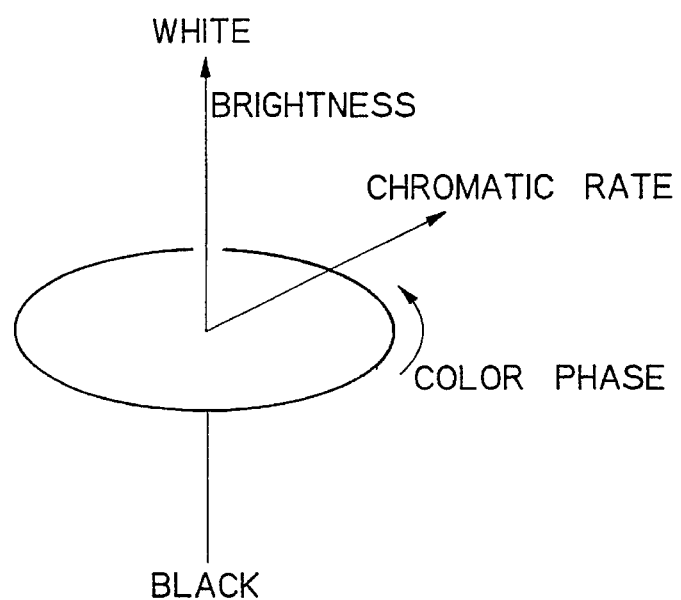
FIG. 60 is a diagram illustrating the arrangement rule to the three-dimensional space for object color.
Figure 61A:
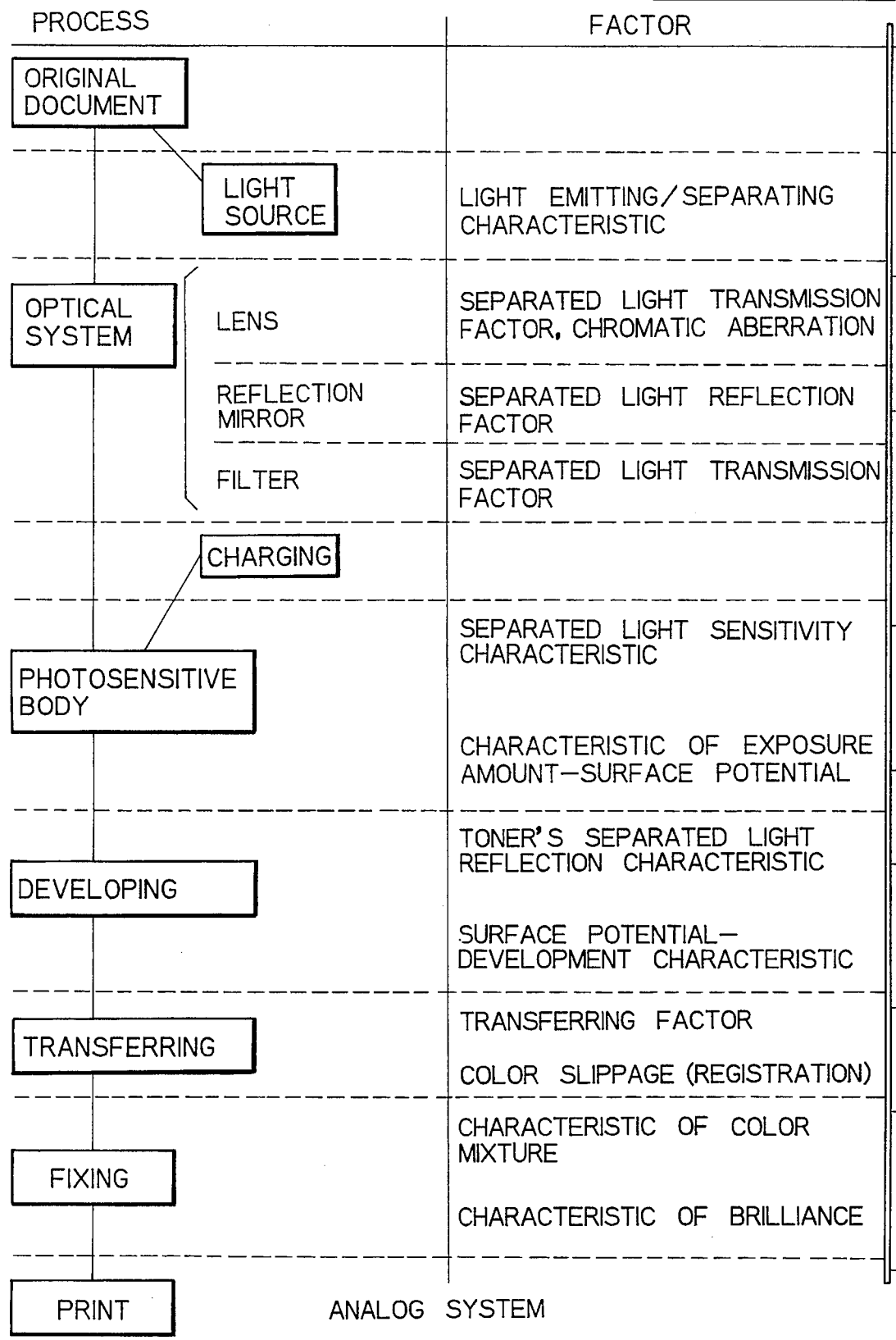
FIG. 61 is a diagram showing the factor exerting an influence on the color reproduction in the analog system and in the digital system.
Figure 61B:
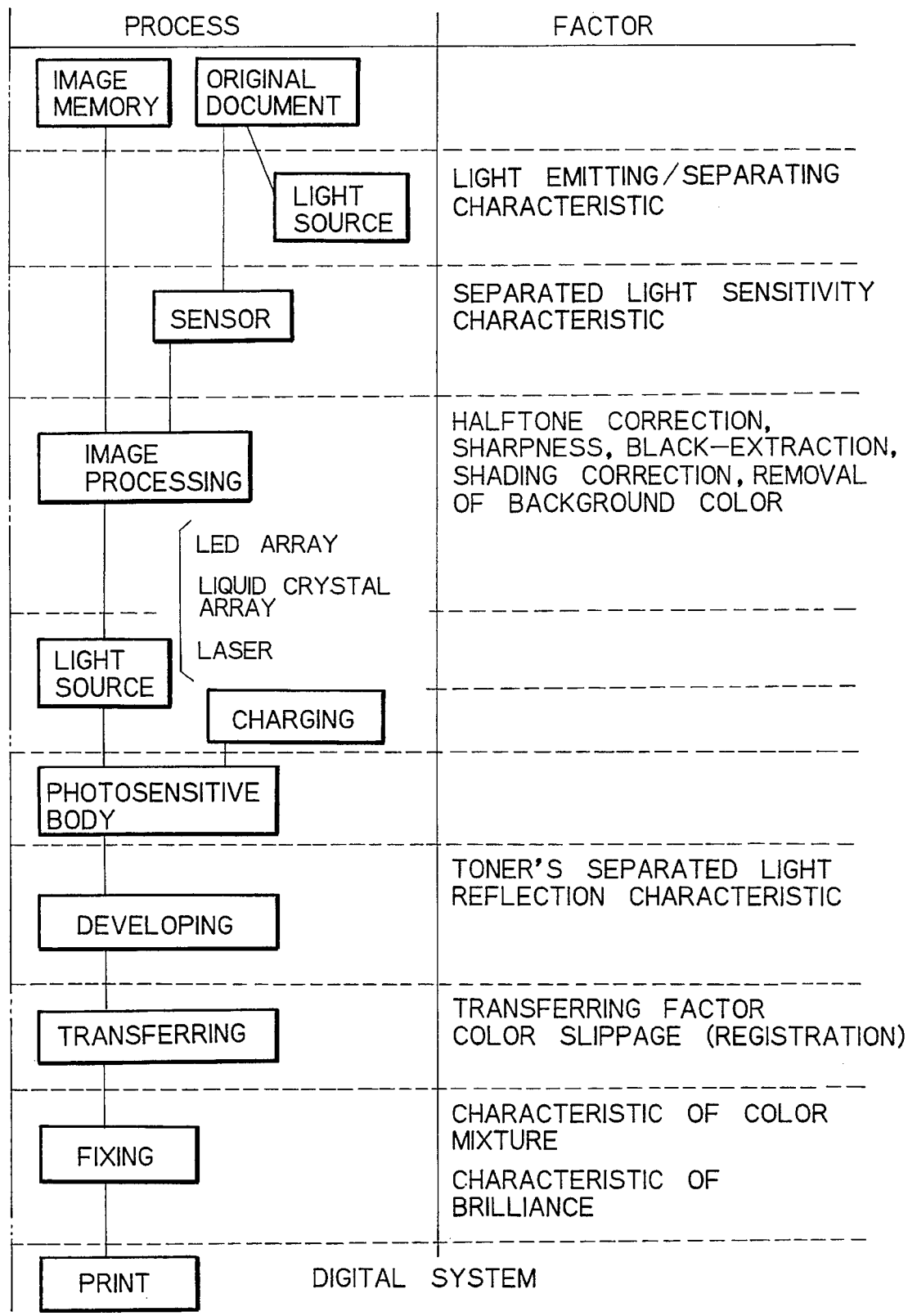
Figure 62:
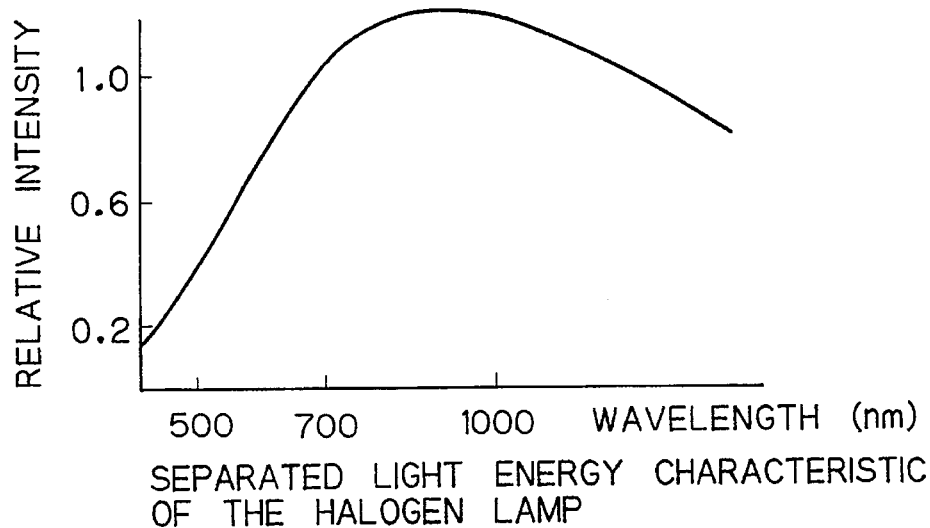
FIG. 62 is a graph showing the separated light energy characteristic of the halogen lamp.
Figure 63:
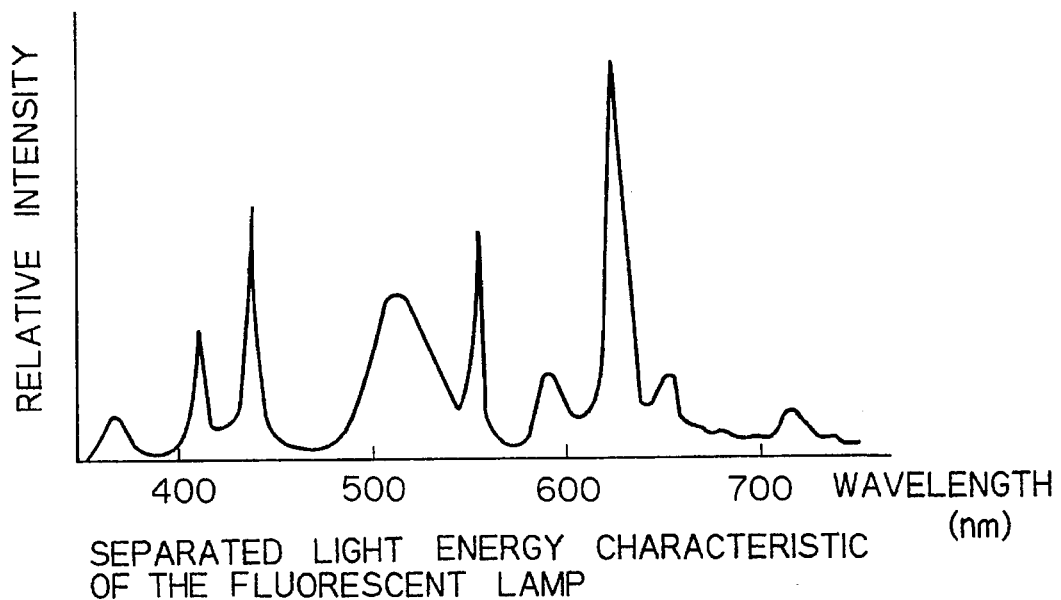
FIG. 63 is a graph showing the separated light energy characteristic of the fluorescent lamp.
Figure 64:
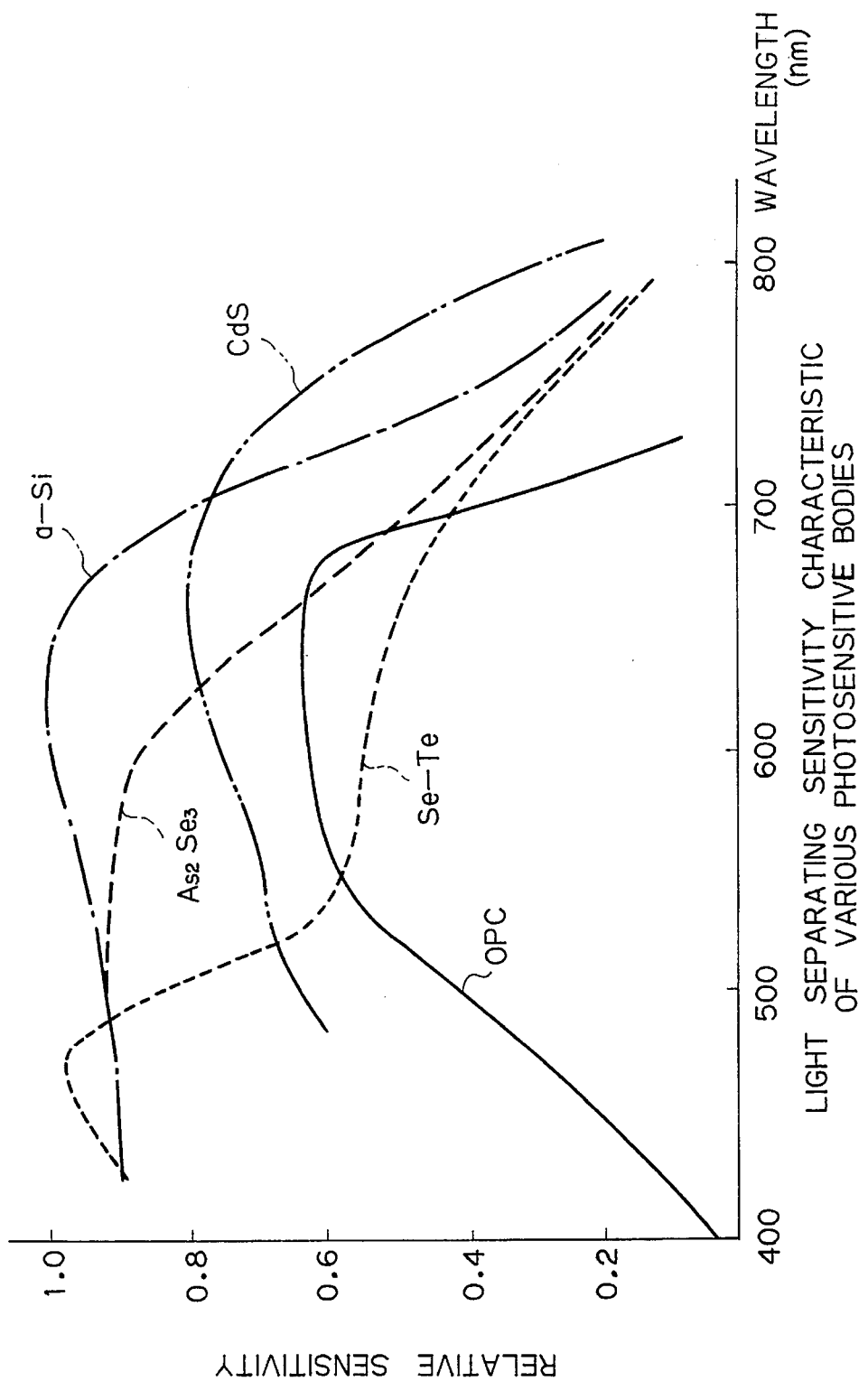
FIG. 64 is a graph showing the light sensitivity characteristic of various photosensitive bodies.
Figure 65:
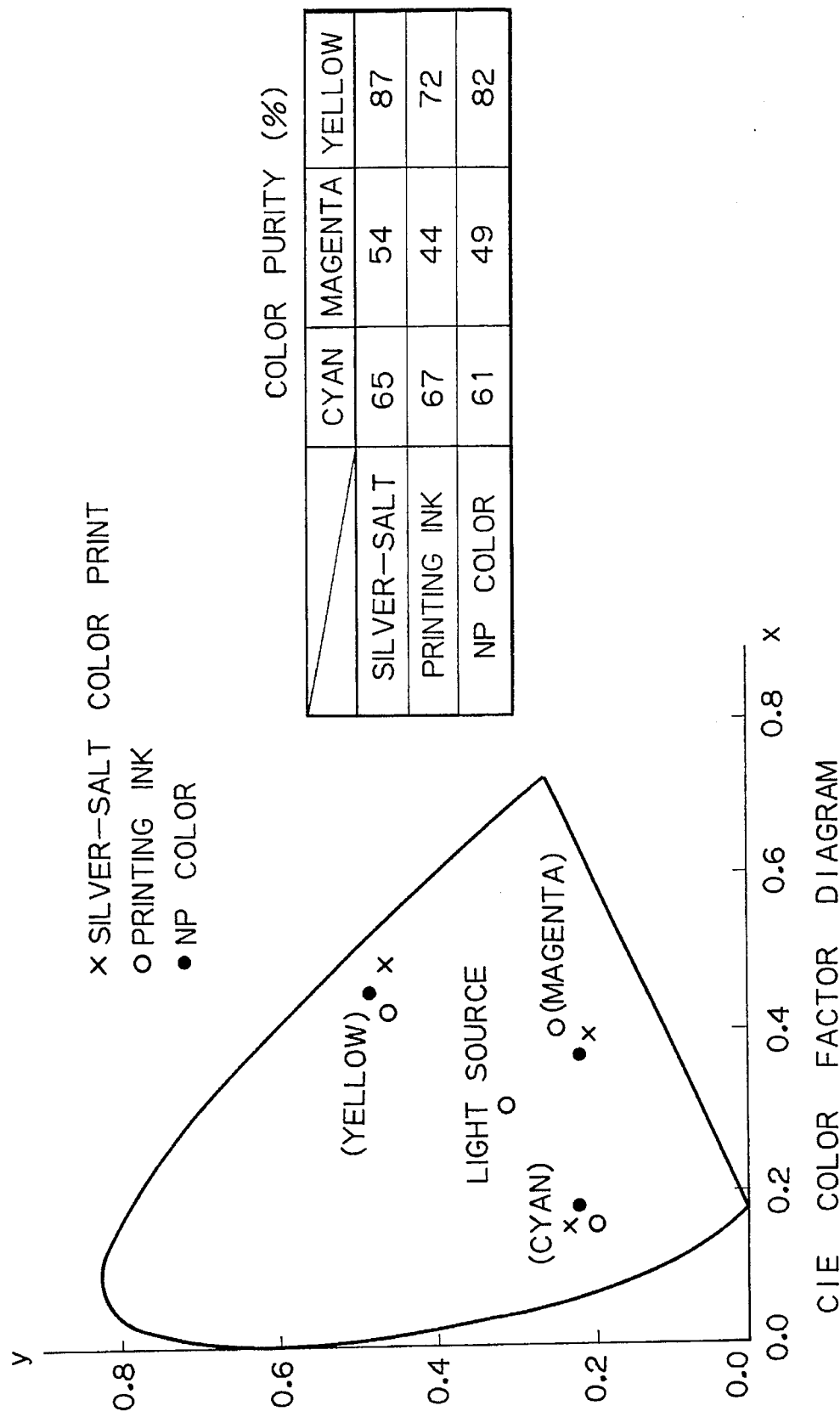
FIG. 65 is a diagram showing the CIE color factor.
Figure 66:
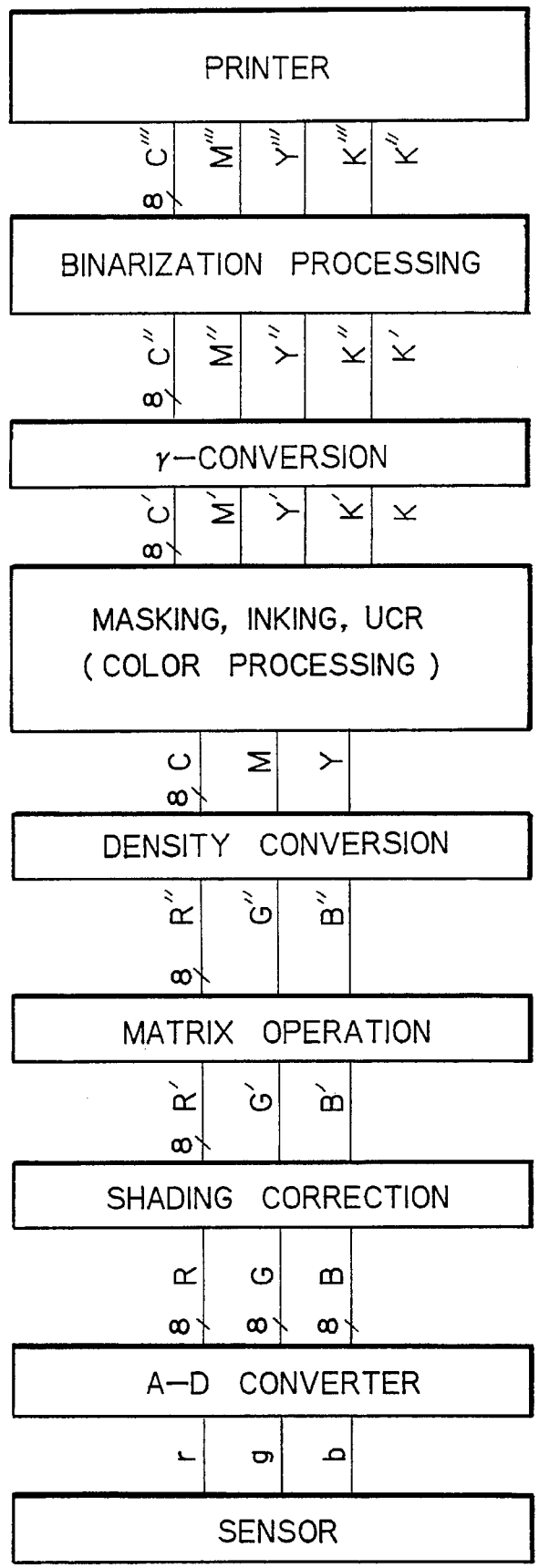
FIG. 66 is a block diagram of the image processing system for reproducing color.

Finally, brightness (or lightness) will be explained. There exists still another factor for expressing such colors. That is the brightness of the color. As for the achromatic color, there exist the colors from white to black via gray. As to chromatic colors, there exists the colors from very bright chromatic color to the dark one. Even though both the color phase and the chromatic factor are same, generally only the brightness will change. Adding the brightness to the former two, the arrangement of the colors should be expressed three-dimensionally. Namely, as shown in FIG. 60, the brightness should be taken in the up-and-down direction, and the colors are arranged utilizing the threedimensional space and coded with numerals or symbols in accordance with the color order. The three characteristics of color have been introduced heretofore regarding chromatic colors and achromatic colors. The existing characteristics of color are color phase, chromatic factor, and brightness. It is possible to assume a color space in which the color phase is taken in the direction of the circumference, the chromatic factor in the direction of the radius, and the brightness in the up-and-down direction as can be seen from FIG. 60. All colors are allocated to predetermined locations. Suitable numerals or symbols are attached to those colors. In this way, a method of coding the color can be realized. A concrete example thereof is the Munsell Color-Expressing System proposed by an American painter, A. H. Munsell.

Now, the seventh embodiment of the present invention will be explained. In the aforementioned third and fourth embodiments and the modifications thereof, the density could be made linear by γ-correcting the density value as shown in FIG. 6. If this γ-correction method is applied to the color printer or the color copying machine performing the output by use of three-colored or four-colored toner, it may be possible to γ-correct the density value linearly for each color component. However, it is insufficient for reproducing the achromatic color. In the eleventh embodiment of the present invention, in order to improve the above matter, the γ-correction is done from the combining operation of the respective color components density values at the time of reproducing the achromatic color, and from the equivalent neutral density (called "END", hereinafter) at that time and the γ-characteristic.

Figure 20:
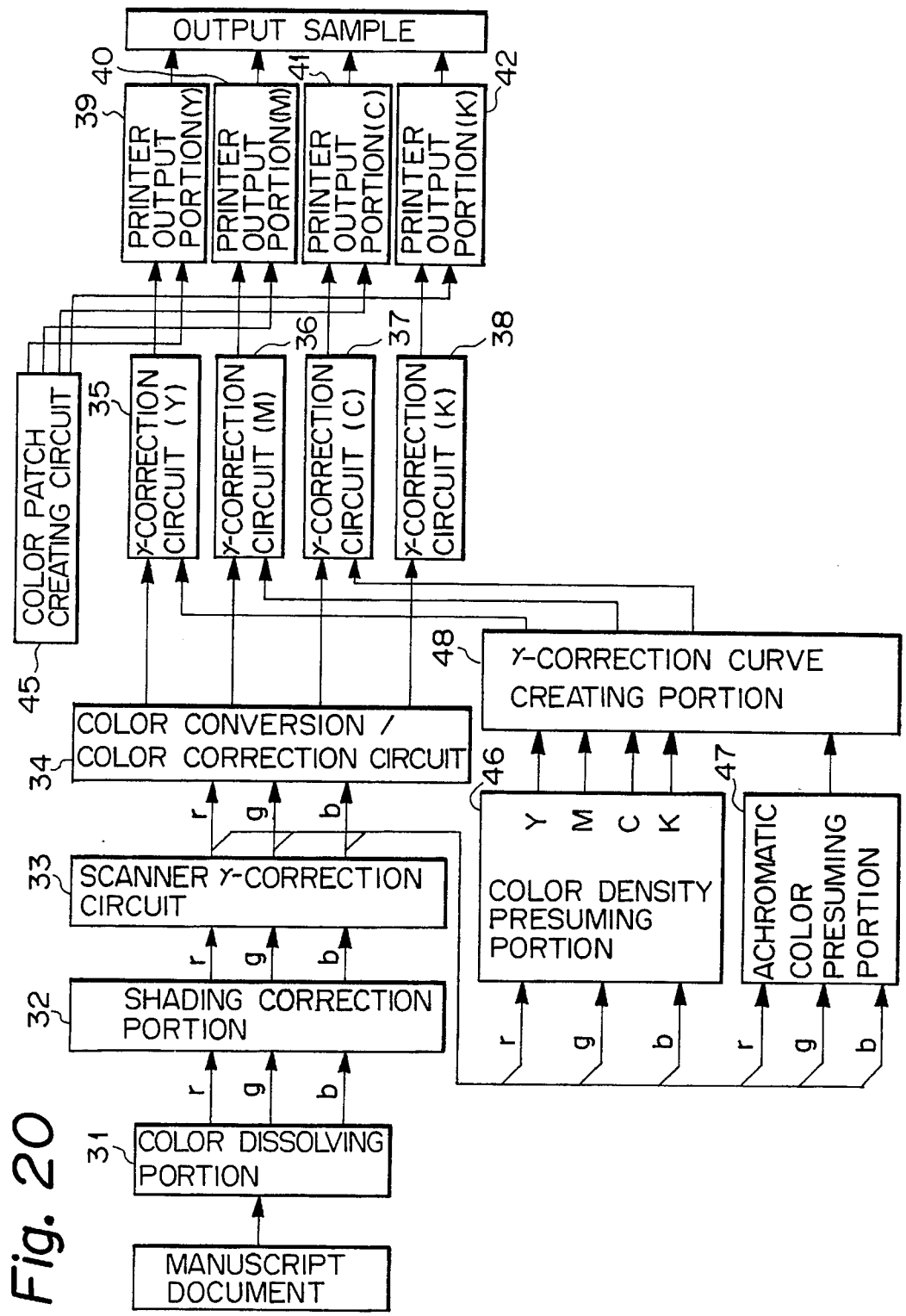
FIG. 20 is a block diagram showing the construction of the γ-correction curve creating portion in a seventh embodiment according to the present invention.

FIG. 20 is a block diagram showing the construction of the γ-correction curve creating portion in the seventh embodiment according to the present invention. The seventh embodiment using a part of the color copier comprises a color dissolving portion 31, a shading correction portion 32, a scanner γ-correction circuit 33, a color conversion/color correction circuit 34, respective γ-correction circuits for Y, M, C, K; 35 through 38, and respective printer output portions for Y, M, C, K; 39 through 42. The seventh embodiment further comprises a color patch creating circuit 45 for creating optical colors, a color density estimating portion 46, an achromatic color estimating (judging) portion 47 for judging whether the manuscript document has achromatic color, and a γ-correction curve creating portion 48.

Figure 3:
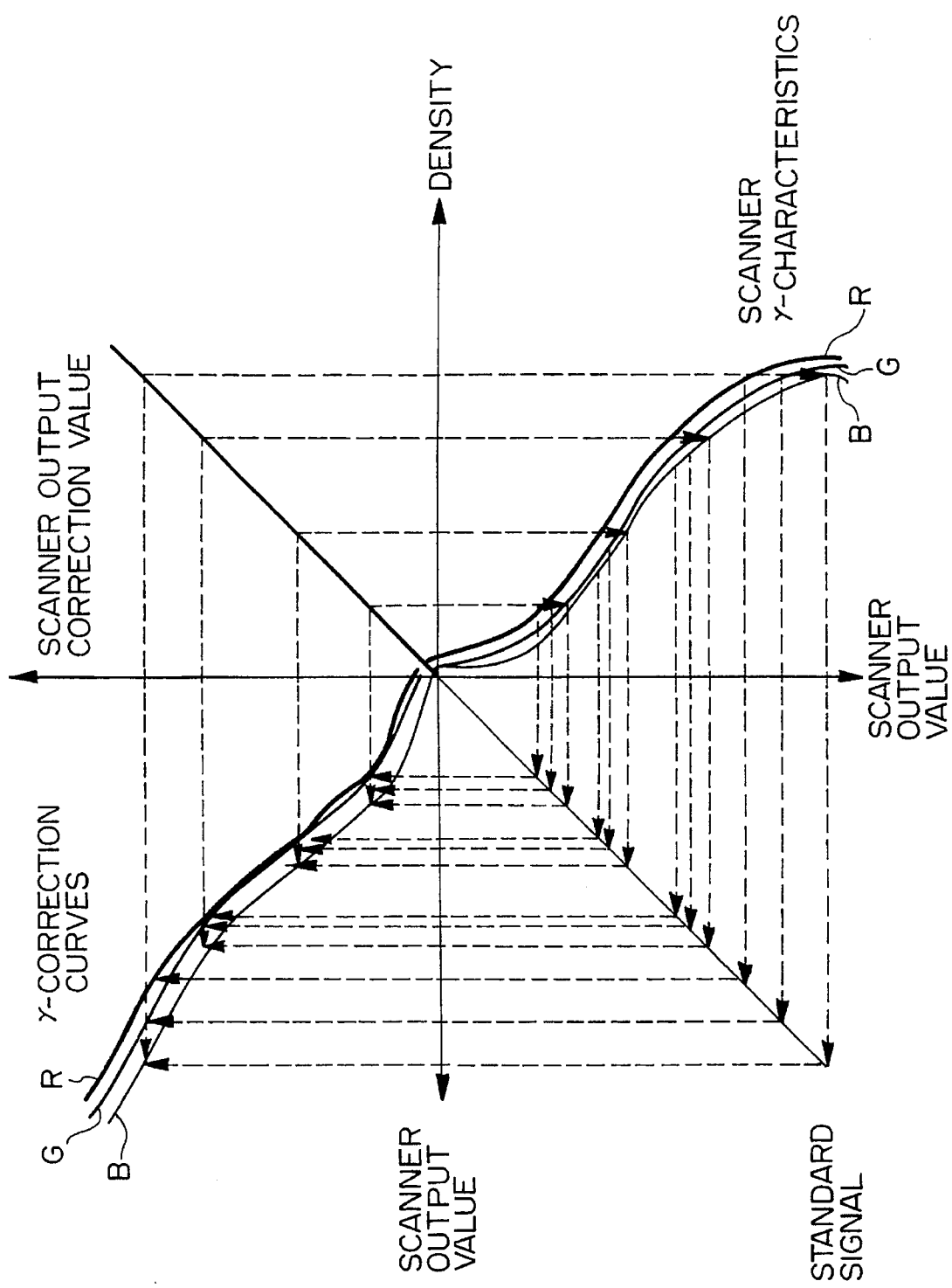
FIG. 3 is a diagram of a characteristic curve showing an example of the relationship between the scanner γ-characteristic and the γ-correction curve.

In a color copier, in general, the image on the manuscript document is read out by the color dissolving portion 31 of the scanner, and the color of the image is dissolved into three colors. The color signals r(red), g(green), and b(blue) from the color dissolving portion 31 are shading-corrected by the shading correction portion 32. The corrected signals are scanner-γ-corrected on the basis of the relationship between the γ-characteristic of the scanner and the γ-correction curve as shown in FIG. 3 by the scanner correction circuit 33. The output signals of the scanner γ-correction circuit 33 are color-converted and color-corrected in the color conversion/color correction circuit 34, and the γ-correction of the signals is performed in the γ-correction circuits 35 through 38. Thereafter, the respective color components are superposed on each other by the printer output portions 39 through 42, and those portions 39–42 output these superposed color components.

Figure 21:
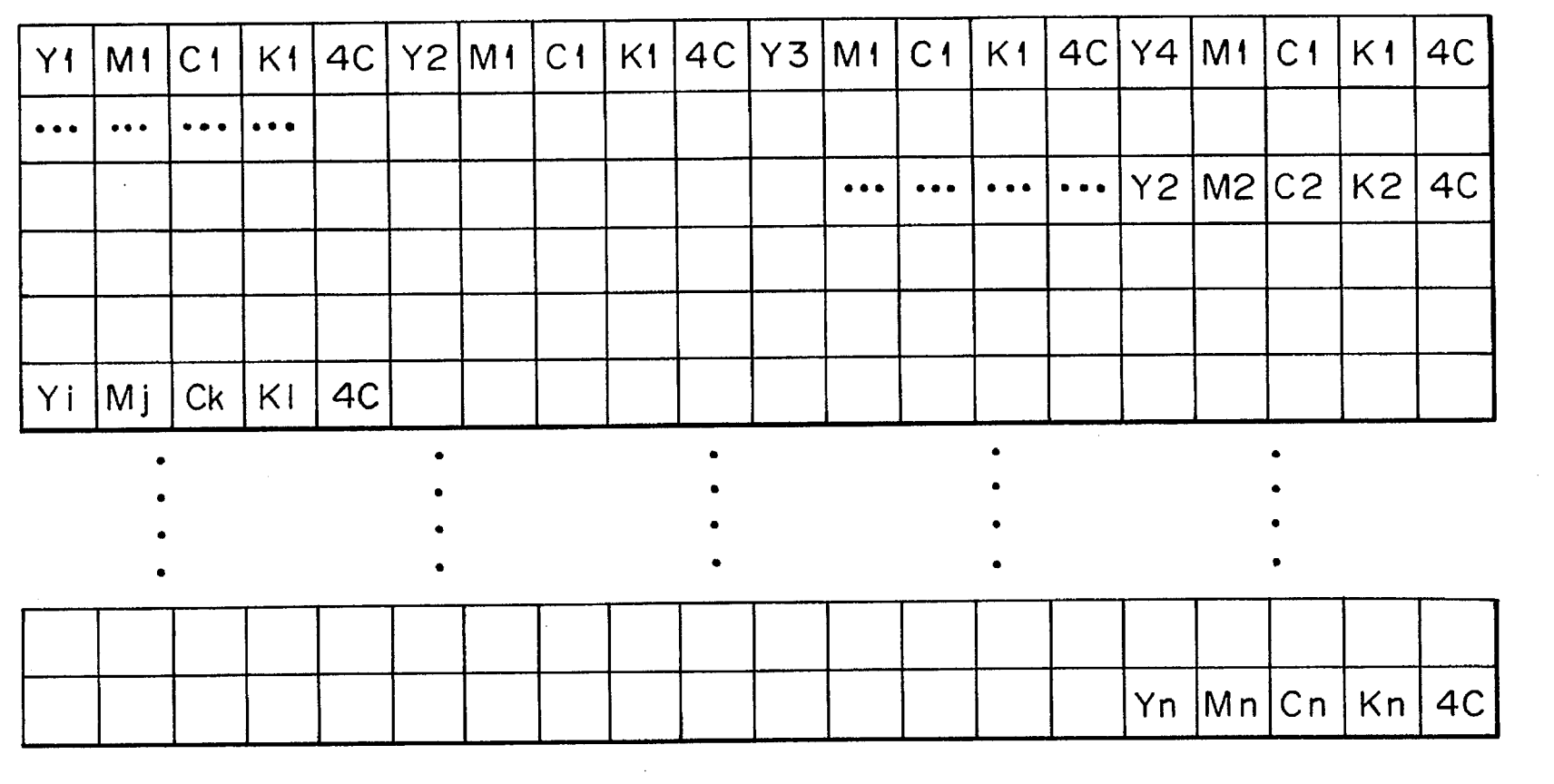

In the seventh embodiment, the color patch creating circuit 45 creates optional color signals and supplies these signals to the color printer portions 39 through 42, and these portions create the color patch. As shown in FIG. 21, the color patch consists of the patches (Y, M, C, K) for respective color components and the patch (4c) formed by superposing the respective color components, and the same is read out by the color dissolving portion 31 of the scanner and is dissolved into three colors. The color signals r, g, and b from the color dissolving portion 31 are shading-corrected by the shading correcting portion 32 and scanner-γ-corrected by the scanner γ-correction circuit 33. Thereafter, these corrected signals are input into the color density estimating portion 46 and the density of the respective colors is estimated therein. At the same time, the same signals are input into the achromatic color estimating portion 47 and whether the color patch is achromatic is judged therein. The achromatic color estimating portion 47 estimates that the color patch may have the achromatic color when, in the following inequality (1), the respective signals R, G, and B of r, g, and b from the scanner γ-correction circuit 33 have almost same value.

$$|R-G| < TH, \quad |G-B| < TH, \quad (3)$$
$$\text{and} \quad |R-B| < TH,$$

Figure 22:
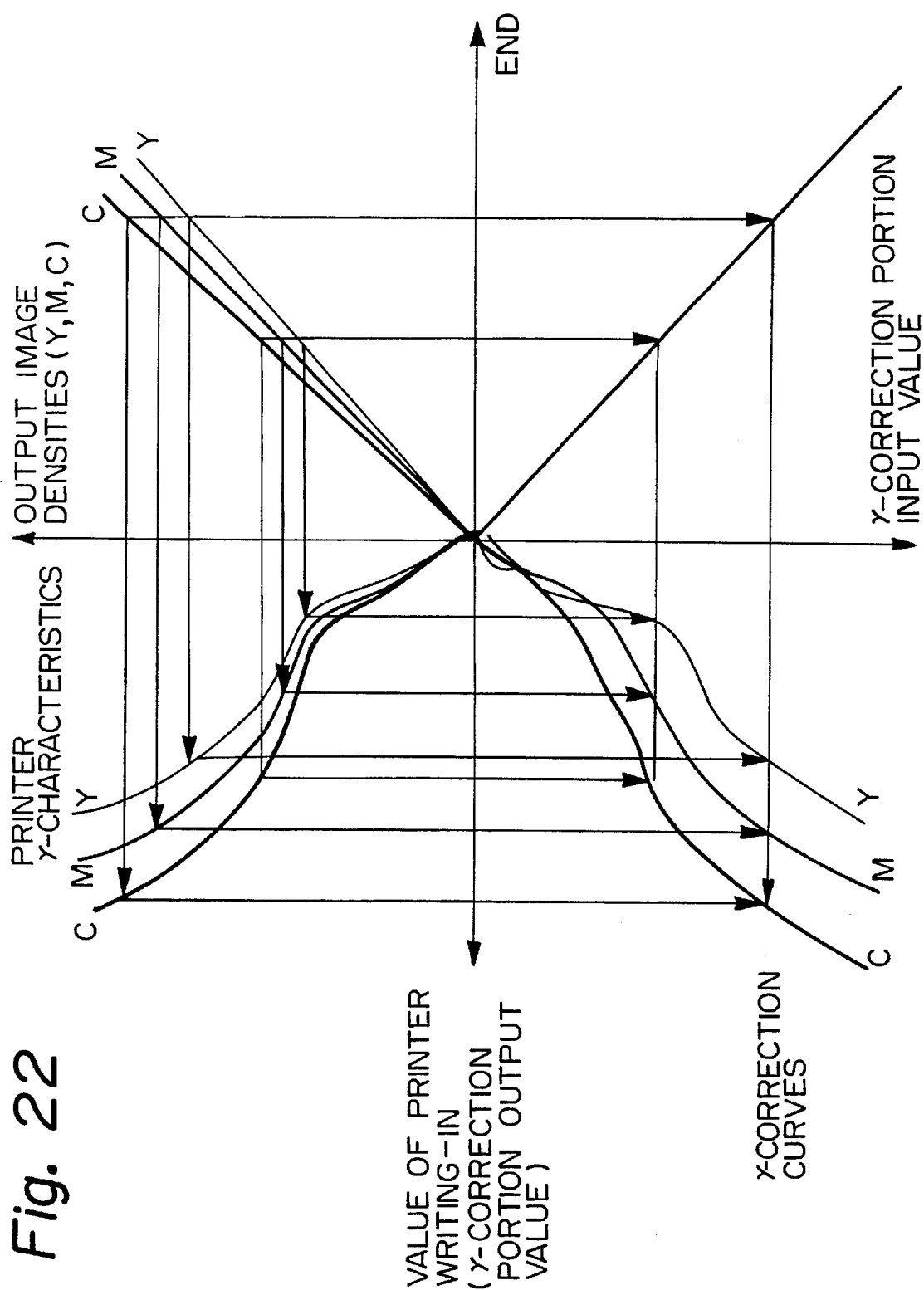
FIG. 22 is a characteristic curve diagram showing the relationship between the printer γ-characteristic and the γ-correction curve.

When the color patch formed by superposing the respective color components is achromatic, the density value for respective color components and the END are obtained by the color density estimating portion 46 constructed with the neural network. And further, the γ-correction curve for each color component is obtained in the γ-correction curve creating portion 48 by use of the output of the color density estimating portion 46 and that of the achromatic color estimating portion 47, as shown in FIG. 22.

The color density estimating portion 46 is constructed with a Y density estimating neural network, an M density estimating neural network, a C density estimating neural network, and a K density estimating neural network as shown in FIGS. 23a through 23d. Those neural networks previously study the relationship between the signals for each color components r, g, and b and the densities of the respective color components. Furthermore, a method of studying the copied image of the input pattern and the output pattern, for instance, an error inversely transmitting method is employed as a studying algorithm of the neural network.

Figure 23A:
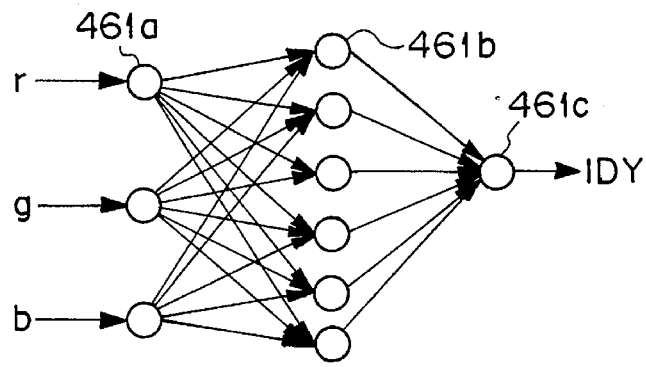
FIGS. 23a through 23d are diagrams showing the construction of the neural network for presuming the density of each color component in the seventh embodiment.

The Y density estimating neural network as shown in FIG. 23a comprises input layers 461a, intermediate layers 461b, and an output layer 461c. The respective signals r, g, and b from the scanner γ-correction circuit 33 are input into the input layers 461a, and the output layer 461c outputs the Y density value IDY.

Figure 23B:
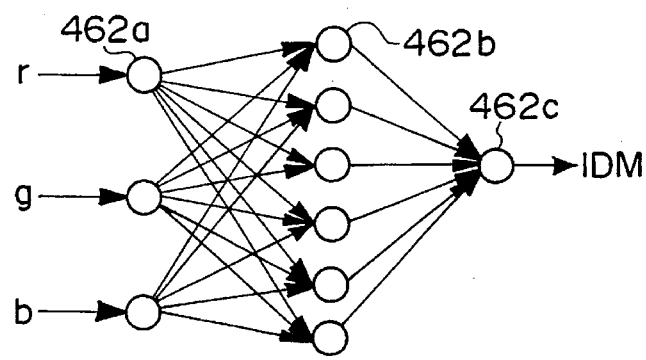

The M density estimating neural network as shown in FIG. 23b comprises input layers 462a, intermediate layers 462b, and an output layer 462c. The respective signals r, g, and b from the scanner γ-correction circuit 33 are input into the input layers 462a, and the output layer 462c outputs the M density value IDM.

Figure 23C:
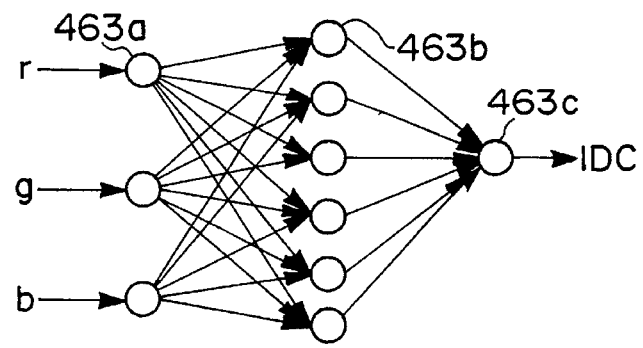

The C density estimating neural network as shown in FIG. 23c comprises input layers 463a, intermediate layers 463b, and an output layer 463c. The respective signals r, g, and b from the scanner γ-correction circuit 33 are input into the input layers 463a, and the output layer 463c outputs the C density value IDC.

Figure 23D:
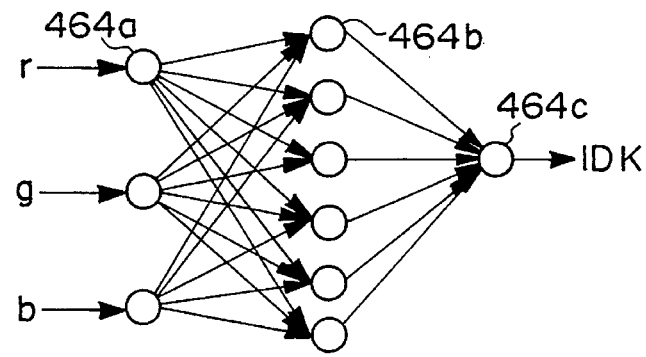

The K density estimating neural network as shown in FIG. 23d comprises input layers 464a, intermediate layers 464b, and an output layer 464c. The respective signals r, g, and b from the scanner γ-correction circuit 33 are input into the input layers 464a, and the output layer 464c outputs the K density value IDK.

The γ-correction can be obtained by converting the signals r, g, and b for the respective color patches for respective colors of the values 1–N to the respective color density values in the color density estimating portion 46. In the γ-correction curve creating portion 48, the γ-correction curve is created in accordance with FIG. 22 by the output of the color density estimating portion 46 and that of the achromatic color estimating portion 47 from the density for each color component corresponding to the END value and the γ-characteristic for each color component.

In the seventh embodiment, the color patch created in the color patch creating circuit 45 is read out by the color dissolving portion 31, and the γ-correction curve is created from the density value for each color component at the time of outputting the achromatic color and the γ-characteristic for each END color component. Consequently, the most suitable γ-correction curve can be created, the image quality adjusting time of the image processing apparatus constructed with the color copier can be shortened, and the density can be made linear.

Now, the eighth embodiment of the present invention will be explained. In the aforementioned seventh embodiment, it is necessary to create a large number of color patches created by use of the color patch creating circuit 45 and to read out those created color patches by use of the color dissolving portion 31. In the eighth embodiment, the combination of the density value of the respective color components at the time of previously reviving the achromatic color and the END have been already obtained in order to improve the above matters.

Figure 24:
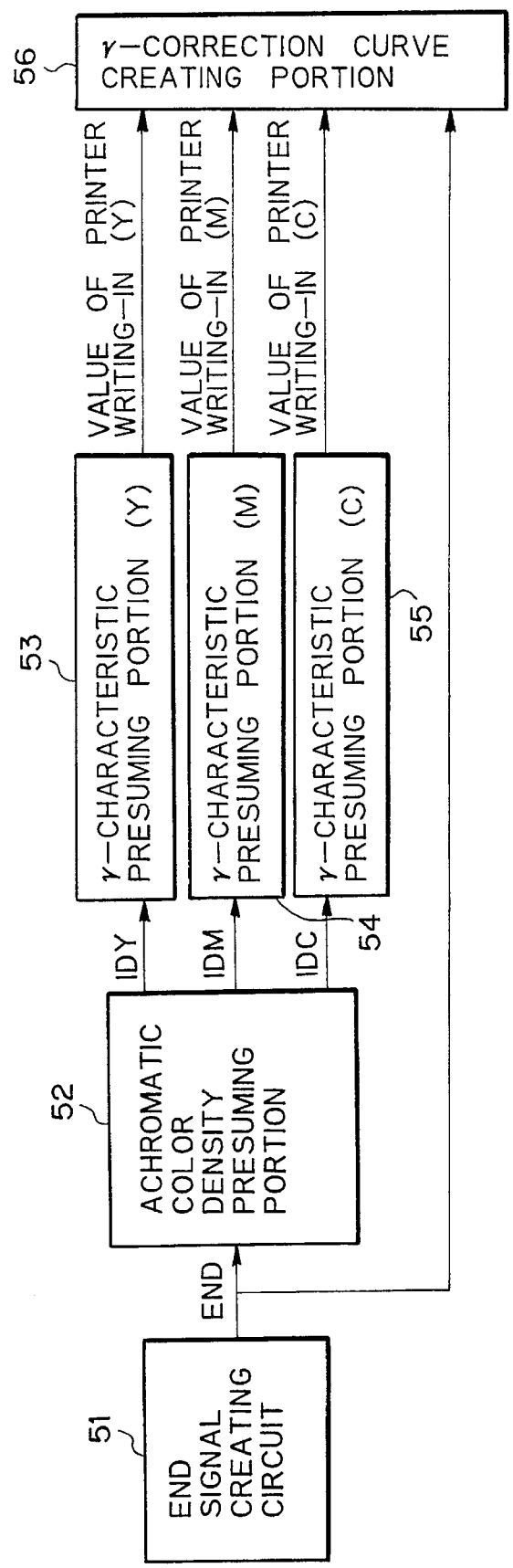
FIG. 24 is a block diagram showing the construction of the γ-correction curve creating portion in an eighth embodiment according to the present invention.
Figures 25, 26:
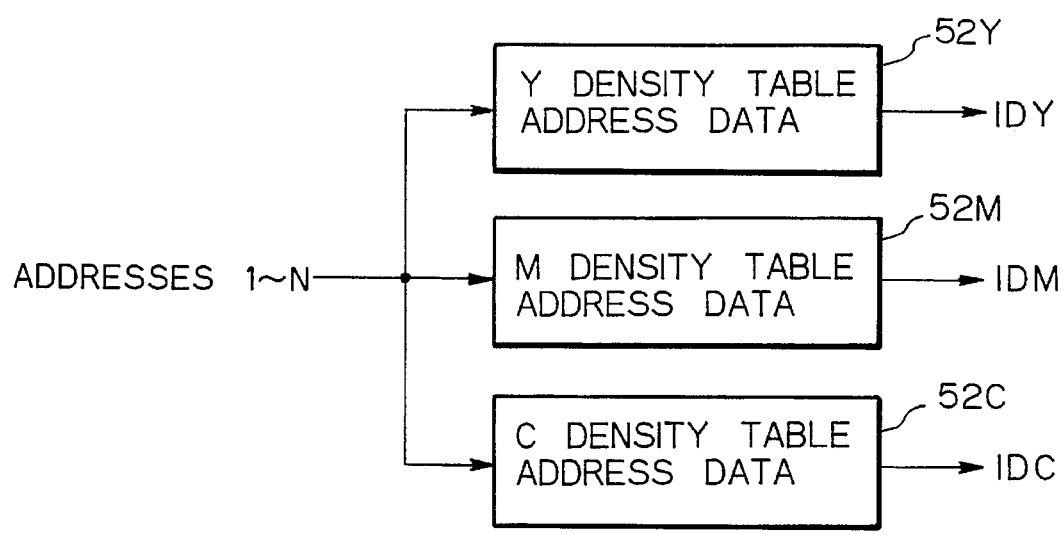
FIG. 25 is a diagram showing the relationship between the END of the achromatic color density estimating portion and the Y,M,C densities in the eighth embodiment.
FIG. 26 is a block diagram showing the construction of the same achromatic color density estimating portion.

FIG. 24 is a block diagram showing the construction of the correction curve creating portion in the eighth embodiment according to the present invention. The eighth embodiment comprises an END signal creating circuit 51, an achromatic color density estimating portion 52, respective YMC γ-characteristic estimating portions 53, 54, and 55, and a γ-correction curve creating portion 56. The achromatic color density estimating portion 52 outputs the color density value for each color component on the basis of the output of the END signal creating circuit 51 from the Y density table 52Y, the M density table 52M, and the C density table 52C, all of which store the relationship between the respective color components END and Y, M, C as shown in FIG. 25 and FIG. 26.

The Y density table 52Y, the M density table 52M, and the C density table 52c are respectively constructed with ROMS. The density values of the respective color component as shown in FIG. 25 corresponding to the END signal are written in the same addresses of the respective ROMS. The END signal creating circuit 51 creates the addresses as shown in FIG. 26 corresponding to the END signal. In the γ-characteristic estimating portions 53, 54, and 55, the γ-characteristic creating circuit is employed. The circuit uses the neural network as shown in FIG. 14. The neural network previously studies the relationship between the γ-characteristic curve selecting value and the output of the achromatic color density estimating portion 52 IDY, IDM, and IDC, and the printer writing-in values of the respective color densities of the respective γ-characteristic curves. The γ-characteristic curve selecting value and the outputs of the achromatic color density estimating portions 52Y, 52M, and 52C are input to the neural network, and the printer writing-in values of the respective color densities are output therefrom. The γ-correction curve creating portion 56 makes the END signal linear by creating the γ-correction curve as shown in FIG. 22 from the printer writing-in value of the densities of the respective colors emitted from the γ-characteristic estimating portions 53, 54, and 55. In the eighth embodiment, since the γ-correction curve is created from the density value for each color component at the time of outputting the achromatic color and the γ-characteristic for each END color component, the most suitable γ-correction curve can be created, the image quality adjusting time of the image processing apparatus constructed with the color copier can be shortened, and the density can be made linear.

Figure 27:
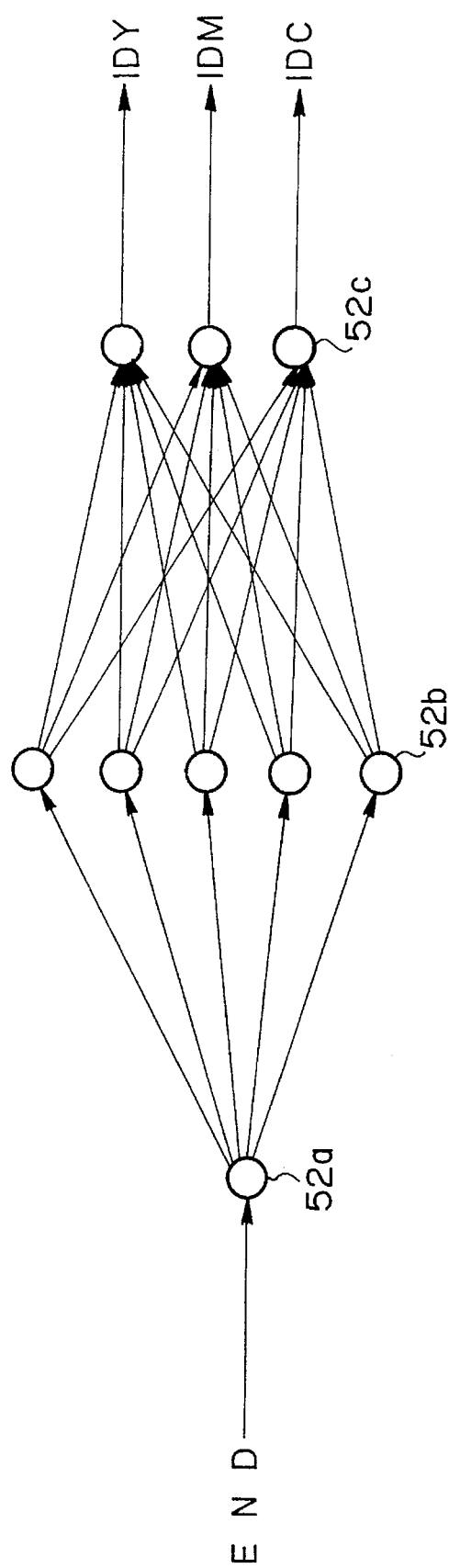
FIG. 27 is a diagram showing the construction of the neural network for estimating the achromatic color density in a ninth embodiment according to the present invention.

Now, the ninth embodiment of the present invention will be explained. In the eighth embodiment, the relationships between the END and the color density are as shown in FIG. 25 and the same are held therein. However, it cannot hold the relationships of all END and the respective density values. In order to improve the above matter, the ninth embodiment calculates the data between the respective tables and complements those calculated data. In the ninth embodiment, the achromatic color density estimating portion 52 of the eighth embodiment is constructed with the neural network as shown in FIG. 27. The neural network comprises an input layer 52a, intermediate layers 52b, and output layers 52c and performs the studying of the density value for the respective color component at the time of outputting the achromatic color from the END signal.

As the studying algorithm of the neural network, a method of studying the copied image of the input pattern and the output pattern, for instance, an error inversely transmitting method is employed. The END signal creating circuit 51 creates the END signal. The END signal from the END signal creating circuit 51 is input to the neural network for constructing the achromatic color density estimating portion 52, and the neural network outputs the density values IDY, IDM, and IDC for the respective color components at the time of outputting the achromatic color to the γ-characteristic estimating portions; 53, 54, and 55. In the ninth embodiment, since the achromatic color density estimating portion 52 constructed with the neural network creates the γ-correction curve from the γ-characteristic for each color component at the time of outputting the achromatic color, the image quality adjusting time of the image processing apparatus constructed with the color copier capable of creating the most suitable γ-correction curve can be shortened, and further the density can be made linear.

Now, the sixth embodiment of the present invention will be explained. In the third and fourth embodiments and the modifications thereof, although the density can be made linear by γ-correcting the density value of the black (monochrome) as shown in FIG. 6, if the γ-correction curve is created for each color component by use of the color printer and the color copier outputting the color image with three-color or four-color toner as in the case of those embodiments or modifications thereof, the density value for each color component can be γ-corrected linearly. However, it is insufficient to receive the achromatic color. In order to improve the above matter, in the tenth embodiment of the present invention, the γ-correction is performed from the combination of the brightness L, at the time of receiving the achromatic color and the respective density values of the color component at that time.

Figure 28:
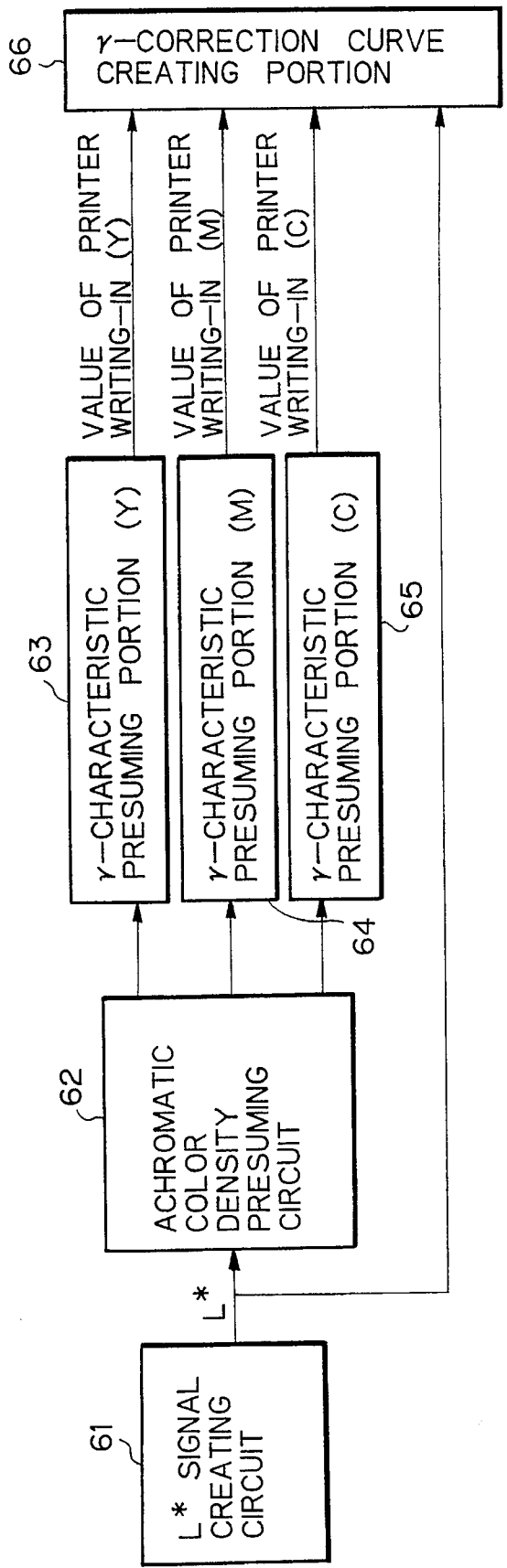
FIG. 28 is a block diagram showing the construction of the γ-correction curve creating portion in a tenth embodiment according to the present invention.
Figure 29:
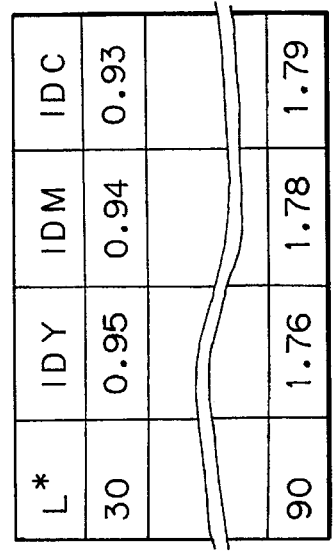
FIG. 29 is a diagram showing the relationship between the L of the achromatic color density estimating portion and the Y,M,C densities in the tenth embodiment.

FIG. 28 is a block diagram showing the construction of the Y correction curve creating portion in the tenth embodiment according to the present invention. The tenth embodiment comprises an L signal creating circuit 61, an achromatic color density estimating portion 62, respective YMC γ-characteristic estimating portions 63, 64, and 65, a γ-correction curve creating portion 66. The achromatic color density estimating portion 62 holds the relationship of the brightness at the time of reviving the achromatic color as shown in FIG. 29 and the density value for each color component. When the brightness is input to the estimating portion 62 from the L* signal creating circuit 61, the portion 62 outputs the density value for each color component at the time of reviving the achromatic color.

Figure 30:
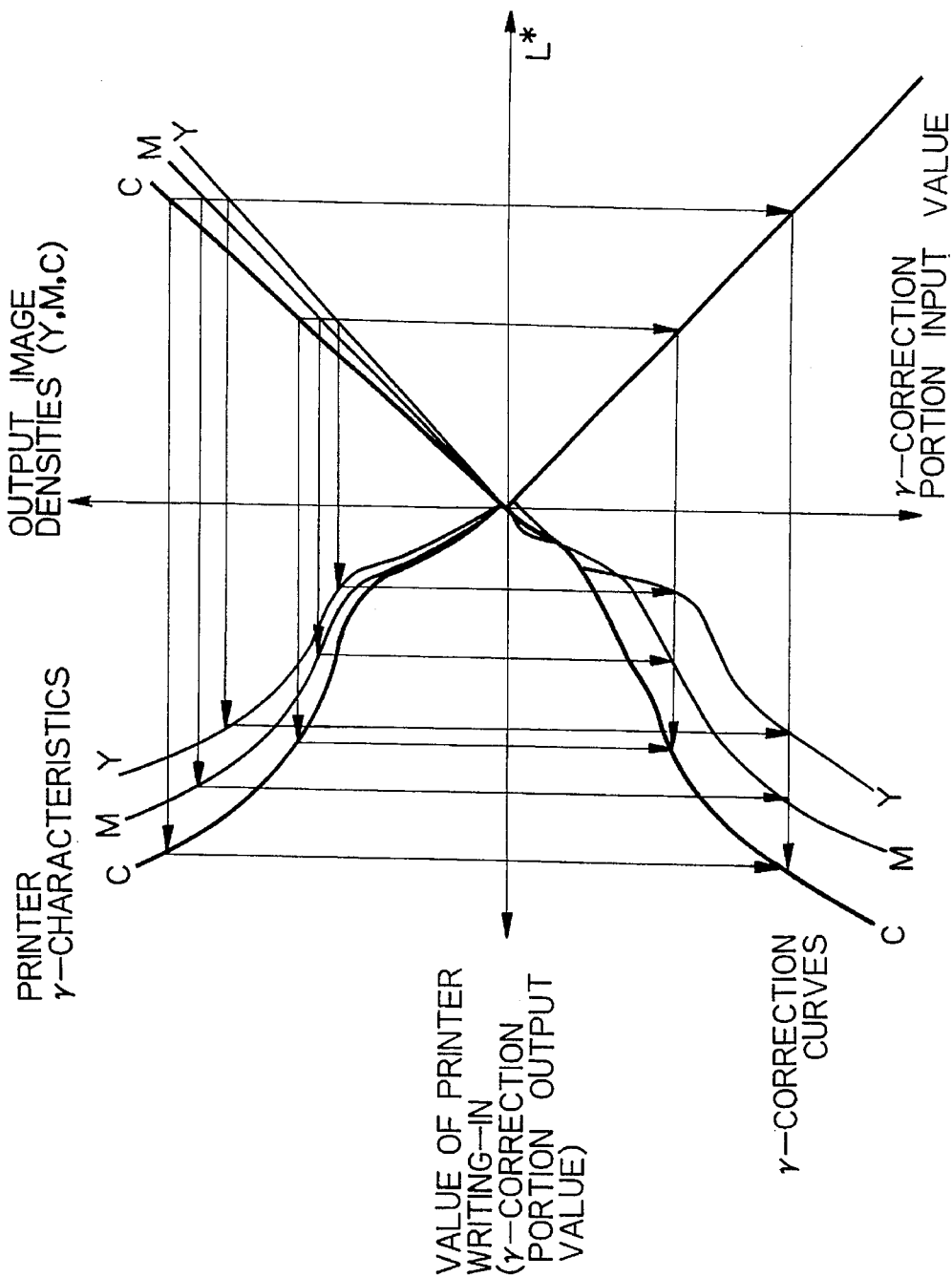
FIG. 30 is a diagram showing the relationship between the printer γ-characteristic and the γ-correction curve.

The LUT including the ROM shown in FIG. 26 is employed as the achromatic color density estimating portion 62. The density values for each component as shown in FIG. 29 corresponding to the brightness L* are written in the same addresses of those respective ROMS. The L, signal creating circuit 61 creates the addresses as shown in FIG. 26 corresponding to the L* signal. The γ-characteristic estimating portions 63, 64, and 65 employ the γ-characteristic creating portion constructed with the neural network as shown in FIG. 14, and output the printer writing-in value of the respective densities from the output of the achromatic color density estimating portion 62 and the γ-characteristic curve selecting value. The γ-correction curve creating portion 66 creates the correction curve as shown in FIG. 30 from the printer writing in value of the respective color densities emitted from the γ-characteristic estimating portions 63, 64, and 65, and thereby the brightness can be made linear.

Figure 31:
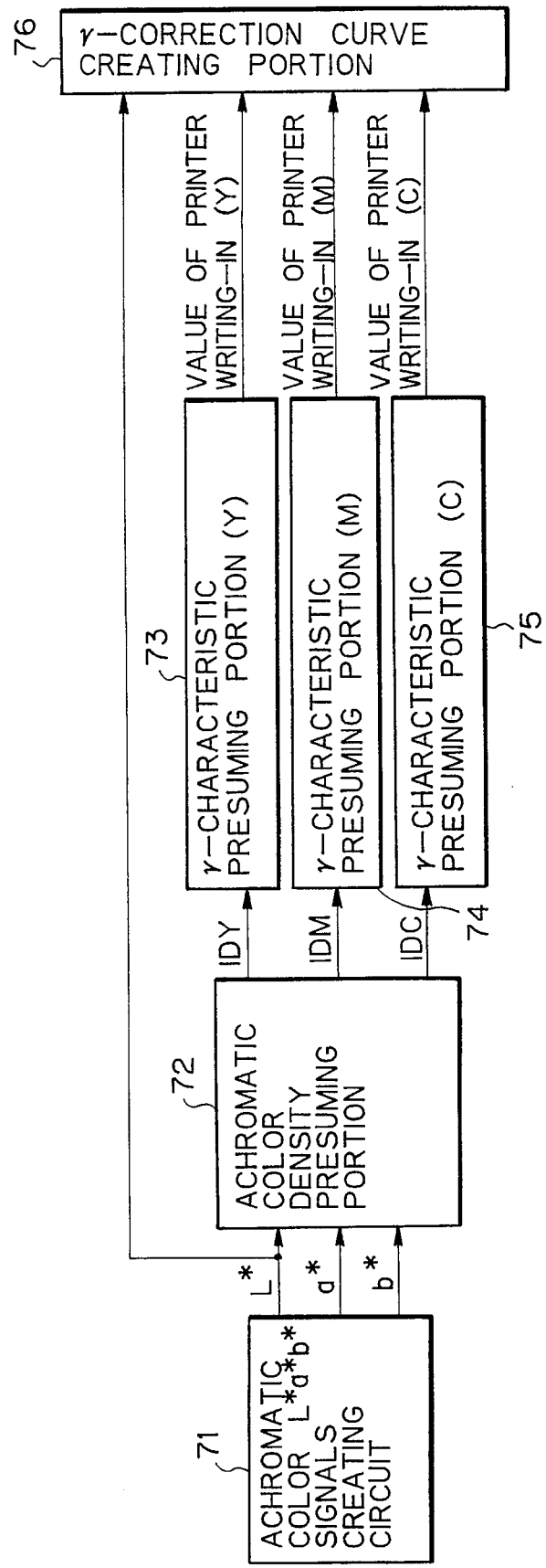
FIG. 31 is a block diagram showing the construction of the γ-correction curve creating portion in an eleventh embodiment according to the present invention.
Figure 32:
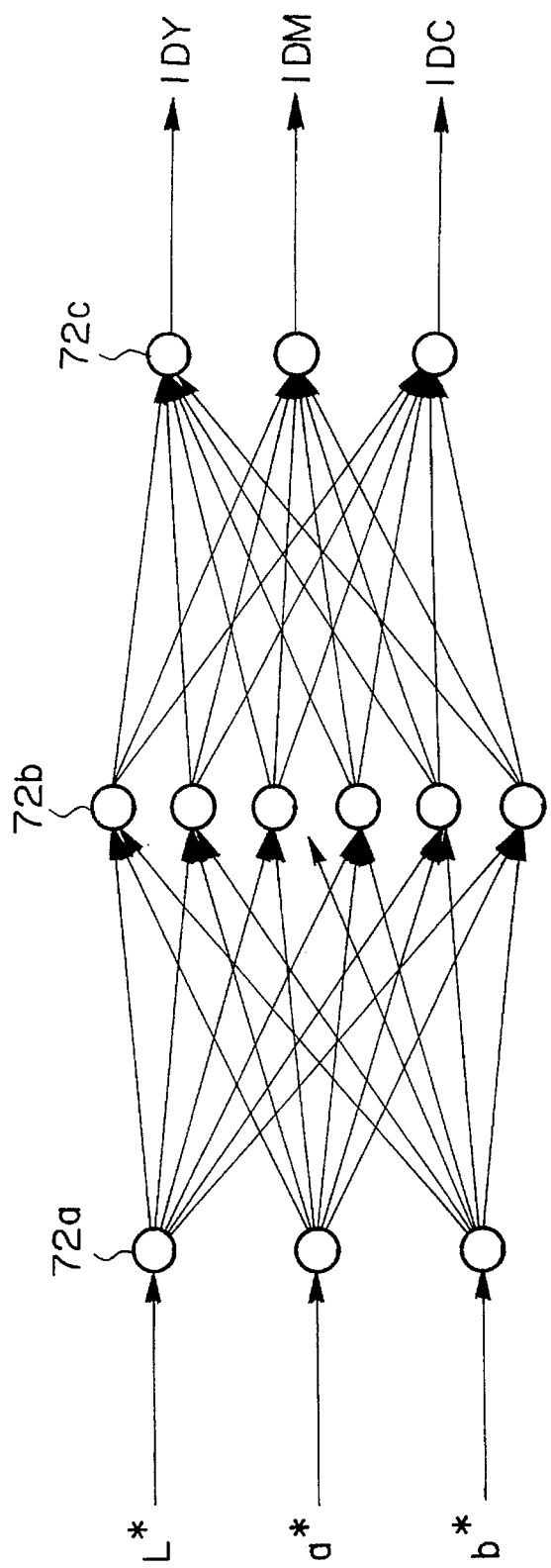
FIG. 32 is a diagram showing the construction of the achromatic color density estimating portion in the neural network of the eleventh embodiment.

Now, the eleventh embodiment of the present invention will be explained. In the aforementioned tenth embodiment, since the relationship between the brightnesses and the respective color densities is held in a table such as shown in FIG. 29, it follows that the relationship between all of the brightnesses and the respective color densities turns out to be held and such state is not practical. In the eleventh embodiment of the present invention, in order to improve the above matter, the data between the respective tables are calculated and complemented by use of the neural network. FIG. 31 is a block diagram showing the construction of the correction curve creating portion in the eleventh embodiment according to the present invention. The eleventh embodiment comprises an achromatic color L*a*b* signal creating circuit 71, an achromatic color density estimating portion 72, respective YMC γ-characteristic estimating portions 73, 74, and 75, and a correction curve creating portion 76. The achromatic color density estimating portion 72 is constructed with the neural network as shown in FIG. 32. The neural network comprises an input layer 72a, an intermediate layer 72b, and an output layer 72c. Assuming that, when the values of Y, M, C densities are, respectively IDY, IDM, and IDC, and the color signals thereof are L*, a*, and b*, studying of the neural network is previously done such that the signals L*, a*, and b* are input to the neural network from the achromatic color signals L* a* b* creating circuit 71, and the neural network outputs IDY, IDM, and IDC.

As the studying algorithm of the neural network, a method of studying the copied image of the input pattern and the output pattern, for instance, an error inversely-transmitting method can be employed.

In the achromatic color signals L*a*b* creating circuit 71, when L, is changed upon the condition of a*=b*=O, the respective color density values at the time of reviving the achromatic color are calculated in the achromatic color density estimating portion 72 constructed with the neural network as the γ-characteristic estimating portions 73, 74, and 75, the γ-characteristic creating circuits employing the neural network as shown in FIG. 14 are used, and the circuit outputs the density values; IDY, IDM, and IDC for each color component from the achromatic color density estimating portion 72, and the same outputs the printer writing-in for each color component from the γ-characteristic curve selecting value. The γ-correction curve creating portion 76 creates the γ-correction curve as shown in FIG. 29 from the printer writing-in values of the respective color densities emitted from the γ-characteristic estimating portions 73, 74, and 75. In the eleventh embodiment, since the achromatic color density estimating portion 72 constructed with the neural network creates the γ-correction curve from the relationship between the density value and brightness for each other component at the time of outputting the achromatic color and the γ-characteristic for each color component, the most suitable γ-correction curve can be created and the image quality adjusting time of the image processing apparatus can be shortened, and further the brightness can be made linear.

The twelfth embodiment of the present invention will now be described. In the above-mentioned eleventh embodiment, in order to create the achromatic color patch, it is necessary to prepare a clear patch creating circuit 45 for outputting the color patch signal, a color dissolving portion 31 for reading out the color patch signal, and an achromatic color portion 47, and further it is necessary to create the patch and read out the patch. In order to improve the above matter, the sixteenth embodiment creates suspectedly the color dissolving signal, estimates the combination of the respective color components at the time of reviving the achromatic color, and creates the γ-correction curve.

Figure 33:
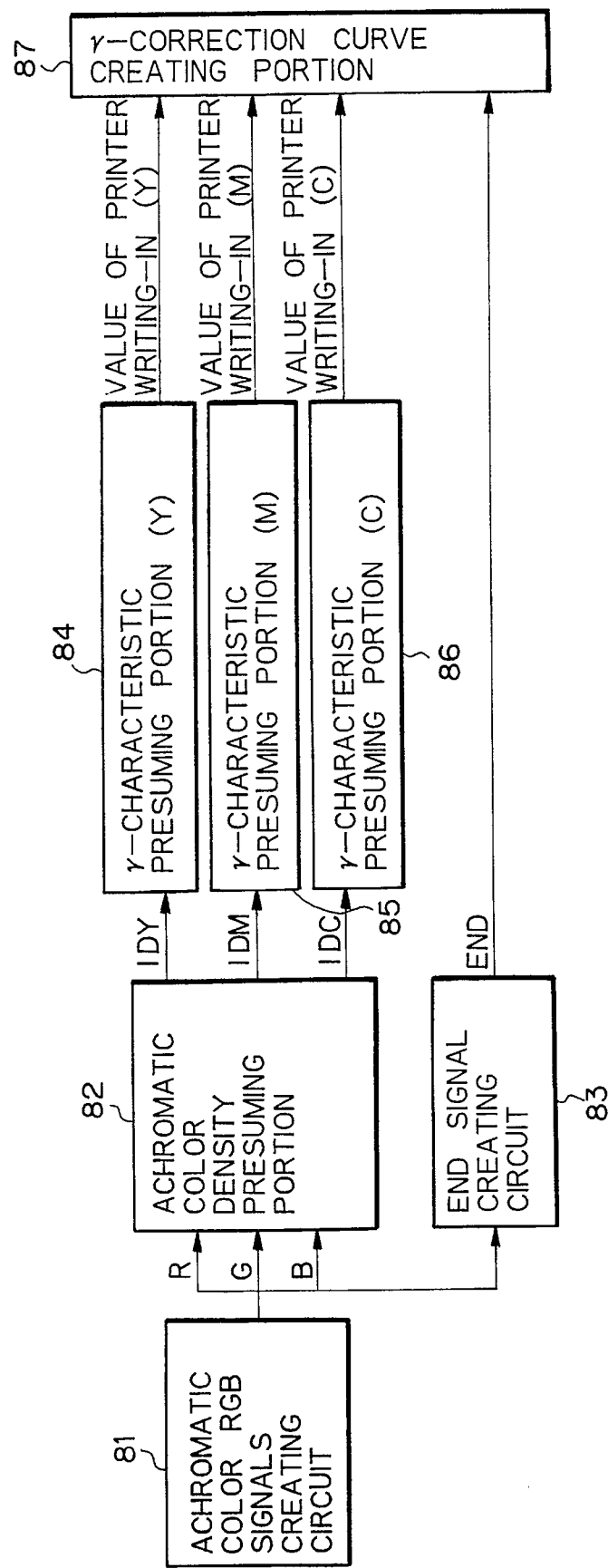
FIG. 33 is a block diagram showing the construction of the γ-correction curve creating portion in a twelfth embodiment according to the present invention.

FIG. 33 is a block diagram showing the construction of the correction curve creating portion in the twelfth embodiment according to the present invention. The twelfth embodiment comprises an achromatic color RGB signals creating circuit, an achromatic color density estimating portion 82, and END signal creating circuit 83, respective YMC γ-characteristic estimating portions 84, 85, and 86, and a γ-correction curve creating portion 87. The achromatic density estimating portion 82 estimates the density values of Y, M, C, IDY, IDM, and IDC from the color dissolving signals R, G, and B with the following equality.

$$\begin{bmatrix} IDY \\ IDM \\ IDC \end{bmatrix} = \begin{bmatrix} a11 & a12 & a13 \\ a21 & a22 & a23 \\ a31 & a32 & a33 \end{bmatrix} \begin{bmatrix} R \\ G \\ B \end{bmatrix} \quad \text{[Equality 1]}$$

R, G, and B are respective color dissolving signal at the time of superposing the density values IDY, IDM, and IDC of the respective color components, and aij is determined by the method of least square. In the achromatic color RGB signal creating circuit 81, if R, G, and B are created on the condition of R=G=B, the achromatic color density estimating portion 82 revives the respective color densities at the time of reviving the achromatic color. The END signal creating circuit 83 creates the END signal at the time of R=G=B by use of R, G, and B emitted from the achromatic color RGB signal creating circuit 81.

The γ-characteristic estimating portions 84, 85, and 86 use the γ-characteristic creating circuit employing the neural network as shown in FIG. 14. The neural network outputs the printer writing value for each color component from the output of the achromatic color density estimating portion 82 and the γ-characteristic curve selecting value. The γ-correction curve creating portion 87 creates the γ-correction curve as shown in FIG. 22 from the printer writing in value of the respective color densities emitted from the γ-characteristic estimating portions 84, 85, and 86 and the END, and thereby makes the END linear. In the twelfth embodiment, since the γ-correction curve is created from the relationship between the density value for each color component at the time of outputting the achromatic color and the color dissolving signal and the γ-characteristic for each color component, the most suitable γ-correction curve can be created, the image quality adjusting time of the image processing can be shortened, and the brightness can be made linear.

Figure 34:
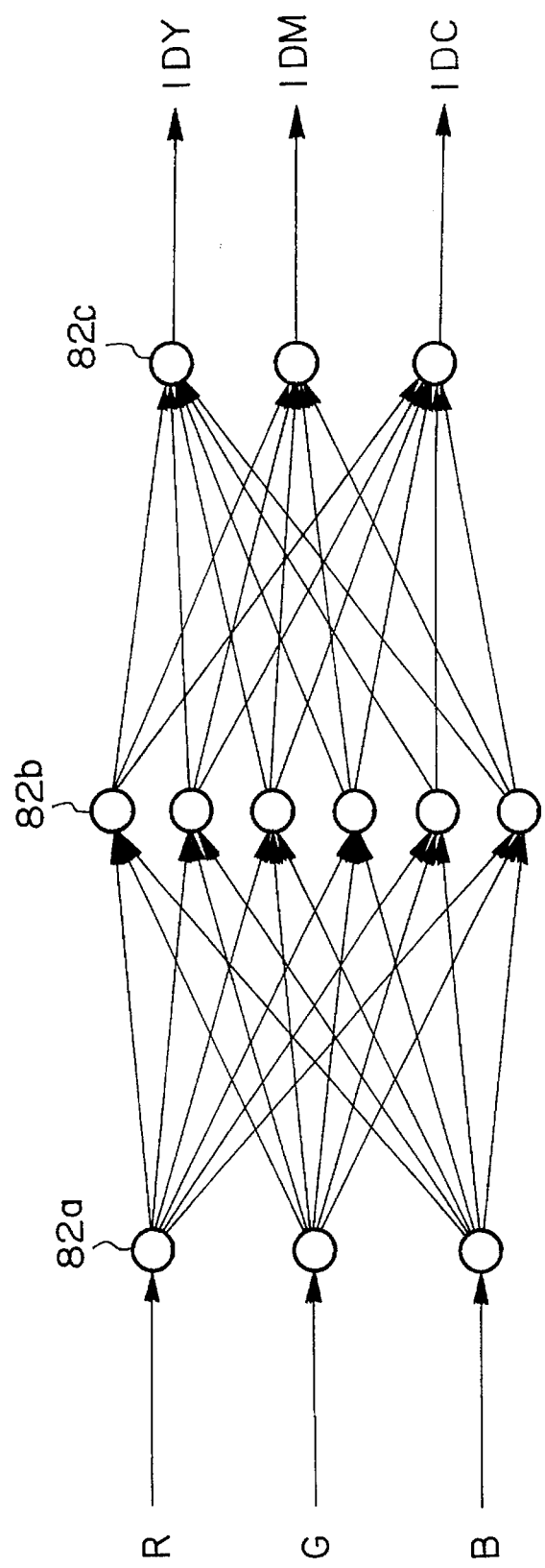
FIG. 34 is a diagram showing the construction of the achromatic color density estimating portion in the neural network of a thirteenth embodiment according to the present invention.
Figure 35:
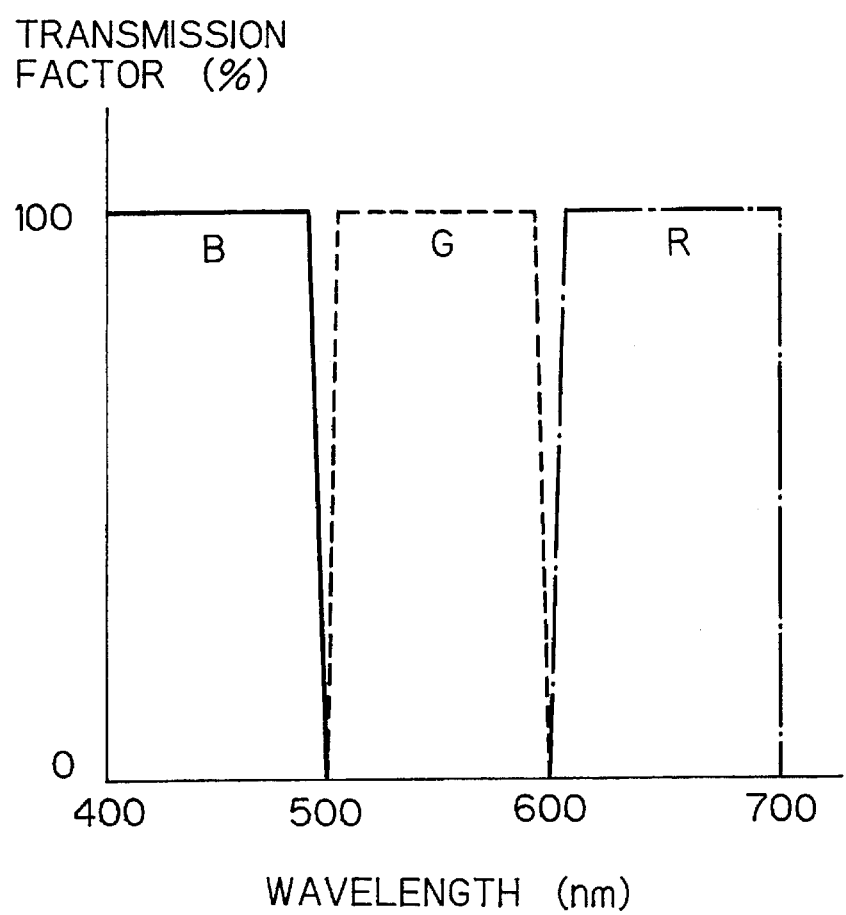
FIG. 35 is a characteristic diagram showing the transmission factor characteristics of ideal color dissolving filters.
Figure 36:
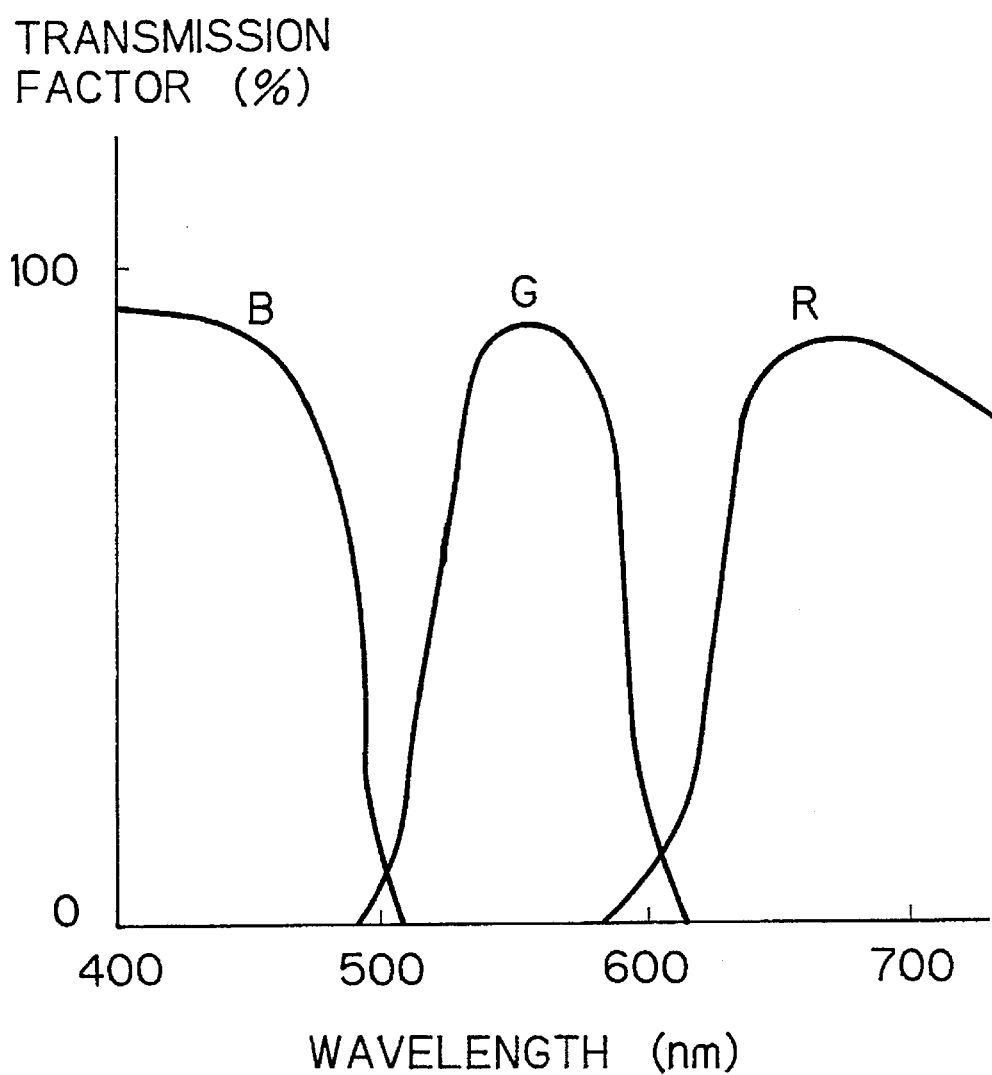
FIG. 36 is a characteristic diagram showing the transmission factor characteristics of actual color filters.
Figure 37:
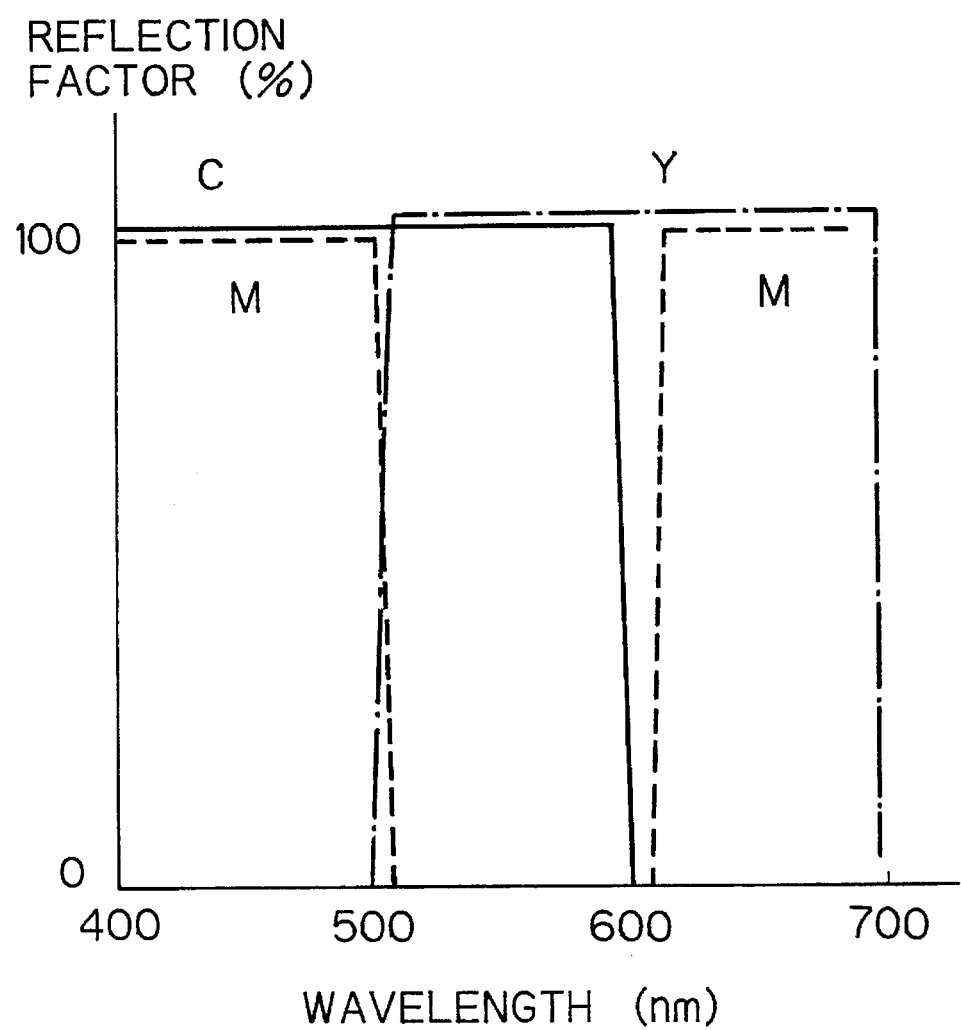
FIG. 37 is a characteristic diagram showing the spectrum reflection factor characteristics of an ideal toner.
Figure 38:
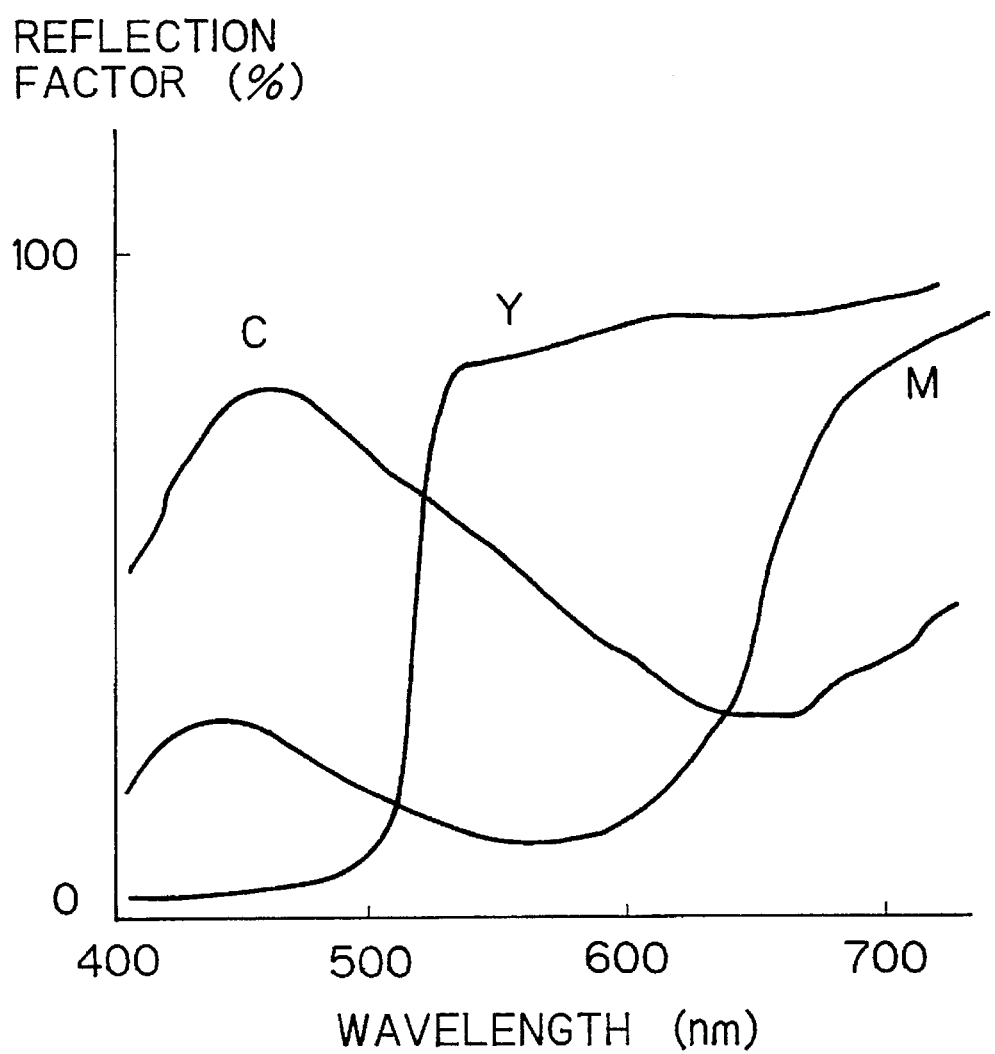
FIG. 38 is a characteristic diagram showing the spectrum reflection factor characteristic of actual color toner.
Figure 40:
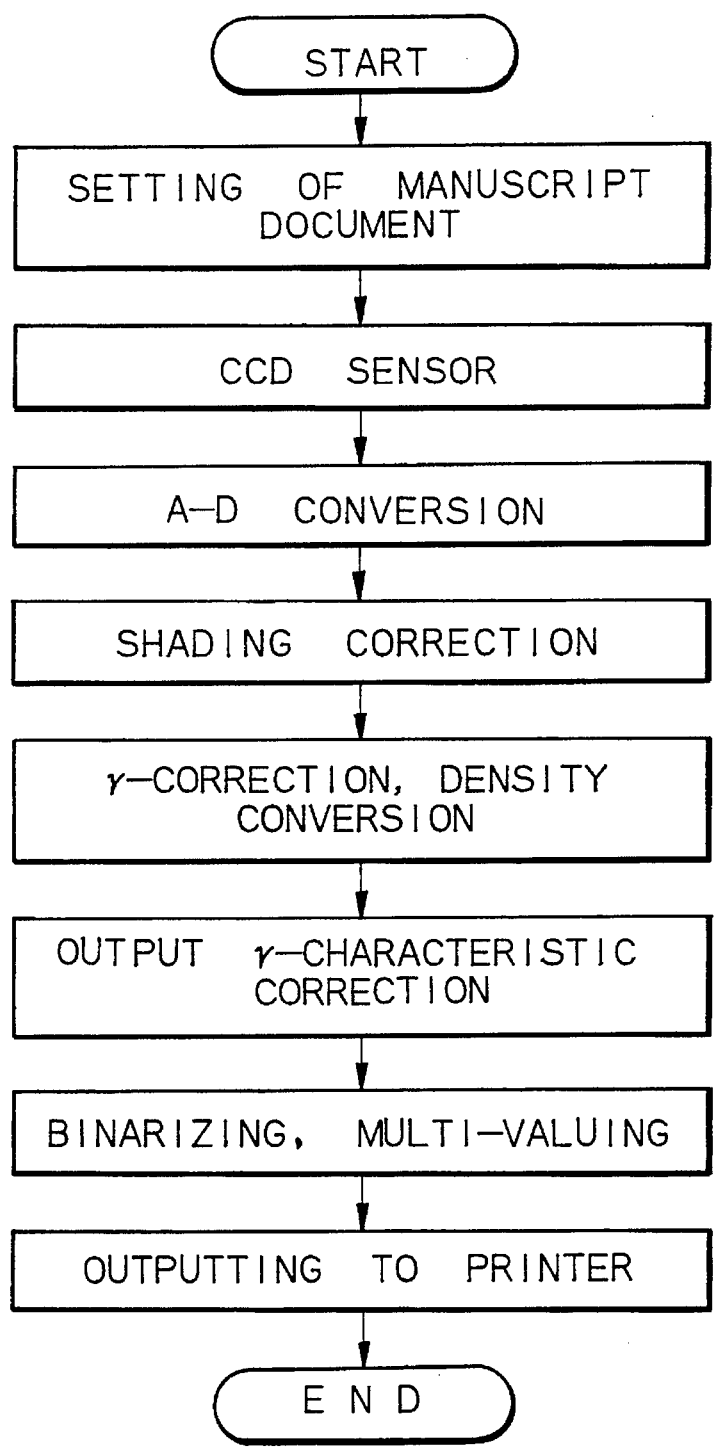
FIG. 40 is a flow chart showing the processing flow of the digital black-and-white copying machine.
Figure 41:
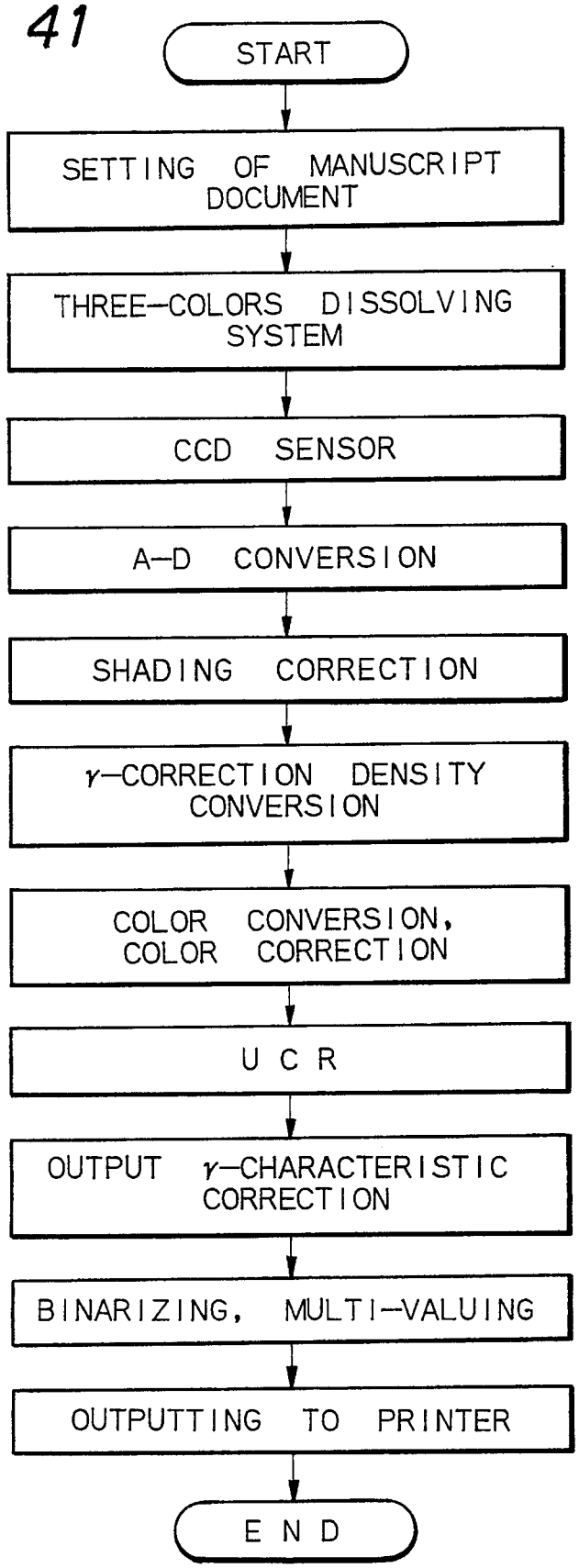
FIG. 41 is a flow chart showing the processing flow of the digital color copying machine.

Now, the thirteenth embodiment of the present invention will be explained. In the above-mentioned twelfth embodiment, although the density values of the respective colors can be obtained with a least squares method of least square from the RGB colors dissolving signal, the approximation error becomes large. In the thirteenth embodiment, in order to improve the above matter, the density value for each color is calculated and complemented by use of the neural network. In the thirteenth embodiment, the achromatic color density portion 82 of the twelfth embodiment is constructed with the neural network as shown in FIG. 34. The neural network comprises an input layer 82a, an intermediate layer 82b, and an output layer 82c, and the same previously studies so as to output IDY, IDM, and IDC when R, G, and B emitted from the achromatic color RGB signals creating circuit are input to the neural network. As the studying algorithm of the neural network, a method of studying the copied image of the input pattern and the output pattern, for instance, an error inversely-transmitting method is employed.

In the achromatic color RGB signals creating circuit 81, if the RGB signals are created on the condition of R=G=B, the neural network constructing the achromatic density estimating portion 82 calculates the respective color densities from R, G, and B emitted from the achromatic color RGB signals creating circuit 81. In the thirteenth embodiment, since the achromatic color density estimating portion constructed with the neural network creates the γ-correction curve from the relationship between the density value for each color component at the time of outputting the achromatic color and the γ-characteristic for each color component, the most suitable γ-correction curve can be created, the image quality adjusting time of the image processing apparatus can be shortened, and the brightness can be made linear.

Figure 42:
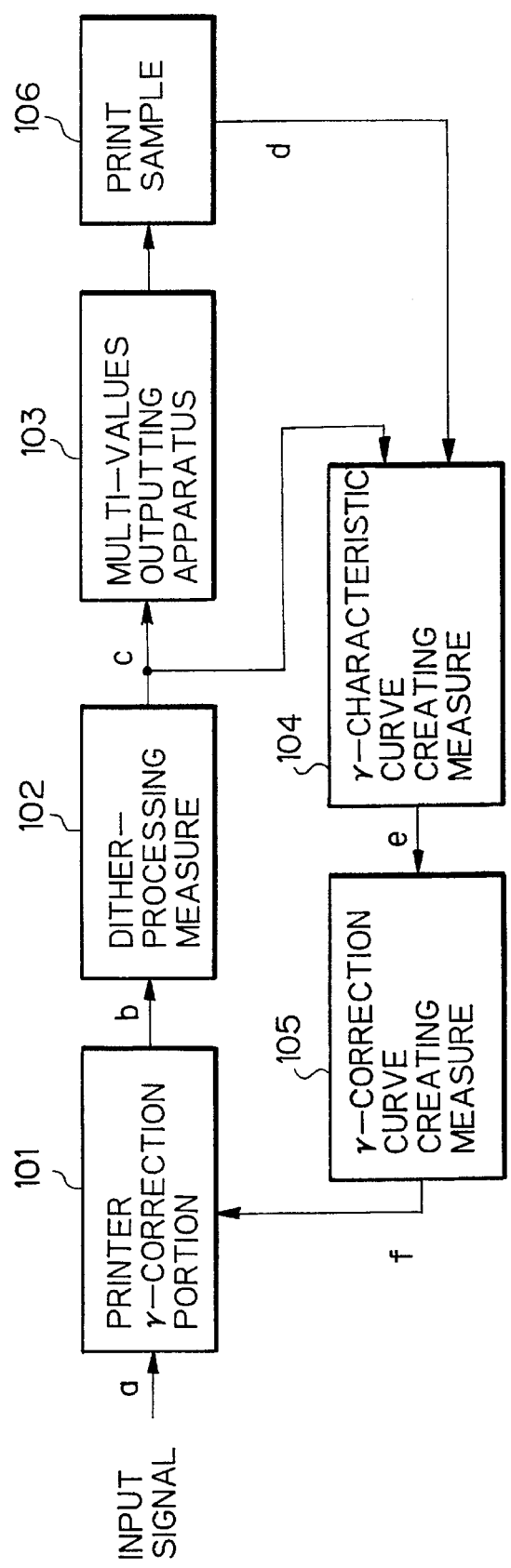
FIG. 42 is a block diagram showing a fourteenth embodiment according to the present invention.

Now, the fourteenth embodiment according to the present invention will be described. FIG. 42 is a block diagram showing the fourteenth embodiment according to the present invention. The embodiment is installed in the image processing apparatus comprising a printer γ-correction portion 101, a dither-processing means 102, and a multi-values outputting apparatus 103, and the embodiment further comprises a γ-characteristic curve creating means 104 and a correction curve creating means 105. The dither-processing means 102 converts the input signal b to N (N>2). The converting method of this dither-processing means 102 enables the halftone reproduction by the multi-value dither method. For instance, a systematic dither method is employed. The multi-values outputting apparatus 103 is a printing apparatus capable of modulating the N-values levels, and the same performs the printing operation by use of the output signal c of the dither-processing means 102.

Figure 43:
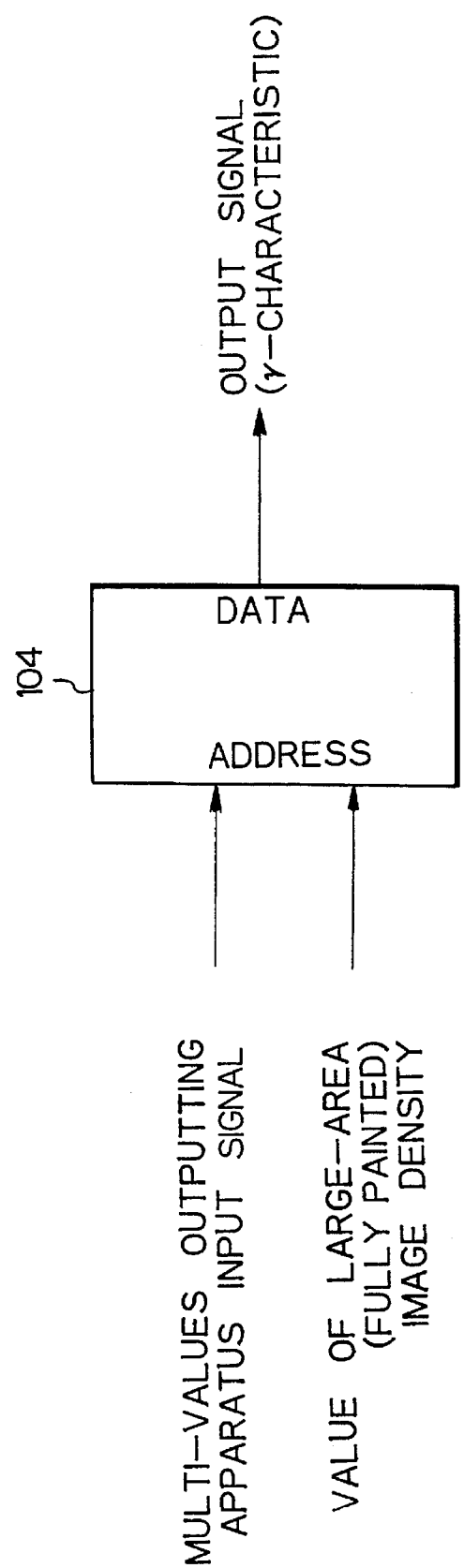
FIG. 43 is a block diagram showing the LUT in the fourteenth embodiment.

The γ-characteristic curve creating means 104 creates the printer γ-characteristic e (the relationship between the input signal b of the dither-processing means 102 and the image density value d of the print sample 106) from the input signal c of the multi-values outputting apparatus and the large-area (fully painted) image density value d. The γ-characteristic curve creating measure 104 is constructed with the LUT including ROM as shown in FIG. 43. Concerning the LUT 104, even though the output γ-characteristic (the relationship between the input signal c of the multi-values outputting apparatus 103 and the large-area (fully painted) image density value d) varies, the output γ-characteristic of the multi-values outputting apparatus 103 and the printer γcharacteristic e have been already obtained previously by experiment so as to enable to obtain the printer γ-characteristic e.

The γ-correction curve creating means 105 creates the most suitable γ-correction curve from the printer γ-characteristic e obtained by the γ-characteristic curve creating means 104. For instance, the same creates the γ-correction curve as shown in FIG. 6. The printer γ-correction portion 101 performs the γ-correction of the input signal a by use of the γ-correction value which is the output signal f of the γ-correction curve creating means 105 so that the printer γ-correction portion 101 makes linear the relationship between the input signal a and the output image density value d.

In the fourteenth embodiment, since the γ-characteristic curve creating means 104 seeks the printer characteristic e, the most suitable γ-correction curve can be created, and the image quality adjusting of the image processing apparatus can be shortened. In connection with the following embodiments the outlined "Image Area Segmentation Method for Documents containing Text/Screened Halftone/Continuous Halftone (Photograph)" is described hereinafter. High-quality image reproduction of documents performs the following discriminate areas containing text from those containing pictures (screened and continuous half tone); process the two types of areas appropriately. There is a new segmentation method including two types of detection. One is to detect adjoining, continuous black and white pixels. The other to detect peaks in the dots within screened halftone areas. We were able to accurately discriminate between text areas and picture areas in 400 dpi, 6-bit image data. In recent years, the digital copying machine and the facsimile device have been prominently popularized and have come into wide use. The needs of the 0 A market that not only the manuscript documents including only characters, but also the documents including the character (text), the screened halftone, and the continuous halftone (photograph) can be reproduced with high image quality have been studied in both the digital copying machine and the facsimile device.

In the case of reproducing the mixed image containing the character, the screened halftone, and the photograph (simply called "mixed image", hereinafter), if the binary processing by the fixed threshold value is performed, it is impossible to express the halftones of the photograph and the screened halftone image of large lines number. In such a situation, when the screened halftone image is printed or the photograph is reproduced, the dither-processing method is often utilized for creating the suspected halftone. However, when the dither-processing method is executed for the mixed image, the characters to be reproduced turns out to be in dotted state. Moreover, the small characters cannot be read out easily. Hereupon, the error-spreading method has been focusing the spotlight of public attention in recent years as the halftone processing method. However, even though the processing by the error-spreading method is executed for the mixed image, it is not yet sufficient from the viewpoint concerning the coexistence of the halftone and the resolution. At the time of reproducing the mixed image of character/screened halftone/photograph, it is effective to adequately change over the character processing and the picture processing and often thereby the reproduced image, as one measure of solving the aforementioned problems. Furthermore, to state the facsimile device, it is advantageous that the different processing steps are respectively executed on the character area and the picture area, and thereby the improvement in the transmission efficiency can be expected. For attaining the above matter, the image area segmentation technology turns out to be very important, for precisely separating the character area and the picture area in the total image area. The studying of the above-mentioned technology has been performed vigorously heretofore.

However, the studying of the technology has been done mainly for the black-and-white manuscript document only. As for the color manuscript document, the missegmentation of the image area has occurred prominently for the character in the picture area of the color screened halftone, in particular. Consequently, the sufficient result of the image area segmentation could not be obtained. The main reason is that, when the color screened halftone is read out by a black-and-white scanner, the information of the primary screened halftone form disappears for the reason of the superposing of the respective Y, M, C, and Bk printing blocks.

Now, the fifteenth embodiment of the present invention will be explained. In the fourteenth embodiment, when the dither-processing means 102 is changed, the printer γ-characteristic e changes also. Consequently, there arises a problem that the γ-correction curve creating means 105 cannot create the γ-correction curve. In the fifteenth embodiment of the present invention, the characteristic curve is created in accordance with the dither measure.

Figure 44:
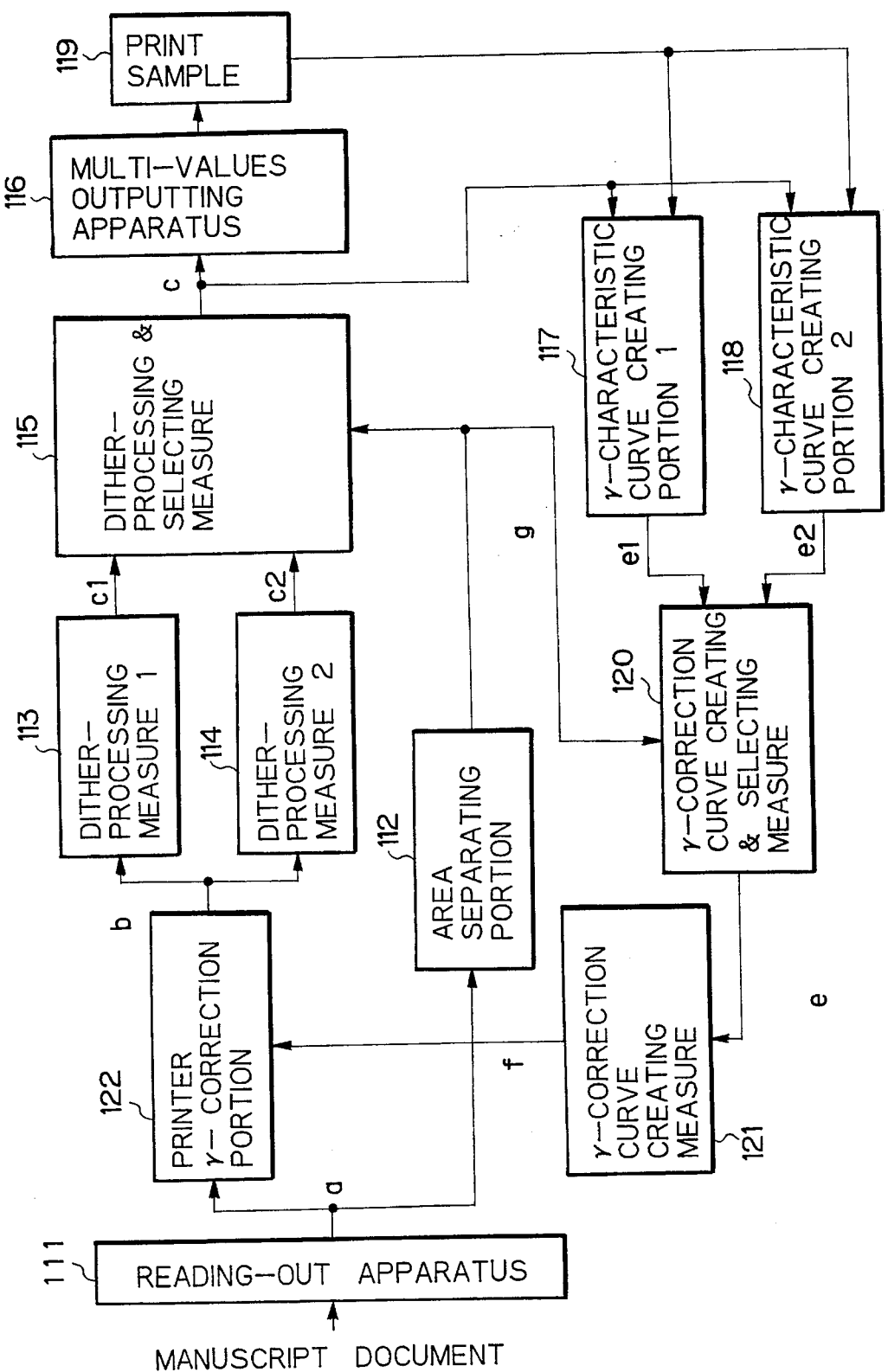
FIG. 44 is a block diagram showing a fifteenth embodiment according to the present invention.

FIG. 44 is a block diagram showing the fifteenth embodiment according to the present invention. The manuscript document reading-out apparatus 111 reads out the manuscript document. For instance, the CCD (Charge Coupled Device) reads out the manuscript document and convert the readout information to the electric signal. The area separating portion 112 judges whether the area of the manuscript document from the output signal a of the reading-out apparatus 111 is a photograph area or a net-point (dotted) area. The area separating portion 112 employs a method of well-known (image) area separating (segmentation) treatment, for instance, in Electronic Information/Communication Academic Magazine (Gakkai-shi) IE90-32. The dither-processing measures 113 and 114 converts the input signal b to C1, C2 of the value N (N>2). The conversion method by the dither-processing measures 113 and 114 is capable of reviving (reproducing) the halftone by use of the multi-values dither method. For instance, as to the dither pattern, a dot-concentrating type of the pattern is employed for the net-point (dotted) area, while a dot-dispersing type of the pattern is employed for the photograph area.

The dither-processing selection means 115 selects one of the output signals of the dither-processing means 113 and 114 in accordance with the output signal of the area separating portion 112. The multi-values outputting apparatus 116 is a printing apparatus capable of modulating the N-value levels, and the same performs a printing operation using the output signal c emitted from the dither-processing selection means 115. The γ-characteristic curve creating portion 117 and 118 creates the printer γ-characteristic (the relationship e1 between the input signal b of the dither-processing means 113 and the image density value d of the print sample 119, and the relationship e2 between the input signal b of the dither-processing means 114 and the image density value d of the print sample), from the input signal c of the multi-values outputting apparatus and the large-area (fully painted) image density value d of the print sample 119 output from the multi-values outputting apparatus. The γ-characteristic curve creating means 104 is constructed with the LUT including the ROM as shown in FIG. 43 as in the case of the fourteenth embodiment. As to the LUTs 117 and 118 (the γ-characteristic curve creating portions 117 and 118), the output γ-characteristic of the multi-values outputting apparatus 116 and the printer γ-characteristics e1 and e2 have been previously obtained experimentally, and in such a manner that the LUTs are completed, such that, even though the output γ-characteristic of the multi-values outputting apparatus 116 (the relation between the input signal c of the multi-values outputting apparatus 116 and the density value d of the large-area (fully painted) image varies, the printer γ-characteristics e1 and e2 can be obtained.

The γ-correction curve creation selecting means 120 selects one of the output signals of the γ-characteristic curve creating portions 117 and 118 in accordance with the output signal g of the area separating portion 112. The γ-correction curve creating means 121 creates the most suitable γ-correction curve from the printer γ-characteristic obtained by the γ-correction curve creation selecting means 120. For instance, the same creates the γ-correction curve as shown in FIG. 6. The printer γ-correcting portion 122 performs the γ-correction of the input signal a by use of the γ-correction value which is the output signal f of the γ-correction curve creating means 121, and thereby the relationship between the input signal a and the output image density value d can be made linear. In the fifteenth embodiment, since the printer γ-characteristics e1 and e2 are obtained by use of the printer γ-characteristic curve creating portions 117 and 118 constructed with the LUT, and one of the obtained printer γ-characteristic curve creating portions 117 and 118 is selected by the γ-correction curve creation selecting measure 120 in accordance with the output signal g of the area separating portion 112, the γ-correction curve creating means 121 can create the most suitable γ-correction curve, and further the image quality adjusting time of the image processing apparatus can be shortened.

Now, the sixteenth embodiment of the present invention will be explained. In the above-mentioned fourteenth embodiment, since the printer γ-characteristic e varies when the dither-processing means 102 is changed, there arises a problem that the γ-correction curve creating means 105 cannot create the γ-correction curve. In such a situation, the sixteenth embodiment of the present invention creates the γ-characteristic curve in accordance with the dither method in order to solve the above problem.

Figure 45:
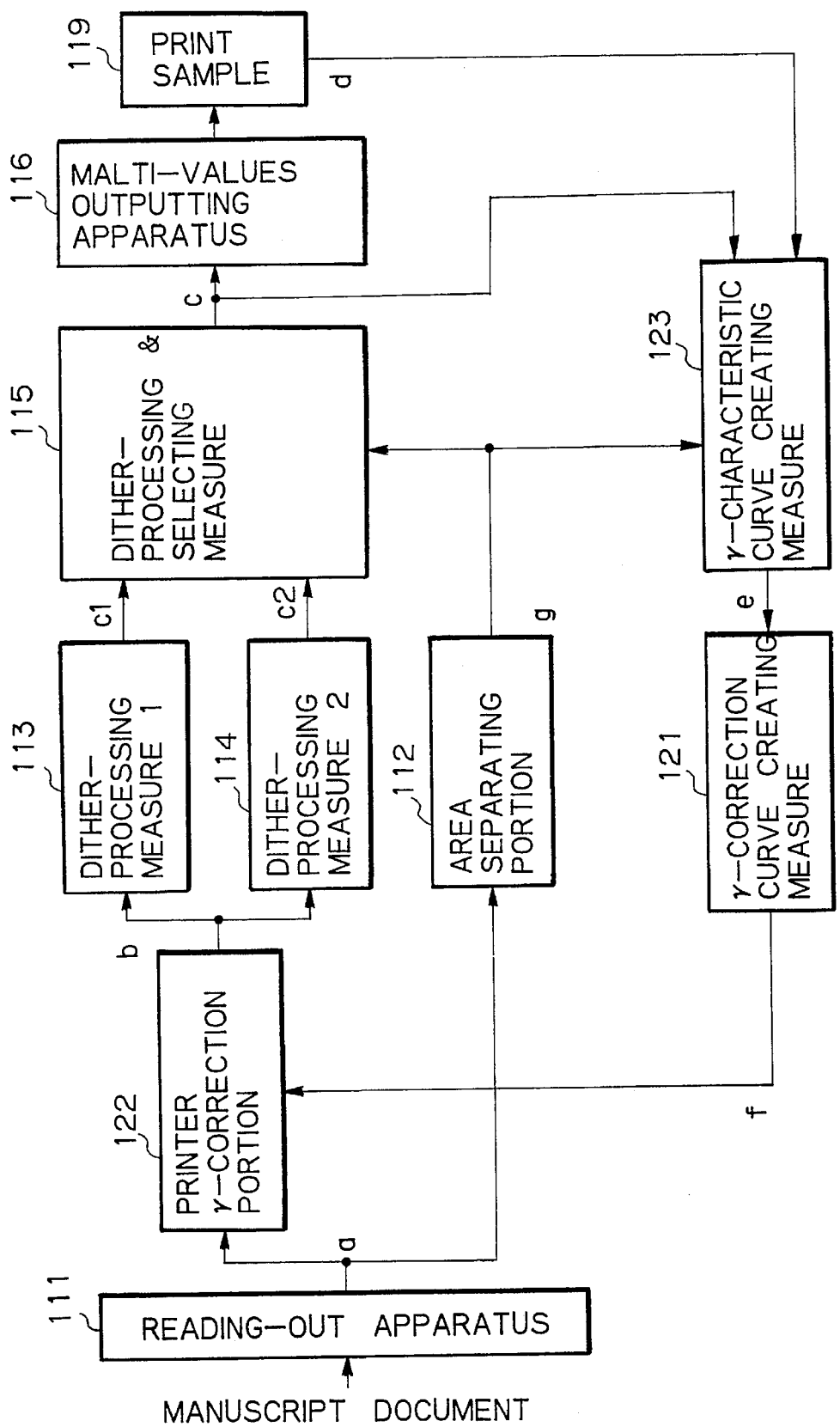
FIG. 45 is a block diagram showing a sixteenth embodiment according to the present invention.
Figure 46:
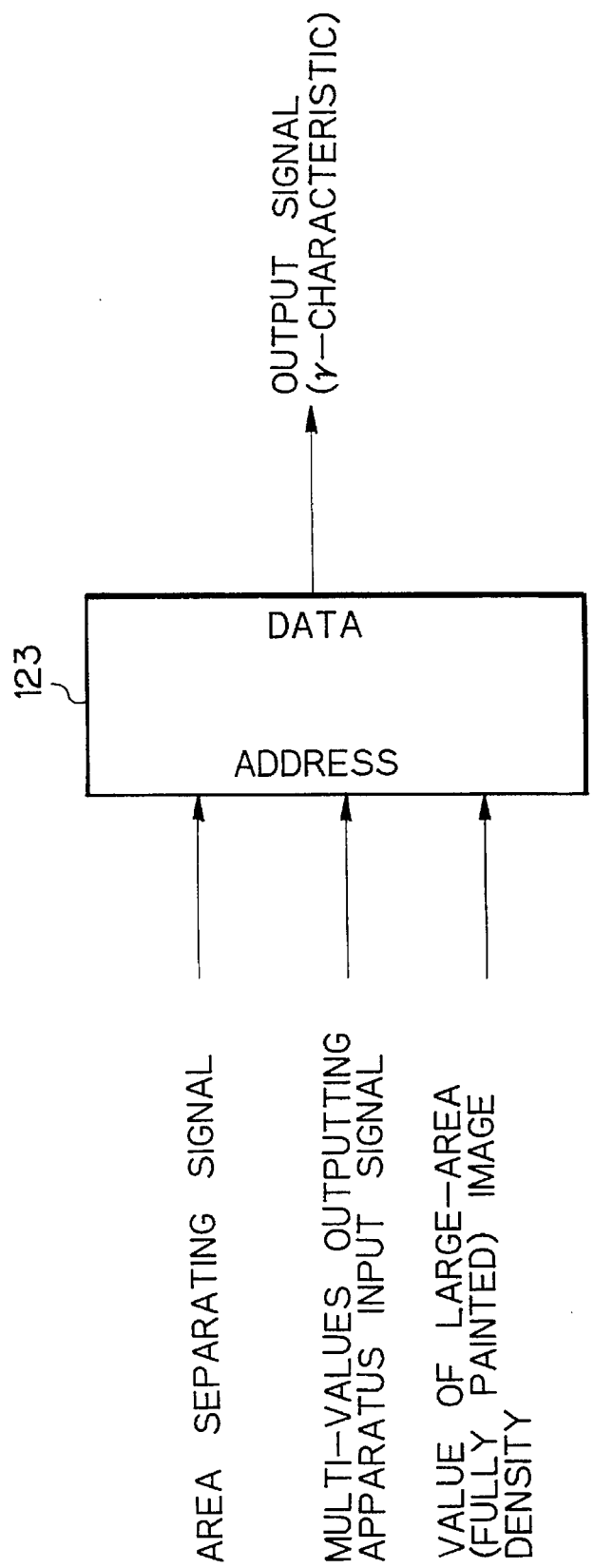
FIG. 46 is a block diagram showing the LUT in the sixteenth embodiment.
Figure 47:
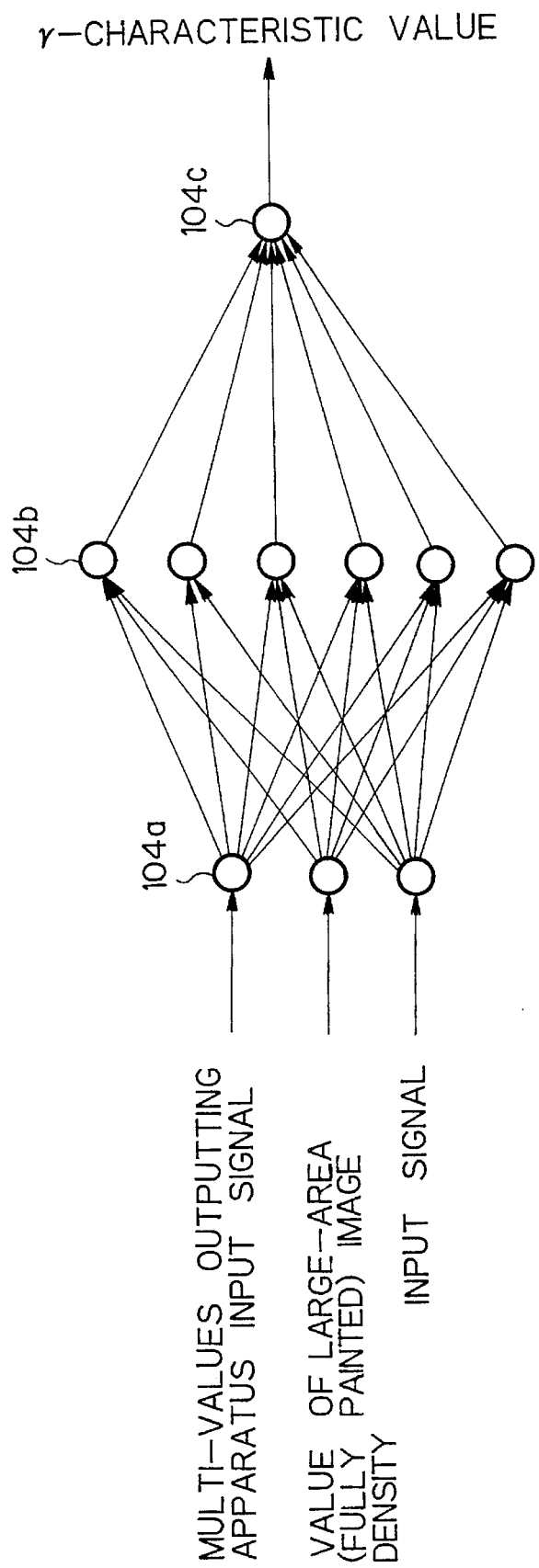
FIG. 47 is a diagram showing a neural network for creating the γ-characteristic curve in a seventeenth embodiment (and its modifications) according to the present invention.

FIG. 45 is a block diagram showing the sixteenth embodiment according to the present invention. In the sixteenth embodiment, the γ-characteristic curve creating measure 123 of the above-mentioned fifteenth embodiment creates either one of the printer γ-characteristic, (the relationship between the input signal b of the dither processing means 113 and the image density value d of the print sample 119) and the printer γ-characteristic 2 (the relationship between the input signal b of the dither-processing means 114 and the image density value d of the print sample 119) from the input signal c of the multi-values outputting apparatus 116 and the large-area (fully painted) image density value d of the print sample 119 of the apparatus 116, in accordance with the output signal g of the area separating means 112, and the same outputs the selected and created printer γ-characteristic to the γ-correction curve creating means 121. The γ-characteristic curve creating means 123 is constructed with LUT including the ROM as shown in FIG. 46, and the LUT 123 obtains previously the output γ-characteristic of the multi-values outputting apparatus 116 and the printer γ-characteristics 1 and 2 experimentally so as to make the LUT, such that, even though the output γ-characteristic (the relationship between the input signal c of the multi-values outputting apparatus 116 and the large-area (fully painted) image density value d) or the characteristic of the dither-processing means change, the printer γ-characteristics 1 and 2 can be obtained.

In the sixteenth embodiment, since the γ-characteristic curve creating portion 123 constructed with the LUT creates the printer γ-characteristics 1 and 2 in accordance with the output signal g of the area separating means 112, the most suitable correction curve can be created in the γ-correction curve creating means 121, and the image quality adjusting time of the image processing apparatus can be shortened.

Now, the seventeenth embodiment of the present invention will be explained. Since the above-mentioned fourteenth and fifteenth embodiments employ a γ-characteristic curve creating means 104 constructed with the LUT and γ-characteristic curve creating portions 117 and 118, there occur some problems that the amount of experiments becomes very large and a ROM of large capacitance has to be prepared. In order to solve the above problem, the seventeenth and eighteenth embodiments create the γ-characteristic curve by use of the functional approximation method. Regarding the seventeenth and eighteenth embodiments, in the above-mentioned fourteenth and fifteenth embodiments, the γ-characteristic curve creating means 104 and the characteristic curve creating portions 117 and 118 are constructed such that the γ-characteristic curve is created by utilizing the following equality.

$$Pg = A \begin{bmatrix} x \\ y \\ z \end{bmatrix}^3 \qquad \text{[Equality 2]}$$

In the above equality, x is the input signal b of the dither-processing means 102, 113, and 114, "y" the input signal c of the multi-values outputting apparatuses 103 and 116, "z" the large-area (fully painted) image density value d of the print samples 106 and 119 outputted from the multi-values outputting apparatuses 103 and 116, and "Pg" is the γ-characteristic value (the relationship between the input signal b of the dither-processing means 102, 113, and 114 and the image density value d of the print samples 106 and 119). The value "A" can be determined using the least squares method. In the seventeenth embodiment, the number of experiments determined using the least squares to be performed in the case of the above-mentioned fourteenth and fifteenth embodiments can be reduced.

In the seventeenth embodiment, when the γ-characteristic curve creating means 104 of the above-mentioned fourteenth embodiment creates the γ-characteristic curve based upon the c curve c above equality, the γ-characteristic creating measure 104 is constructed such that the input signal b of the dither-processing means 102, the input signal c of the multi-values outputting apparatus 103, and the large-area (fully painted) image density value d of the print samples 106 and 119 output from the multi-values outputting apparatus 103 are input to the γ-characteristic curve creating means 104 and the measure 104 outputs the γ-characteristic value, and in such construction the value "A" is determined by use of the least squares method.

Further, in a modification −1 of the seventeenth embodiment, when the γ-characteristic curve creating means 117 and 118 create the γ-characteristic curve based upon the above equality, the γ-characteristic curve creating means 117 is constructed such that it creates the γ-characteristic curve based upon the following equality.

$$Pg = A1 \begin{bmatrix} x \\ y \\ z \end{bmatrix}^3 \qquad \text{[Equality 3]}$$

In the above equality, "x" is the input signal b of the dither-processing means 113, "y" the input signal c of the multi-values output apparatus 116, "z" the large-area (fully painted) image density value d of the print sample output from the multi-values outputting apparatus 116, and "Pg" the γ-characteristic value (the relationship between the input signal b of the dither processing means 113 and the image density value d of the print sample 119).

The value "A1" can be determined by the least squares method.

The γ-characteristic curve creating means 118 is constructed so as to create the γ-characteristic curve on the basis of the following equality.

$$Pg = A2 \begin{bmatrix} x \\ y \\ z \end{bmatrix}^3 \qquad \text{[Equality 4]}$$

In the above equality, "x" is the input signal b of the dither-processing means 114, "Y" the input signal c of the multi-values outputting apparatus 116, "z" the large-area image density value d of the print sample 119 output from the multi-values outputting apparatus 116, and "Pg" the γ-characteristic value (the relationship between the input signal b of the dither processing means 114 and the image density value d of the print sample 119). The value "A2" can be determined by use of the least squares method.

In the seventeenth embodiment and its first modification, since the printer γ-characteristic is obtained by use of the γ-characteristic curve creating means constructed with the functional approximation, the γ-correction curve creating means 121 can create the most suitable γ-correction curve, and the image quality adjusting time of the image processing apparatus can be shortened, and further the number of experiments can be reduced.

Now, the eighteenth embodiment according to the present invention will be explained.

Since the fourteenth and fifteenth embodiments employ the γ-characteristic curve creating means 104 constructed with the LUT, and the γ-characteristic curve creating portions 117 and 118, there arise some problems that the number of experiments becomes large and a ROM of large capacitance has to be prepared. In order to solve the above problems, the second modification of the seventeenth embodiment and the eighteenth embodiment, create the γ-characteristic curve using a neural network.

In the second modification of the seventeenth embodiment, the γ-characteristic curve creating means 104 of the above-mentioned fourteenth embodiment is constructed with a neural network comprising the input layer 104a, an intermediate layer 104b, and the output layer 104c, and the neural network performs studying such that the input signal b of the dither-processing means 102, the input signal c of the multi-values outputting apparatus 103, and the large-area image density value d of the print sample 106 outputted from the multi-values apparatus are input into the input layer 104a, and the γ-characteristic value (the relationship between the input signal b of the dither-processing means 102 and the image density value d of the print sample 106) is output from the output layer 104. As the studying algorithm of the neural network, the method of studying the copied image of the input pattern and the output pattern, for instance, the error inversely transmitting method is employed.

And further, in the eighteenth embodiment, the γ-characteristic curve creating means 117 and 118 of the above-mentioned fifteenth embodiment include a neural network. The neural network constructing the γ-characteristic curve creating means 117 performs studying such that the input signal b of the dither-processing means 113, the input signal c of the multi-values outputting apparatus 116, and the large-area image density value d of the print sample 119 output from the multi-values outputting apparatus 116, and the γ-characteristic value (the relationship between the input signal b of the dither processing means 113 and the image density value d of the print sample 119) is output from the neural network.

And further, the neural network constructing the γ-characteristic curve creating means 118 performs studying such that the Input signal b of the dither-processing means 114, the input signal c of the multi-values outputting apparatus 116, and the large-area (fully painted) image density value d of the print sample 119 outputted from the multi-values outputting apparatus 166, and the γ-characteristic value (the relationship between the input signal b of the dither-processing means b114 and the image density value d of the print sample 119) is output from the neural network. As the studying algorithm of those neural network, the method of studying the copied image of the input pattern and the output pattern, for instance, the error inversely transmitting method is employed.

Figure 48:
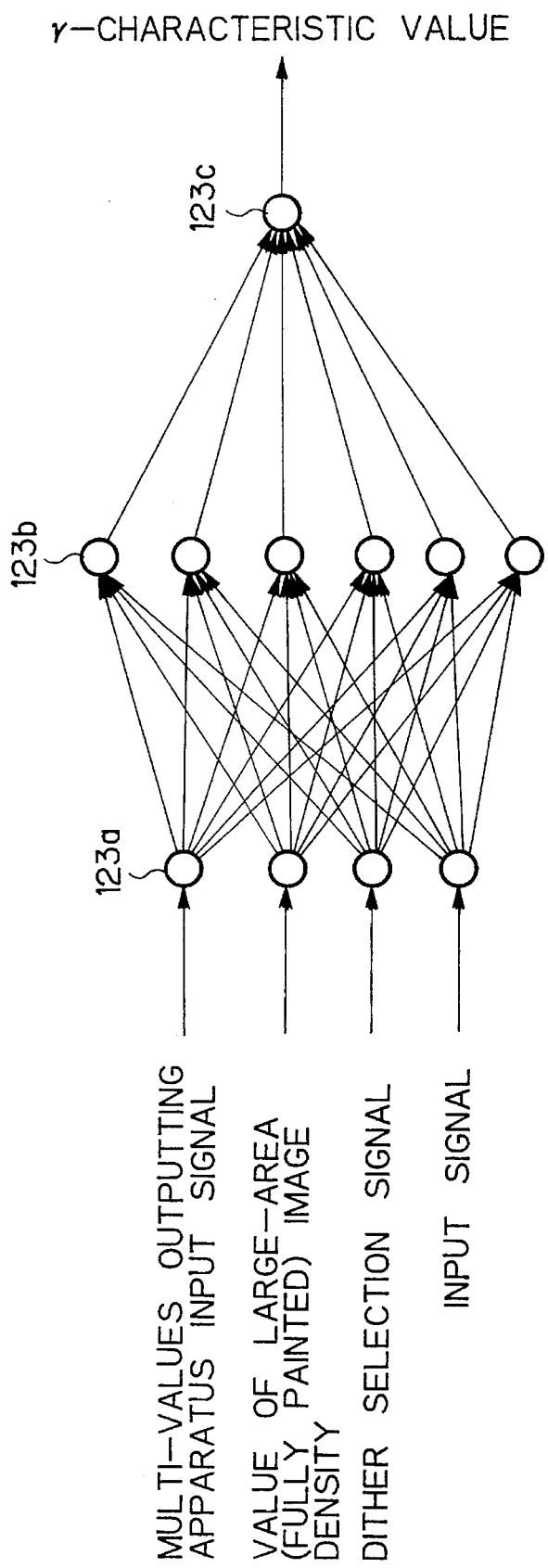
FIG. 48 is a diagram showing a neural network for creating the γ-characteristic curve in an eighteenth embodiment (and its modification) according to the present invention.
Figure 49:
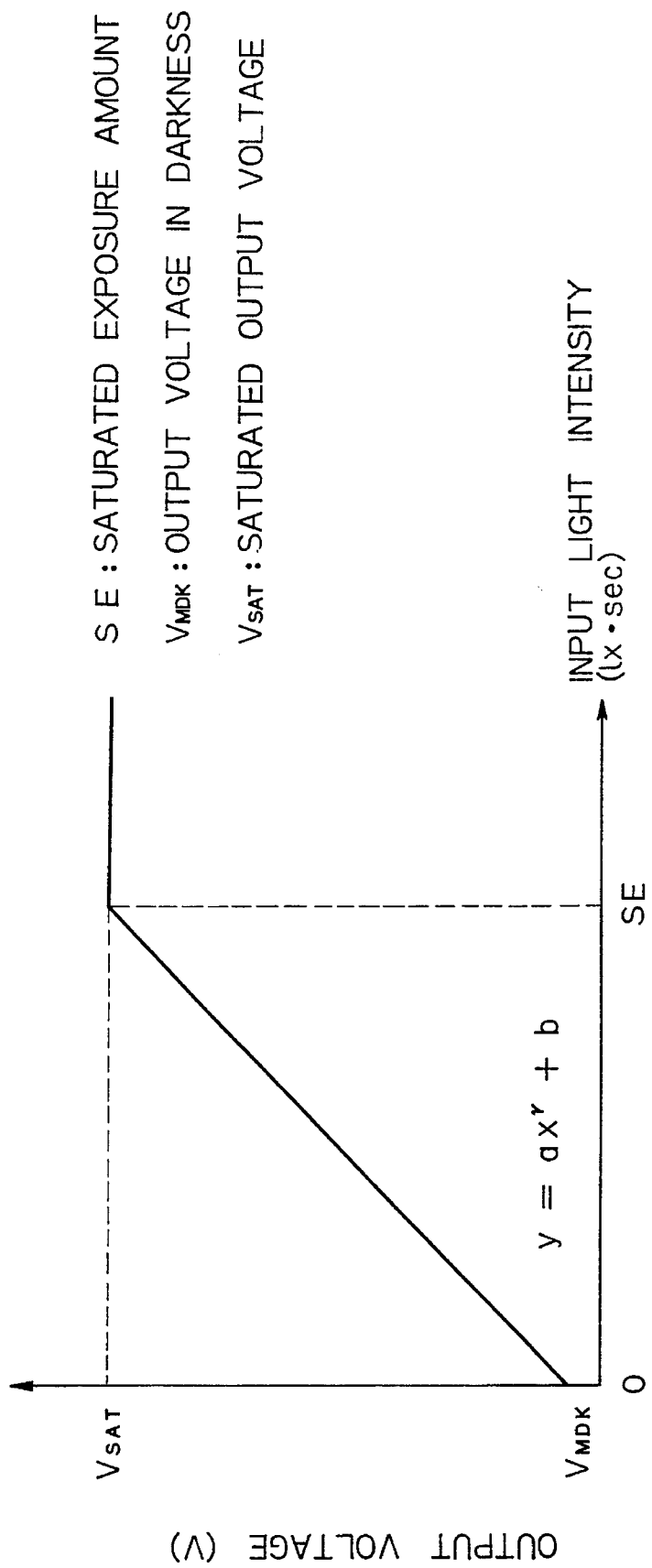
FIG. 49 is a graph showing the photo-electric conversion characteristic.
Figure 50:
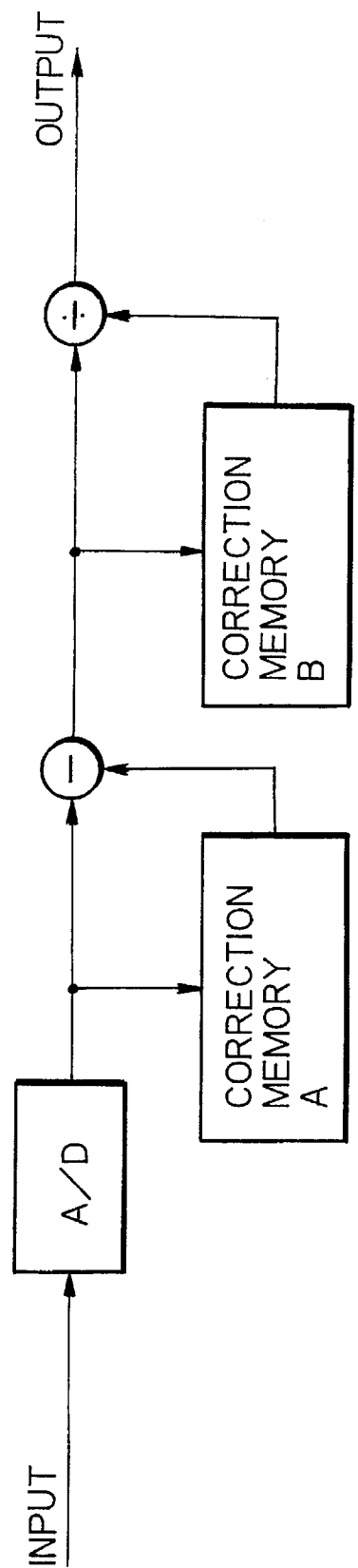
FIG. 50 is a block diagram showing the circuit for performing the first type shading correction.
Figure 51:
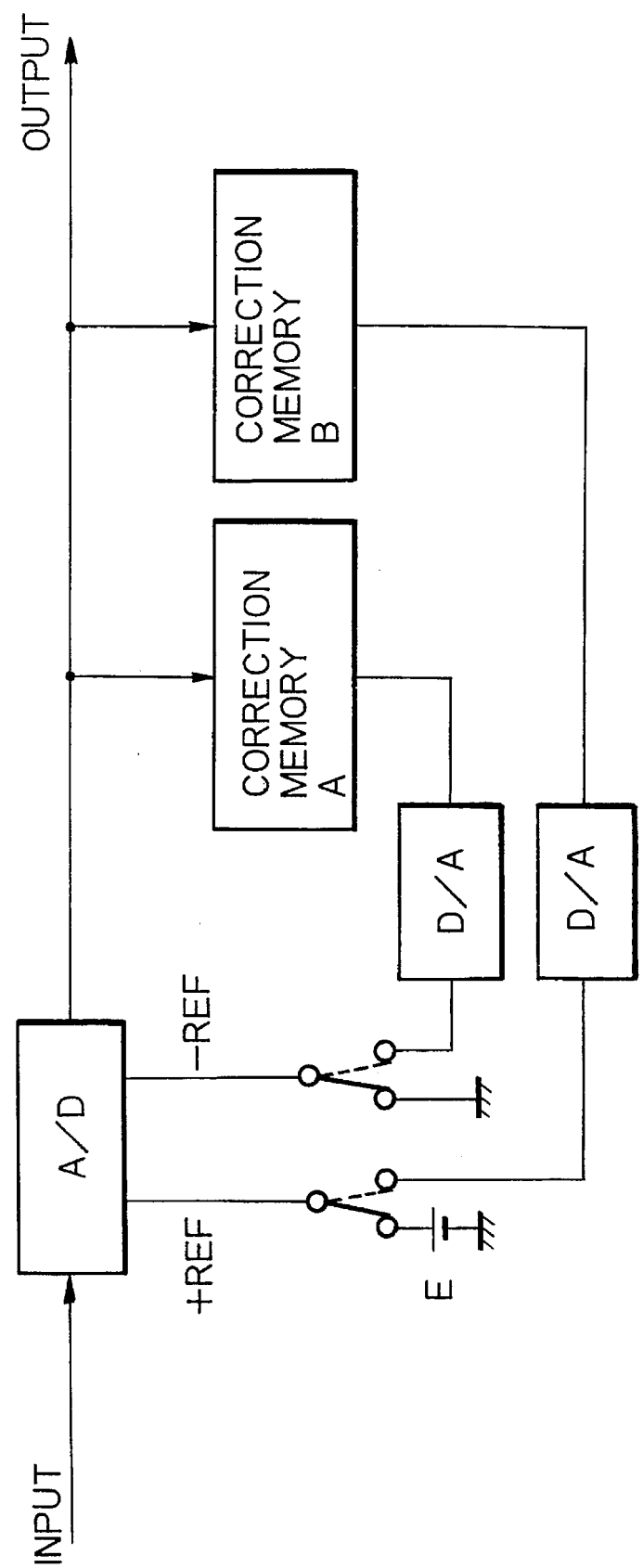
FIG. 51 is a block diagram showing the circuit for performing the second type shading correction.
Figure 52:
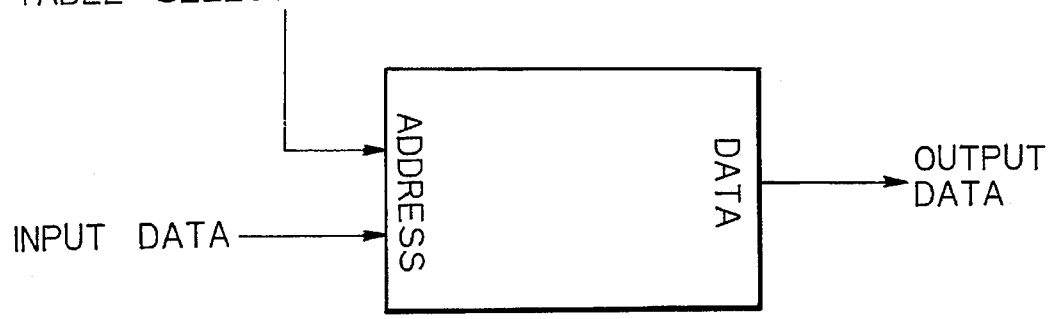
FIG. 52 is a block diagram showing the LUT system.
Figure 53:
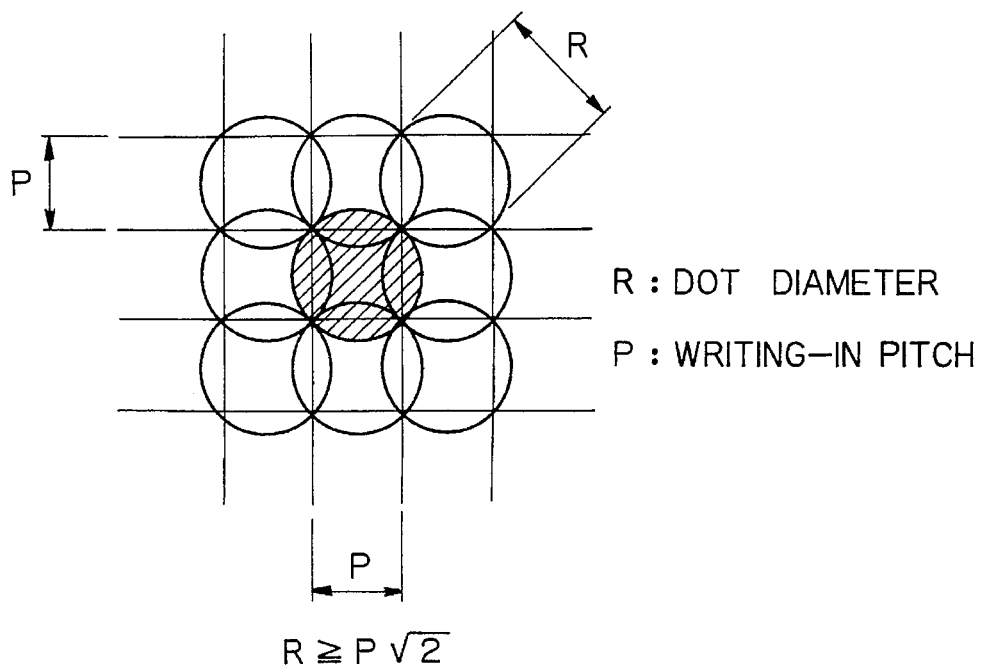
FIG. 53 is a diagram illustrating the relationship between the writing-in pitch and the dots form.
Figure 54:
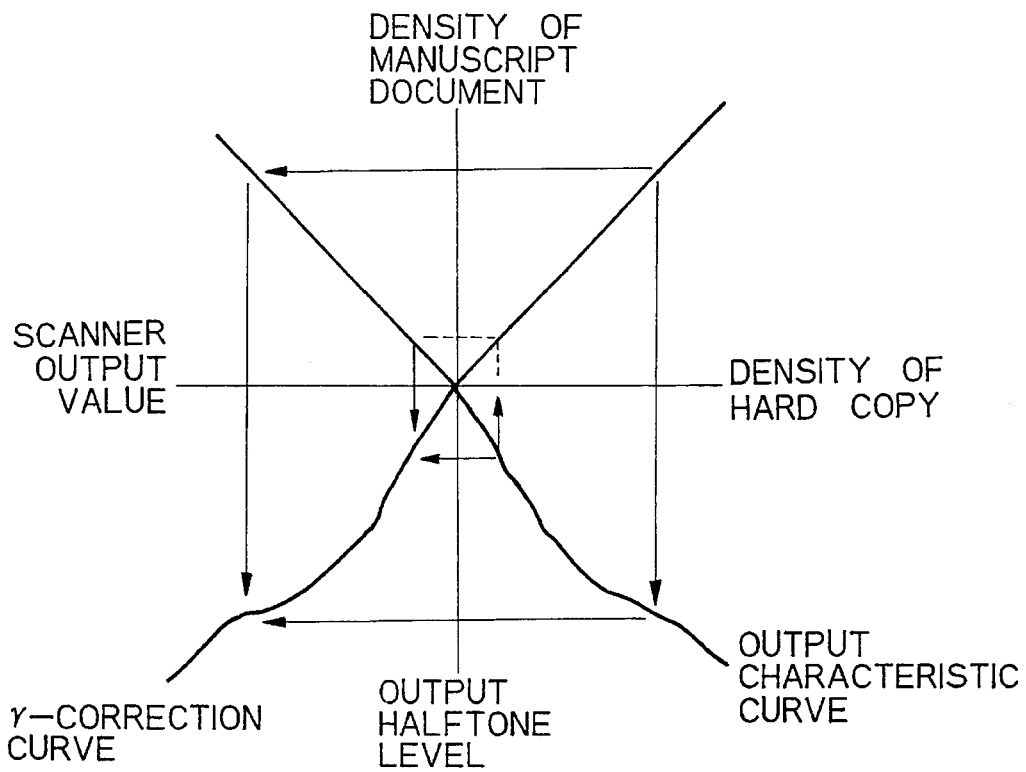
FIG. 54 is a graph showing the γ-correction curve.
Figure 55:
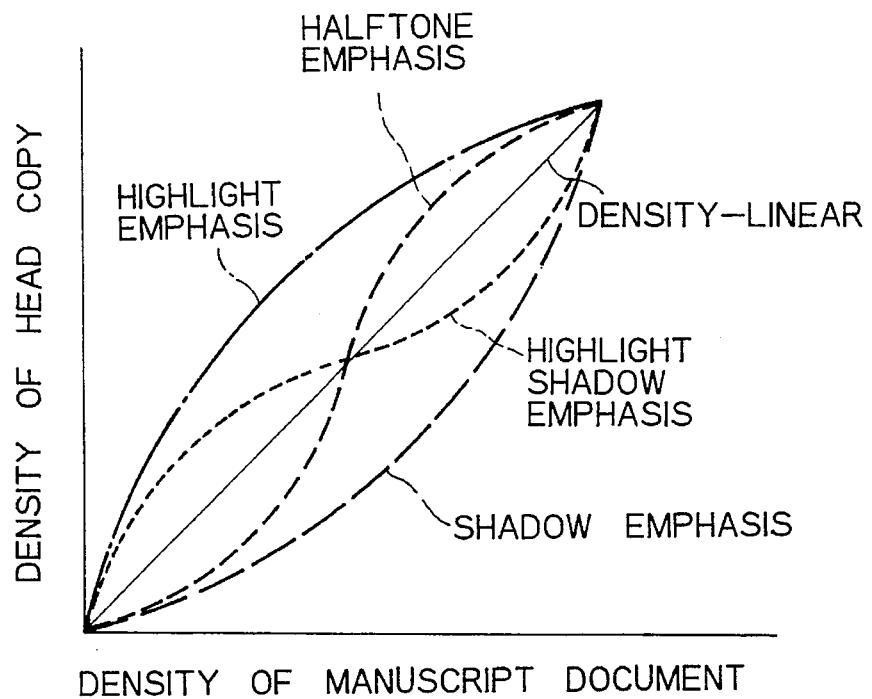
FIG. 55 is a graph showing the halftone conversion curve.
Figure 56:
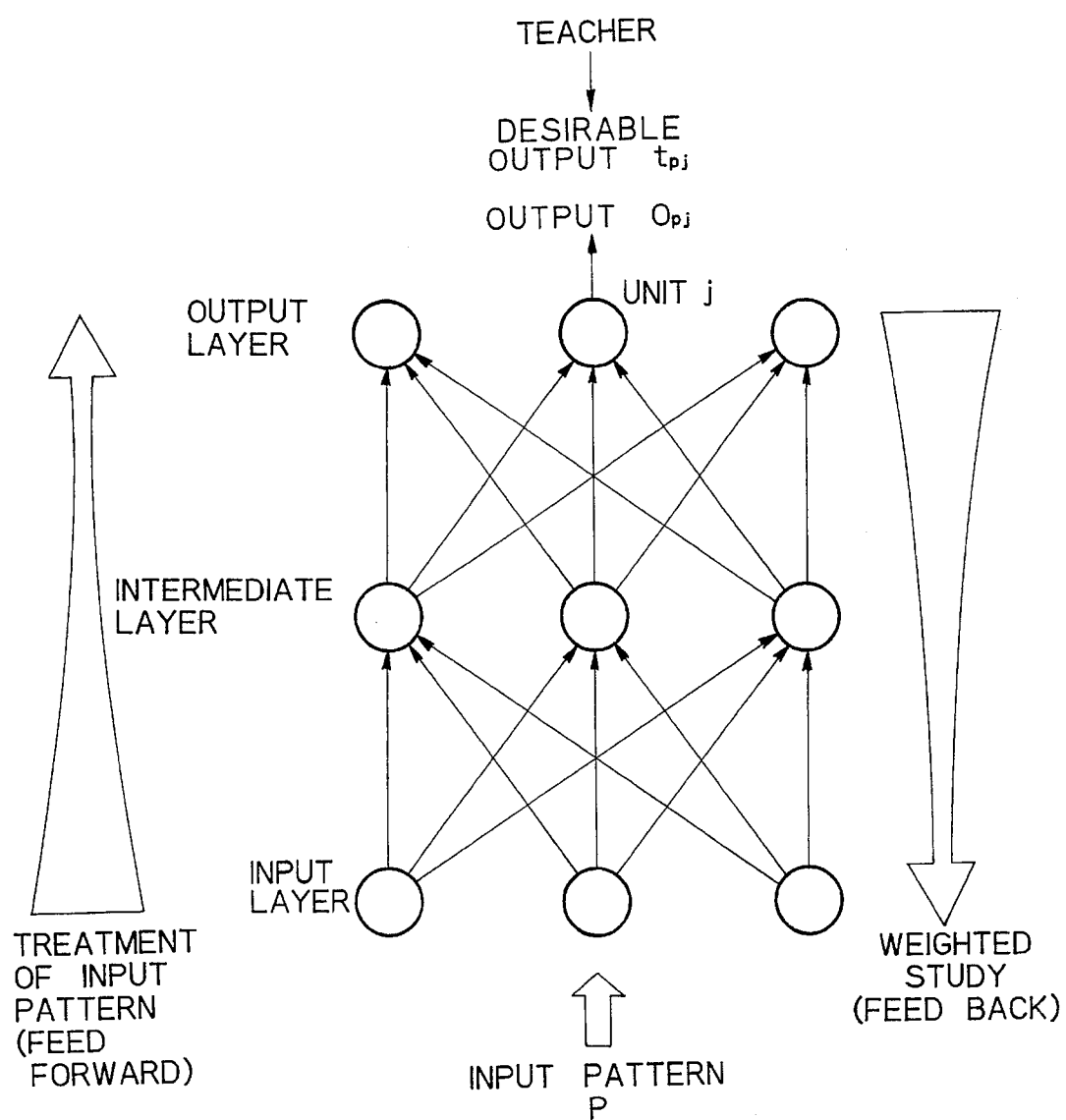
FIG. 56 is a diagram showing the classified structure of the neural network.
Figure 57A:
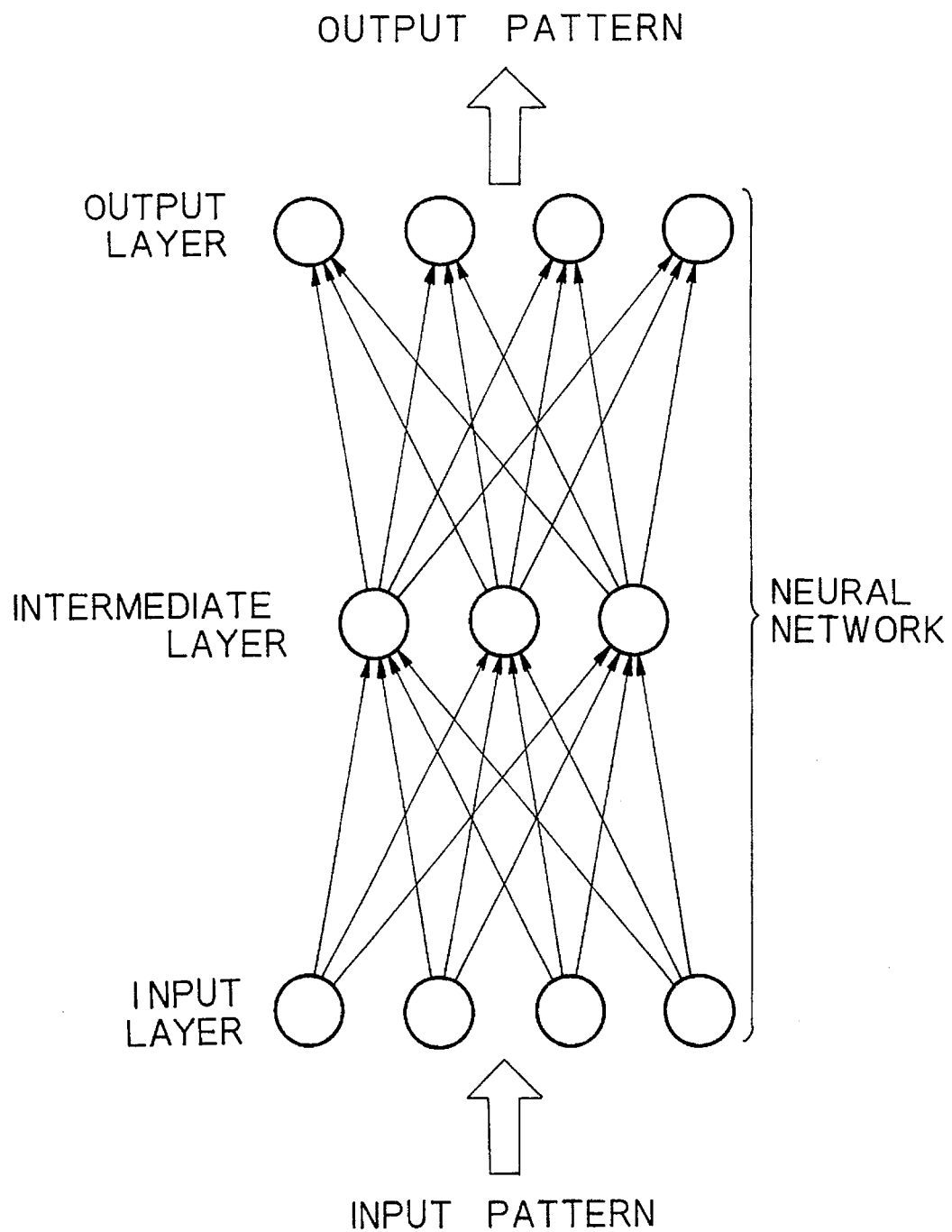
FIGS. 57a and 57b are diagrams respectively showing the neural network of pattern associator type and that of automatic associator type.
Figure 57B:
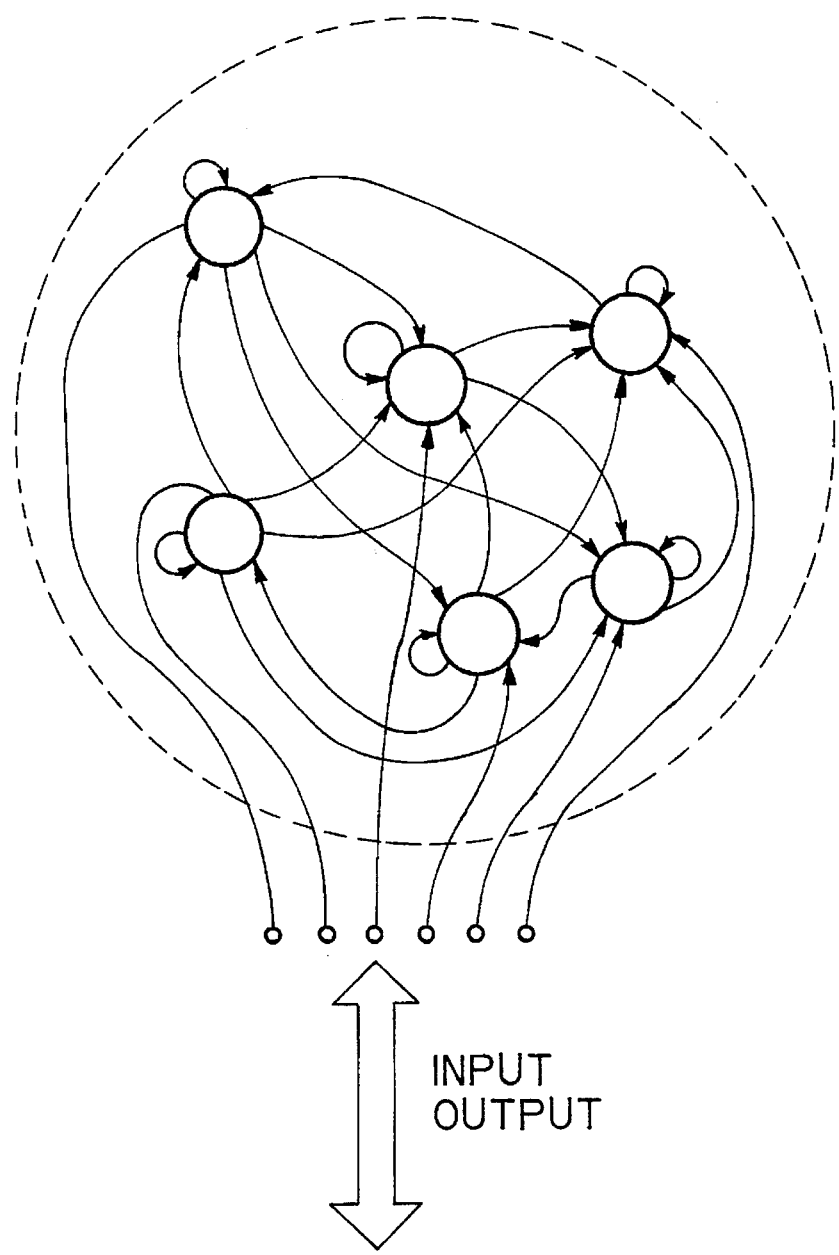

FIG. 48 shows the neural network constructing the γ-characteristic curve creating means in a modification of the eighteenth embodiment. In the modification, the γ-characteristic curve creating means 123 of the above-mentioned sixteenth embodiment is constructed with the neural network as shown in FIG. 48. The neural network comprises the input layer 123a, intermediate layer 123b, and output layer 123c, and the same performs studying such that the input signal b of the dither-processing means 113 and 114, the input signal c of the multi-values outputting apparatus 116, the large-area image density value d of the print sample 119 outputted from the multi-values outputting apparatus 116, and the input signal g (the dither selection signal) are input to the neural network, and the neural network outputs the γ-characteristic value 1 (the relationship between the input signal b of the dither-processing means 113 and the image density value d of the print sample 119) when the dither-processing means 113 is selected by the dither selection signal g, while the neural network outputs the γ-characteristic value 2 (the relationship between the input signal b of the dither-processing means 114 and the image density value d of the print sample 119). As the studying algorithm of these neural networks, the method of studying the copied image of the input pattern and the output pattern, for instance, the error inversely transmitting method is employed.

In the second modification of the seventeenth embodiment, since the eighteenth embodiment and its modification, since the printer γ-characteristic is obtained using the γ-characteristic curve creating measure constructed with the neural network, the most suitable γ-correction curve can be created by use of the γ-correction curve creating means 121, and the image quality adjusting time can be shortened. The number of experiments can also be reduced.

As is apparent from the foregoing description, according to the first embodiment of the present invention and its modification in the image processing apparatus for correcting a γ-characteristic of the density value for each picture element (pixel) of the image of the original picture to be processed and the output value of the image processing means in the predetermined apparatus to which the image is input, or for correcting the γ-characteristic of the writing-in value of the image processing means in the predetermined apparatus for outputting the image and the output image density, since the above-mentioned image processing apparatus comprises a γ-correction curve creating means for creating the γ-correction curve from the input γ-characteristic, and a γ-correction curve selecting means for selecting the most suitable γ-correction curve from the plural γ-correction curves by use of the γ-correction curve created by the γ-correction curve creating means.

According to the second embodiment, in the image processing apparatus for correcting the γ-characteristic of the density value for each picture element (pixel) of the image of the original picture to be processed and the output value of the image processing means in the predetermined apparatus to which the image is input, or for compensating the γ-characteristic of the writing-in value of the image processing means in the predetermined apparatus for outputting the image and the output image density, since the above-mentioned image processing apparatus comprises the γ-correction curve creating means for creating the γ-correction curve from the input γ-characteristic and the neural network which has been studied such that the γ-correction curve from the γ-correction curve creating means is input to the neural network and the selected value of the γ-correction curve is output therefrom, and the same further comprises the γ-correction curve selecting means for selecting the most suitable γ-correction curve among the plurality of γ-correction curves by use of the neural network, the most suitable γ-correction curve can be created, and the image quality adjusting time of the image processing apparatus can be shortened.

According to the third embodiment and its modification, in the image processing apparatus for correcting the γ-characteristic of the density value for each picture element (pixel) of the image of the original picture to be processed and the output value of the image processing means in the predetermined apparatus to which the image is input, or for correcting the γ-characteristic of the writing-in value of the image processing means in the predetermined apparatus for outputting the image and the output image density, since the above-mentioned image processing apparatus comprises the γ-characteristic curve creating means for creating the γ-characteristic curve and the γ-correction curve creating means for creating the most suitable γ-correction curve from the output of the γ-characteristic curve creating means, the most suitable γ-correction curve can be created, the image quality adjusting time of the image processing apparatus can be shortened, and the density can be made linear.

According to the fourth embodiment and the first and second modifications thereof, in the image processing apparatus for correcting the γ-characteristic of the density value for each picture element (pixel) of the image of the original picture to be processed and the output value of the image processing means in the predetermined apparatus to which the image is input, or for correcting the γ-characteristic of the writing-in value of the image processing means in the predetermined apparatus for outputting the image and the output image density, since the above-mentioned image processing apparatus comprises the γ-characteristic curve creating means constructed with the neural network previously studying the γ-characteristic curve and the γ-correction curve creating means for creating the most suitable γ-correction curve from the output of the γ-characteristic curve creating means, the most suitable γ-correction curve can be created, the image quality adjusting time of the image processing apparatus can be shortened, and further the density can be made linear.

According to the fifth embodiment, in the image processing apparatus having the scanner γ-correction means for correcting the relationship between the input image density and the scanner output value as one part of the image processing system, since the image processing apparatus comprises a temperature sensor for sensing the temperature at the time of measuring the scanner γ-characteristic, a scanner γ-characteristic curve creating means for outputting the scanner γ-characteristic value in accordance with the output signal of the temperature sensor, and a γ-correction curve creating means for creating the most suitable γ-correction curve from the output of the scanner γ-characteristic curve creating means, the most suitable γ-correction curve can be created, the image quality adjusting time can be shortened, and the density can be made linear.

According to the sixth embodiment, in the γ-correction curve creating apparatus described in the fifth embodiment, since the aforementioned scanner γ-characteristic curve creating means is constructed with the neural network previously studying the relationship between the output signal of the afore-mentioned temperature sensor and the scanner γ-characteristic, the most suitable γ-correction curve can be created, the image quality and the density can be made adjusting time can be shortened, linear.

According to the seventh embodiment, in the color image processing apparatus comprising a color dissolving means for color-dissolving and reading out the original manuscript, a color print means for creating the color manuscript document, and a γ-correction means for performing the γ-correction of the color print means, since the above color image processing apparatus further comprises a color patch creating means for creating the color manuscript document of optional color from the aforementioned color print measure, a color density estimating means constructed with a neural network performing study previously such that the color dissolving signal is input thereto from the aforementioned color dissolving and the density value for each color component for the color manuscript document output from the above color print means is output therefrom, as achromatic color estimating means for estimating whether the above color manuscript document is achromatic from the color dissolving signal emitted from the color dissolving means, a color density estimating means for estimating the density value for each color component for the color manuscript document from the color dissolving signal emitted from the above color dissolving means, and a γ-correction curve creating means for creating the γ-correction curve from the output of the color density estimating means and the achromatic estimating means, the most suitable γ-correction curve can be created, the image quality adjusting time of the image processing apparatus can be shortened, and the density can be made linear.

According to the eighth embodiment, in the γ-correction curve creating apparatus for creating the γ-correction curve for each color component for converting the density value for each color component of the image color-dissolved for each picture element (pixel) by use of the predetermined color dissolving apparatus to the value for the image processing means for each color component in the predetermined color image processing apparatus, since the γ-correction curve creating apparatus comprises:

an achromatic color density estimating means for estimating the density value for each color component when the aforementioned predetermined color image processing outputs the achromatic color, a γ-characteristic estimating means for estimating the γ-characteristic value of the image processing means for each color component in the aforementioned color image processing apparatus, and a γ-correction curve creating means for creating the γ-correction curve from the γ-characteristic value emitted from the γ-characteristic estimating measure and the density value for each color component of the above achromatic color estimating means, the most suitable γ-correction curve can be created, the image quality adjusting time of the image processing apparatus can be shortened, and the density can be made linear.

According to the ninth embodiment, in the γ-correction curve creating apparatus described in the eighth embodiment, since the aforementioned predetermined color image processing is constructed with the neural network previously performing study so as to presume the density for each color component at the time of outputting the achromatic color, the most suitable γ-correction curve can be created, the image quality adjusting time of the image processing apparatus can be shortened, and the density can be made linear.

According to the tenth embodiment, in the γ-correction curve creating apparatus for creating the γ-correction curve for each color component of the image color-dissolved for each picture element (pixel) by use of the predetermined color dissolving to the value for the image processing means for each color component in the predetermined color image processing apparatus since the aforementioned predetermined color image processing apparatus comprises an achromatic color density estimating means for estimating the density value for each color component from the brightness of the achromatic color outputting the achromatic color, a γ-characteristic estimating means for estimating the γ-characteristic of the image processing means for each color component in the aforementioned predetermined color image processing apparatus, and a γ-correction curve creating means for creating the γ-correction curve for each color component from the γ-characteristic estimating means so as to make linear the brightness of the above achromatic color estimating means, the most suitable γ-correction curve can be created, the image quality adjusting time can be shortened, and the brightness can be made linear.

According to the eleventh embodiment, in the γ-correction curve creating apparatus described in the tenth embodiment, since the aforementioned predetermined color image processing apparatus is constructed with the neural network previously performing study such that the brightness at the time of outputting the achromatic color is input thereto and the density value for each color component at the time of output the achromatic color is outputted therefrom, the most suitable γ-correction curve can be created, the image quality adjusting time of the image processing apparatus can be shortened, and the brightness can be made linear.

According to the twelfth embodiment, in the color image processing apparatus comprising a color dissolving means for color-dissolving and reading out the manuscript document, a color print means for creating a color manuscript document, and a γ-correction means for performing the γ-correction of the color print means, since the color image processing apparatus further comprises:

an achromatic color density estimating means for estimating the density value for each color component at the time of outputting the achromatic color from the color dissolving signal emitted from the aforementioned color dissolving means, a γ-characteristic estimating means for estimating the γ-characteristic of the image processing means for each color component in the above color image processing apparatus, and a γ-correction curve creating means for creating the γ-correction curve for each color component so as to make linear the achromatic color density estimating value of the aforementioned achromatic color density estimating means from the γ-characteristic emitted from the characteristic estimating means, the most suitable γ-correction curve can be created, the image quality adjusting time of the image processing apparatus can be shortened, and the brightness can be made linear.

According to the thirteenth embodiment, in the γ-correction curve creating apparatus described in the twelfth embodiment, since the aforementioned achromatic color density estimating measure is constructed with the neural network for estimating the density value for each color component at the time of outputting the achromatic color from the color dissolving signal emitted from the above color dissolving means, the most suitable γ-correction curve can be created, the image quality adjusting time of the image processing apparatus can be shortened, and the brightness can be made linear.

According to the fourteenth embodiment, in the image processing apparatus comprising a dither-processing means and a multi-values outputting apparatus receiving the output signal of the dither-processing means and capable of outputting at least two values, which corrects the first γ-characteristic of the writing-in value to be input in the above dither-processing means of the image processing means and the output image of the above multi-value outputting apparatus, since the aforementioned image processing further comprises:

a γ-characteristic curve creating means for creating the above-mentioned first γ-characteristic from the second γ-characteristic of the input signal of the above multi-values outputting apparatus and the output image thereof, and a γ-correction curve creating portion for creating the most suitable γ-correction curve from the output of the γ-characteristic curve creating means, the most suitable γ-correction curve can be created, and the image quality adjusting time of the image processing apparatus can be shortened.

According to the fifteenth embodiment, in the image processing apparatus comprising at least two types of dither-processing measure, a dither-processing selection means for changing over the at least two types of dither-processing means, and a multi-values outputting apparatus receiving the output signal of the dither-processing selection means and capable of outputting two or more values which corrects the first γ-characteristic of the writing-in value to be input to the aforementioned dither-processing means of the image processing apparatus and the output image of the above multi-values outputting apparatus, since the above-mentioned image processing apparatus further comprises:

a γ-characteristic curve creating means for creating two or more types of the above-mentioned first γ-characteristic from the second γ-characteristic of the input signal of the above multi-values outputting apparatus and the output image thereof, a γ-characteristic selecting means for selecting two or more types of the first γ-characteristic from the above γ-characteristic curve creating means in accordance with the selection signal of the dither-processing means, and a γ-correction curve creating means for creating the curve from the γ-characteristic emitted from the -γ-characteristic selecting means, the most suitable γ-correction curve can be created and the image quality adjusting time can be shortened.

According to the seventeenth embodiment and the first and second modifications thereof, since the aforementioned γ-characteristic curve creating means of the γ-correction curve creating apparatus described in the fourteenth and fifteenth embodiments is constructed with the approximation means for approximating the γ-characteristic curve by use of the functional approximation method, the most suitable γ-correction curve can be created and the image quality adjusting time of the image processing apparatus can be shortened.

According to the eighteenth embodiment and its modification, since the aforementioned γ-characteristic curve creating measure of the γ-correction curve creating apparatus described in the fourteenth and fifteenth embodiments is constructed with the neural network previously studying the γ-characteristic curve, the most suitable γ-correction curve can be created and the image quality adjusting time can be shortened.

Obviously, numerous modifications and variations of the present invention are possible in light of the above teachings. It is therefore to be understood that within the scope of the appended claims, the invention may be practiced otherwise than as specifically described herein.

What is claimed as new and desired to be secure by Letters Patent of the United States is:

1. A color image processing apparatus comprising:

color dissolving means for color-dissolving and reading-out an original manuscript document;

color print means for creating a color manuscript document;

γ-correction means for performing γ-correction of said color print means;

color patch creating means for creating a color manuscript document of optional colors from said color print means;

color density estimating means constructed with a neural network previously studying so as to receive the color dissolving signal emitted from said color dissolving means and output the density value for respective color component for the color manuscript document output from said print means;

achromatic color estimating means for estimating whether said color manuscript document is achromatic color from said color dissolving signal emitted from said color dissolving means;

color density estimating means for estimating the density value for each color component for the color manuscript document from the color dissolving signal emitted from said color dissolving means; and γ-correction curve creating means for creating a γ-correction curve from the output signals of said color density estimating means and said achromatic color estimating means.

2. A γ-correction curve creating apparatus for creating a γ-correction curve for each color component in order to convert the density value for each color component obtained by color-dissolving the color image for each pixel by use of a predetermined color dissolving apparatus, comprising:

achromatic color density estimating means for estimating the density value for each color component when said predetermined color image processing apparatus outputs achromatic color;

γ-characteristic estimating means for estimating the γ-characteristic value of said image processing means for each color component in said predetermined color image processing apparatus; and γ-correction curve creating means for creating the γ-correction curve from the γ-characteristic value emitted from said γ-characteristic estimating means and the density value for each color component of said achromatic color estimating means.

3. The γ-correction curve creating apparatus according to claim 2, wherein said achromatic color density estimating means is constructed with a neural network previously studying so as to estimate the density value for each color component when said predetermined color image processing apparatus outputs the achromatic color.

4. A γ-correction curve creating apparatus for creating a γ-correction curve for each color component in order to convert the density value for each color component obtained by color-dissolving the color image for each pixel by use of a predetermined color dissolving apparatus, comprising:

achromatic color density estimating means for estimating the density value for each color component when said predetermined color image processing apparatus outputs achromatic color from the brightness of the achromatic color;

γ-characteristic estimating means for estimating the γ-characteristic value of said image processing means for each color component in said predetermined color image processing apparatus, and γ-correction curve creating means for creating the γ-correction curve for each color component so as to make linear the brightness of said achromatic color estimating means from the γ-characteristic emitted from said γ-characteristic estimating means.

5. The γ-correction curve creating apparatus according to claim 4, wherein said achromatic color density estimating means comprises a neural network previously studying such that said neural network receives the brightness when said predetermined color image processing apparatus outputs the achromatic color and the same outputs the density value for each color component at the time of outputting the achromatic color.

6. In a color image processing apparatus, comprising:

color dissolving means for color-dissolving and reading out a manuscript document;

color print means for creating a color manuscript document;

γ-correction means for performing the γ-correction of said color print means; and a γ-correction curve creating apparatus including achromatic color density estimating means for estimating the density value for each color component when said color image processing apparatus outputs the achromatic color from the color dissolving signal emitted from said color dissolving means, γ-characteristic estimating means for estimating the γ-characteristic of said image processing apparatus for each color component in said color image processing apparatus, and γ-correction curve creating means for creating the γ-correction curve for each color component so as to make linear the achromatic color density estimating value of said achromatic color density estimating means from the γ-characteristic emitted from said γ-characteristic estimating means.

7. The γ-correction curve creating means according to claim 6, wherein said γ-correction curve creating means comprises a neural network for estimating the density value for each color component when said predetermined color image processing apparatus outputs the achromatic color from the color dissolving signal emitted from said color dissolving means.

* * * * *